(12) United States Patent
Kelsey et al.

(10) Patent No.: US 12,443,620 B2
(45) Date of Patent: Oct. 14, 2025

(54) COPILOT ARCHITECTURE: NETWORK OF MICROSERVICES INCLUDING SPECIALIZED MACHINE LEARNING TOOLS

(71) Applicant: THIA ST Co., Corvallis, OR (US)

(72) Inventors: Elaine Kelsey, Corvallis, OR (US); Elliot Nicholas Robson, Seoul (KR); Sazzad Mahmud Nasir, Muncie, IN (US); Jeffrey Thomas Yarbro, Memphis, TN (US); Robert Oscar Robson, Corvallis, OR (US); Lauren Elizabeth Egerton, New York, NY (US); Spencer Thomas Ward, Kent, WA (US); Brendan Michael Kelly, Somerville, MA (US)

(73) Assignee: THIA ST CO., Corvallis, OR (US)

( * ) Notice: Subject to any disclaimer, the term of this patent is extended or adjusted under 35 U.S.C. 154(b) by 0 days.

(21) Appl. No.: 19/039,734

(22) Filed: Jan. 28, 2025

(65) Prior Publication Data

US 2025/0231960 A1    Jul. 17, 2025

Related U.S. Application Data

(62) Division of application No. 18/898,502, filed on Sep. 26, 2024, now Pat. No. 12,242,503.

(Continued)

(51) Int. Cl.
*G06F 16/2455*    (2019.01)
*G06F 16/25*    (2019.01)

(52) U.S. Cl.
CPC ........ *G06F 16/258* (2019.01); *G06F 16/2455* (2019.01)

(58) Field of Classification Search
None
See application file for complete search history.

(56) References Cited

U.S. PATENT DOCUMENTS 8,442,940 B1    5/2013 Faletti et al.
10,802,488 B1    10/2020 Abeloe
(Continued)

OTHER PUBLICATIONS

Agarwal et al., "Knowledge graph based synthetic corpus generation for knowledge-enhanced language model pre-training," arXiv preprint arXiv:2010.12688 (Oct. 23, 2020).

(Continued)

*Primary Examiner* — Christopher J Raab
(74) *Attorney, Agent, or Firm* — Klarquist Sparkman, LLP

(57) ABSTRACT

Apparatus and methods are disclosed for implementing a copilot as a network of microservices including specialized large language models (LLMs) or other trained machine learning (ML) tools. The microservice network architecture supports flexible, customizable, or dynamically determinable dataflow. Compared to much larger competing LLMs, comparable or superior performance is achieved for certain tasks, while significantly reducing hardware requirements and computation time. Disclosed examples incorporate microservices for expansion, retrieval, embedding, and evaluation, in addition to one or more core microservices. Optionally, intermodal I/O, multiple data repositories, competency qualification, or human feedback can be supported. Multiple core microservices can support varying client authorizations or cognitive functions. The disclosed architecture supports any major LLM use case and can be deployed on a single compute node with a single GPU. Techniques are disclosed for multi-recursive retrieval, expansion ML tool training, input/output translation at data (Continued)

producers, and qualification of input/output data against copilot competency.

24 Claims, 11 Drawing Sheets

Related U.S. Application Data

(60) Provisional application No. 63/561,654, filed on Mar. 5, 2024, provisional application No. 63/620,329, filed on Jan. 12, 2024.

(56) References Cited

U.S. PATENT DOCUMENTS

| | | | |
|---|---|---|---|
| 10,803,127 B2 | 10/2020 | Alexander et al. | |
| 10,992,780 B1* | 4/2021 | Rudrappa Goniwada | H04L 67/34 |
| 11,379,715 B2 | 7/2022 | Tang et al. | |
| 11,443,102 B1 | 9/2022 | Wilson et al. | |
| 11,922,121 B2 | 3/2024 | Wang | |
| 12,093,658 B1 | 9/2024 | Silver et al. | |
| 12,136,043 B1 | 11/2024 | Davis et al. | |
| 12,210,973 B2 | 1/2025 | Johnson | |
| 2015/0199646 A1 | 7/2015 | Taylor et al. | |
| 2016/0246824 A1 | 8/2016 | Furuhashi et al. | |
| 2017/0262811 A1 | 9/2017 | Ovadya | |
| 2017/0262949 A1 | 9/2017 | Jay | |
| 2018/0089593 A1 | 3/2018 | Patel et al. | |
| 2019/0325353 A1 | 10/2019 | Aftab et al. | |
| 2020/0050946 A1 | 2/2020 | Lecue et al. | |
| 2020/0057946 A1 | 2/2020 | Singaraju et al. | |
| 2020/0069208 A1 | 3/2020 | Keane | |
| 2020/0186433 A1* | 6/2020 | Cui | H04L 41/0886 |
| 2020/0241944 A1 | 7/2020 | Derdak et al. | |
| 2020/0257733 A1 | 8/2020 | Mei et al. | |
| 2020/0380254 A1 | 12/2020 | Zeng et al. | |
| 2021/0035047 A1 | 2/2021 | Mossoba et al. | |
| 2021/0089779 A1 | 3/2021 | Chan et al. | |
| 2021/0174347 A1 | 6/2021 | Rose | |
| 2021/0201128 A1 | 7/2021 | Xu et al. | |
| 2021/0233030 A1 | 7/2021 | Preuss et al. | |
| 2021/0286831 A1 | 9/2021 | Girardi et al. | |
| 2021/0295238 A1 | 9/2021 | Poon et al. | |
| 2021/0312399 A1 | 10/2021 | Asokan et al. | |
| 2021/0357705 A1 | 11/2021 | Sung et al. | |
| 2021/0365782 A1 | 11/2021 | Huang et al. | |
| 2022/0067665 A1 | 3/2022 | Westerheide et al. | |
| 2022/0232085 A1 | 7/2022 | Panikkar et al. | |
| 2022/0237892 A1 | 7/2022 | Anderton-Yang | |
| 2022/0284312 A1 | 9/2022 | Brecque | |
| 2022/0336060 A1 | 10/2022 | Koop et al. | |
| 2023/0133373 A1 | 5/2023 | McGonnell | |
| 2023/0214192 A1 | 7/2023 | Makhija et al. | |
| 2023/0214238 A1 | 7/2023 | Yitzhaki et al. | |
| 2023/0289691 A1 | 9/2023 | Sabourin | |
| 2024/0012842 A1 | 1/2024 | Kislal et al. | |
| 2024/0037949 A1 | 2/2024 | Johnston et al. | |
| 2024/0087743 A1 | 3/2024 | Grimm et al. | |
| 2024/0095679 A1 | 3/2024 | Nowak et al. | |
| 2024/0111498 A1* | 4/2024 | Vaughn | G06F 8/30 |
| 2024/0119383 A1 | 4/2024 | Bowers et al. | |
| 2024/0176629 A1 | 5/2024 | Reddy | |
| 2024/0202177 A1 | 6/2024 | Bandlamudi et al. | |
| 2024/0303569 A1 | 9/2024 | Yu et al. | |
| 2024/0356881 A1* | 10/2024 | Wheeler | G06F 40/40 |
| 2024/0362503 A1 | 10/2024 | Prasad et al. | |
| 2024/0370476 A1* | 11/2024 | Madisetti | G06F 16/3329 |
| 2024/0386015 A1* | 11/2024 | Crabtree | G06F 16/9024 |
| 2024/0403005 A1* | 12/2024 | Friddle | G06F 8/35 |
| 2024/0412720 A1* | 12/2024 | Vasylyev | G06F 40/35 |
| 2025/0005288 A1 | 1/2025 | Amatriain-Rubio et al. | |
| 2025/0069308 A1 | 2/2025 | Cameron et al. | |

OTHER PUBLICATIONS

Dorsch et al., "GraphGuard: Enhancing Data Quality in Knowledge Graph Pipelines," SEMIIM, 14 pages (Nov. 2023).

Liu et al., "Multi-stage pre-training over simplified multimodal pre-training models," arXiv preprint arXiv:2017.14596 (Jul. 22, 2021).

Morisot, "Add a SideNet to your MainNet," ArXiv:2007.13512v1, 15 pages (Jul. 2020).

Bodor et al., "From Development to Deployment: An Approach to MLOps Monitoring for Machine Learning Model," 14th International Conference on Intelligent Systems: Theories and Applications, 7 pages (Nov. 2023).

Feng et al., "Knowledge Card: Filling LLMs' Knowledge Gaps With Plug-in Specialized Language Models," ArXiv:2305.09955v2, pp. 1-24 (Oct. 2023).

Jeong, "A Study on the Implementation of Generative AI Services Using an Enterprise Data-Based LLM Application Architecture," ArXiv 2309.01105v1, pp. 1-26 (Sep. 2023).

Kaddour et al., "Challenges and Applications of Large Language Models," ArXiv 2307.10169v1, pp. 1-72 (Jul. 2023).

Liang et al. "Modular Retrieval for Generalization and Interpretation," ArXiv:2303.13419v1, pp. 1-15 (Mar. 2023).

PCT/US2024/061299 Invitation to Pay Additional Fees, including Partial Search Report and Provisional Opinion, 15 pages (Apr. 9, 2025).

PCT/US2024/061934 Invitation to Pay Additional Fees, including Partial Search Report and Provisional Opinion, 20 pages (Apr. 4, 2025).

Roca et al., "Microservice chatbot architecture for chronic patient support," Journal of Biomedical Informatics, pp. 1-19 (Oct. 2019).

Shao et al., "Enhancing Retrieval-Augmented Large Language Models with Iterative Retrieval-Generation Synergy," ArXiv:2305.15294v1, pp. 1-12 (May 2023).

* cited by examiner

COPILOT ARCHITECTURE: NETWORK OF MICROSERVICES INCLUDING SPECIALIZED MACHINE LEARNING TOOLS

CROSS-REFERENCE TO RELATED APPLICATIONS

This is a Divisional of U.S. patent application Ser. No. 18/898,502 filed Sep. 26, 2024, which claims the benefit of U.S. Provisional Application No. 63/620,329, filed on Jan. 12, 2024, and 63/561,654, filed on Mar. 5, 2024, all of which are incorporated by reference herein in entirety.

BACKGROUND

Tools based on Large Language Models (LLMs, which incorporate an attention mechanism) have demonstrated remarkable natural language processing capabilities mimicking human linguistic or reasoning functions. LLMs have been used to answer questions, translate and summarize documents, or create content, and have found applications in finance, legal scholarship, programming, and chatbots. However, the usage of LLMs as everyday tools has been limited for a variety of reasons, such as computational burden and undesirable artifacts.

Newer generations of LLMs have been steadily increasing in size, as denoted by the number of parameters encoded in their (typically) neural networks. It is generally accepted that, properly trained, a large LLM can outperform a small LLM. There have been recent reports that an LLM estimated to have roughly 1 trillion parameters scored in the $90^{th}$ percentile on a bar exam, as compared to $10^{th}$ percentile for its predecessor having "only" 175 billion parameters. However, a large LLM can require a cluster of computers to run. Inference time often scales as O(N), N being the number of parameters, so that obtaining a response to a client input incurs progressively increasing latency and computational burden as LLMs get larger. Training can take months for a trillion parameter model.

Large LLMs are also prone to artifacts, and can sometimes return responses which are inaccurate, biased, defamatory, or dangerous.

Accordingly, there is a need for improved technologies, for any of a wide range of applications, that can provide the benefits of language models with lower computational burdens and lower rates of artifact generation.

SUMMARY

In brief, the disclosed technologies perform copilot tasks, similar to those performed by contemporary large LLMs, using a microservice architecture incorporating small to mid-size trained machine learning (ML) tools (commonly LLMs) and other software modules. That is, while the examples below sometimes describe LLMs for clarity of illustration in view of common present-day usage, the disclosed microservice architecture and related innovations are not so limited. The microservices can have specialized functions and can be coupled in a network. Each microservice can be efficiently implemented and the overall architecture can be engineered to provide desired dataflows for handling client input in the context of tasks and knowledge domains for which the copilot has been trained, with each microservice invoked at appropriate points in the dataflow. The network architecture allows dynamic determination of dataflow according to details of an individual client input.

The relatively small size of incorporated LLMs can offer dramatically lower computational effort—for both training and inference—compared to competing large LLMs. Because of the lower computational effort, the disclosed technologies can be deployed on workstation or single-node computer systems with, in some examples, a single graphical processing unit (GPU), and can be customized for bespoke deployment according to the knowledge domains, data sources, data modes, and task types of various applications.

In some examples, multiple pretraining stages can be performed on an expansion LLM, employing diversity of objectives or data corpora, to expand the reach of a given client input so as to provide better responses to the client. In further examples, retrieval augmented generation (RAG) can be performed recursively to enhance the pool of documents or other data made available to a core microservice to address an instant client input. In additional examples, a data producer can perform translation of an input into an application programming interface (API) query by scoring a library of queries against the input, and selecting one or more API queries having high matching scores. In still further examples, a knowledge graph of a target domain can be pruned and used to test whether input or output data within a copilot is within the copilot's competence. In some examples, a core microservice can retain histories for multiple client entities in respective long-term memories.

The foregoing and other objects, features, and advantages of the invention will become more apparent from the following detailed description, which proceeds with reference to the accompanying figures.

DETAILED DESCRIPTION

Introduction

Figure 1A:
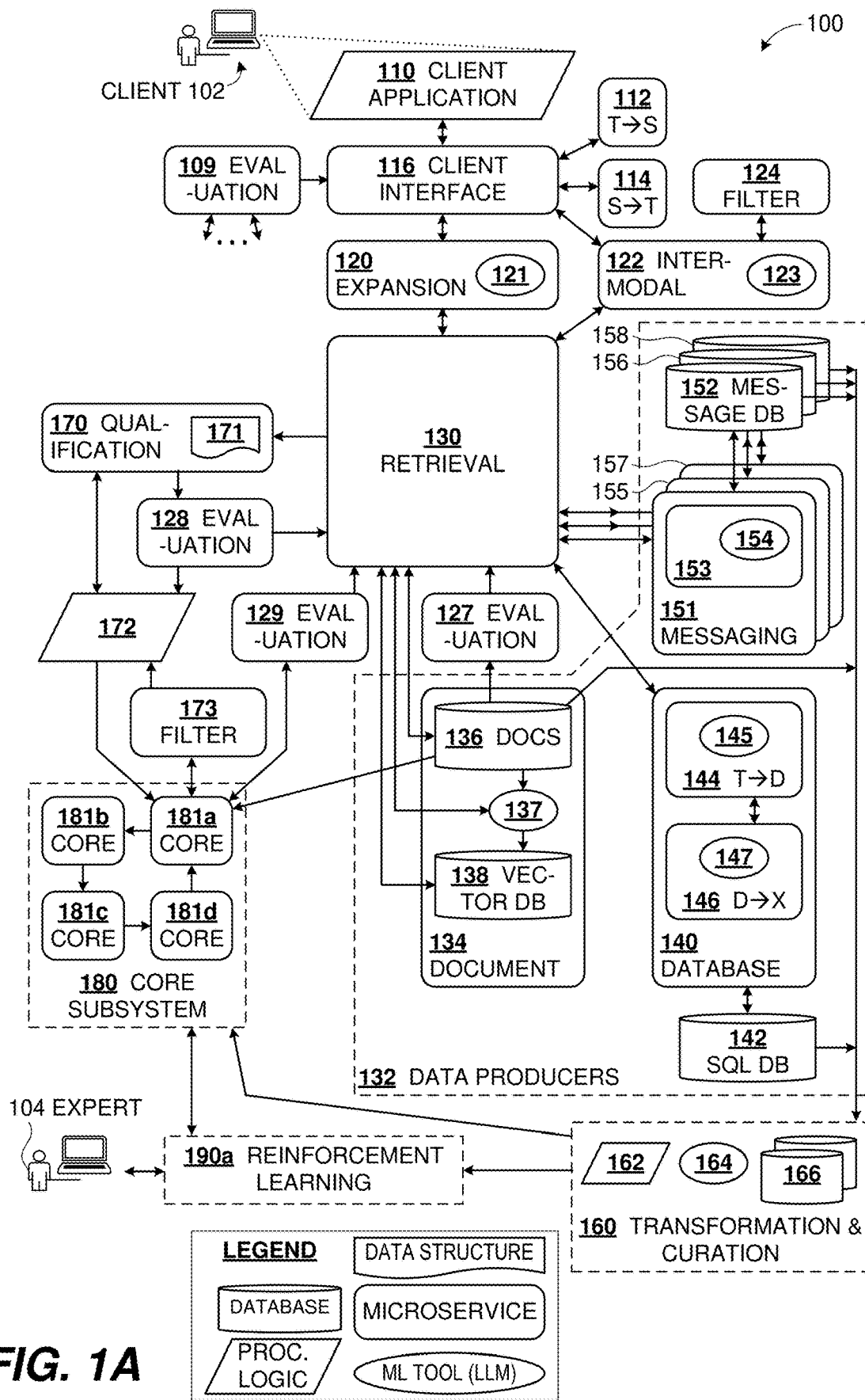
FIGS. 1A-1C together constitute a schematic diagram of an example architecture of a copilot according to the disclosed technologies.

Language models have made great strides in recent years, and have captured the imagination of the artificial intelligence community, businesses in many sectors, and the public at large. Unsurprisingly, a common mindset has been that bigger is better and, in particular, that emergent behavior can arise when models exceed some threshold size.

The development of language models has been spurred in part by the introduction of an attention mechanism for neural networks, allowing non-local gathering and propagation of information between e.g. neurons or layers of a neural network. Today, attention mechanisms are commonly provided in a variety of so-called "transformer" neural networks, but this is not a requirement, and similar features can be incorporated into other neural networks, such as a state-space model used by Mamba, or even into machine learning implementations other than neural networks.

1. Size and its Disadvantages

Size comes with penalties. For an LLM with N trainable parameters, the computational burden to process a given input into output (e.g. perform an inference) can scale as O(N). Furthermore, the computation burden (e.g. in flops) of training an LLM can scale as O(N·D), where D is an amount of training data. While D can be chosen independently of N, larger models often require more training data than small models. Illustratively, in some examples, D can also scale as O(N), meaning that the computation burden of training an LLM can scale as $O(N^2)$. Other types of ML tools can exhibit similarly unfavorable scaling.

Additionally, computer systems of greater complexity can be required to support large LLMs. A common architecture is based on a compute node incorporating a general purpose processor (so-called "CPU," for central processing unit) with one or more accelerators or coprocessors ("GPU"), which support parallel operations and are often graphical processing units. Multiple nodes can be coupled to form a "cluster."

As currently deployed, one GPU can support up to about 20 billion parameters, and one CPU can support about eight GPUs. Thus, known LLMs with 200 billion to 2 trillion parameters can require clusters with two to about thirteen nodes. Because transformers have long-range connectivity across neurons and layers, the performance of progressively larger LLMs can worsen discontinuously going from a one-GPU system, where passing data is local, to a multiple-GPU system, and again from a one-node system to a multiple-node system. That is, total computation time can be dominated by the time required for data communication rather than for compute operations. For these reasons, computation time can be worse, by a factor of 10 or more, than that predicted by O(N) scaling for inference or O(N·D) scaling for training.

2. Microservice Network Architecture and its Advantages

Innovative architectures disclosed herein utilize a coupled network of microservices, variously implemented as LLMs, other machine-learning tools, or procedural logic—the latter including rule-based or other program logic. Some examples of the disclosed technology incorporate numerous small LLMs (which can be run on one GPU), and one or a few mid-sized LLMs (which can be run on one node). While the description herein often refers to LLMs for reasons of current popularity and clarity of illustration, the disclosed innovations are not so limited. Many of the LLM implementations disclosed herein can be substituted by other trained ML tools. That is, descriptions of LLMs herein generally extend to other trained ML tools, in addition to LLMs.

A microservice network architecture has been found to exhibit emergent behavior and can provide performance comparable to competing trillion parameter models on some tasks for which it is designed. In one view, the microservice network as a whole can be greater than the sum of its parts—having cognitive functioning capabilities arising from the network organization of its constituent parts which are absent in any of those constituent parts.

At the same time, the microservice network copilot can provide significant benefits, as described further herein.

Reduced training time: Relative to a 1 trillion parameter competing product, the computational burden to train a disclosed 70 billion parameter core microservice is reduced by a factor of 200 (based on $O(N^2)$ scaling) to 2,000 (also accounting 10× for eliminated inter-node data communication overhead) or more.

Reduced inference time: Relative to a 1 trillion parameter competing product, the computational burden to train a disclosed 70 billion parameter core microservice is reduced by a factor of 15 (based on O(N) scaling) to 150 (also accounting 10× for eliminated inter-node data communication overhead) or more.

Improved performance of specialized functions: Decoupling specialized functions into respective microservices allows each microservice to be optimized and to perform that specific function better and more efficiently than a general-purpose large LLM for which the specific function is merely a small part of its overall functioning. As an analogy, a pen is suitable for writing a signature and a paint sprayer is suitable for painting a house. Just as it is difficult for one tool to do both signatures and house-painting, it can be difficult or inefficient for one large LLM to be effective at multiple specialized functions.

Administrative independence: Each microservice can be trained and maintained independently of other microservices, e.g. at different times, or on different computing environments. However, additional training of the assembled microservice network is not precluded.

Sequential operation: Because microservices can interact at the application programming interface (API) level, the microservices can be efficiently run sequentially on a small computer system, rather than requiring multiple microservices to run concurrently. However, parallel operation is not precluded, e.g. to support pipeline operation with multiple clients or to reduce latency.

Ease of modification: Individual microservices can be attached, detached, updated, or fine-tuned without having to re-train a large LLM.

Ease of customization: Because individual microservices can be trained in hours (e.g. less than one day), or even less than one hour, rather than months, it can be feasible to develop customized copilots for various applications. Various types of customization can be performed. In varying examples, customization can be performed for knowledge domain, training datasets, accessible data repositories, cognitive functions, supported tasks, modes of client input, levels of client authorization, perspective on the knowledge domain, or alignment goals.

Safety—bias, toxicity, or hallucination: Small LLMs can be safer than large LLMs, e.g. less prone to bias and toxicity. Moreover, a microservice network architecture allows safety mechanisms, such as bias and toxicity filtering, to be incorporated at specific positions in the network architecture to mitigate such undesirable artifacts at, or immediately following, the point or points where these artifacts may be introduced. In this way, filtering can be applied in a manner analogous to a local anesthetic at the point(s) of greatest need. In contrast, competitive large LLMs can require artifacts to be monitored and corrected from the outside, akin to a general anesthetic, applied indiscriminately. Still further, addressing artifacts in a competing large LLM can involve retraining, which can counteract the primary training of the large LLM, adversely affecting its performance for its intended purpose.

Another artifact, hallucination, refers to generation of erroneous answers (sometimes passing off fiction as fact). This can be difficult to detect, let alone correct, in the black-box architecture of competing large LLMs. In contrast, some examples of the disclosed microservice architecture introduce a qualification microservice to detect whether a client input lies within the competency of the microservice network. Particularly, this can be invoked effectively after client input has been digested and the projection of the client input onto the available knowledge corpus is known, but before e.g. any core microservice has acted to produce a client output. In contrast, a competing large LLM can be constrained to examine (i) raw client input, whose relationship to a knowledge corpus may not be well known or (ii) client output, which by design reflects an underlying knowledge corpus, and from which competency cannot be readily ascertained.

The inventors have tested an embodiment (dubbed "Thia") of the disclosed technologies. A set of test inputs (combined documents and text queries) was formulated by subject-matter experts in the aerospace domain, and the inventors verified that the test inputs or essentially similar inputs were not included in any training data of the underlying models. The test inputs were provided to (i) a version of Thia that was embedded in a corporate data environment, and to (ii) a comparative large LLM (GPT-4) having access to documents from the same data environment. Human evaluators were used to provide blind ratings of the outputs of Thia and GPT-4 for each input, along with qualitative feedback on what characteristics of the higher-ranked and lower-ranked output led to the ranking. In these tests, human evaluators ranked Thia outputs higher than GPT-4 outputs in over 93% of the test cases.

3. Copilot Applications

Various terms have gained popularity for LLM-based tools providing assistive language interfaces, including "agent," "assistant," "chatbot," or "copilot." In the art, each of these terms has seen varying usage to refer to tools having widely disparate capabilities. In this disclosure, the term "copilot" is used broadly for a software tool providing knowledge-based assistance to a user in the furtherance of some task. Thus, the scope of the term copilot encompasses, without limitation, question-answering systems, generative tools (e.g. new text, audio, video, or art), interfaces to machinery, education delivery, language translation, or other tasks. Some copilots can support one or more of these applications. Additionally or alternatively, a copilot can support other applications.

In some examples, a copilot can provide a conversational interface and can use LLMs or other language models to support interaction with a client, interaction with data repositories, or for other specialized functions. Copilots can interpret a client's input, analyze data, unify multiple sources of information, make decisions, and provide context-aware output.

A copilot can be specialized for specific tasks, specific knowledge corpora, or specific cognitive functions. The copilot can be trained to perform those specific tasks, with those knowledge corpora, or with those cognitive functions.

Some copilots can provide read-only access to data, but this is not a requirement and, in other examples, a copilot can be used to modify, update, or delete data responsive to client input.

Copilots can be deployed by enterprises (e.g. for internal use, or for use by customers or other partner organizations), in vehicles (e.g. automobiles, aircraft, ships, submarines, or spacecraft), by individuals (e.g. trained for personal finance or household automation, or as online avatars), or in other roles (e.g. air traffic control, monitoring physical sensors or communication networks for security or surveillance).

A customized copilot can consolidate diverse databases or stores of knowledge within an organization, reducing the problems often encountered in having information available where and when needed. At the same time, examples of the disclosed technologies can honor security protocols and maintain, by design, restricted access to sensitive data.

4. Retrieval Augmented Generation (RAG)

While a core microservice can be trained on a knowledge corpus to respond to inputs (e.g. answer queries) related to that corpus, better results can be achieved by providing the core microservice with relevant documents, alongside a client's input. Retrieval augmented generation (RAG) is one technique to augment the client's input. However, the applicant has found that a single RAG transaction may not return the most useful documents. Rather, the results of a first RAG request can be used to seed a second RAG request, thereby expanding a pool of returned documents which can be forwarded to the core microservice. This process can be iterated recursively. Often, such recursive RAG can converge to a finite set of documents associated with a client input. In other situations, recursive RAG can have a tendency to diverge, which can be controlled by enforcing limits on a number of RAG iterations or on a total amount of documents returned. The total number of documents can also be controlled by scoring the returned documents, e.g. a score indicating semantic similarity between a returned document and the client input, and retaining top-scoring documents at each RAG iteration, or over all iterations.

In particular, documents can be ranked and selected using a transformer neural network with a late interaction architecture. In such an architecture, an input (e.g. a client input, query, or input token) can be encoded independently of documents over multiple layers of a transformer neural network. Similarly, documents can be encoded independently of the input over multiple layers of another transformer neural network. These document encoding layers can be precomputed because they are not dependent on any query input. Finally, the encoded query input and the encoded documents can be coupled in one or more subsequent layers (dubbed "late attention layers") to obtain a single score for similarity between the query input and each document. One or more candidate documents can be selected based on having high respective scores.

5. Training of Expansion Microservice

Some disclosed copilots combine an expansion microservice with a retrieval microservice, which provide complementary functions to enhance a client input, so as to give a core microservice additional relevant information to work with in addressing the client input. The expansion microservice can expand a set of tokens present in the client input, and the retrieval microservice can augment each of the expanded set of tokens with associated documents, or other data obtained from various data producers.

An expansion microservice can be based on an LLM dubbed an expansion LLM, or on another type of trained ML tool. Some disclosed expansion LLMs can be trained using a plurality of pretraining stages, with cognitive functions or training datasets varying between successive pretraining stages. Superior results have been obtained using a same general training corpus with different cognitive functions in respective pretraining stages. To illustrate, a first pretraining stage can use a general corpus to optimize performance on an MLM task with randomly selected erasures, a second pretraining stage can use the general corpus to optimize performance on an MLM task with erasures limited to tokens having semantic content (in the copilot's knowledge domain) exceeding a predetermined threshold, and a third pretraining stage can optimize performance on a predetermined pretraining objective using synthesized training data, e.g. derived from a pruned knowledge graph. In varying examples, the knowledge graph can be derived from either the general corpus or from a training corpus specific to the copilot's knowledge domain. Facts extracted from a (pruned) knowledge graph can be used for pretraining. The knowledge graph can also be used to generate pairs (e.g. training input and a corresponding desired response) for any of a variety of tasks, and these pairs can be used for fine-tuning.

Training stages can be repeated and additional training stages can also be used. For example, the domain-specific corpus can be used to optimize performance for an MLM task. Diversity of cognitive functions, the combination of general and domain-specific corpora, or both together can improve the reach of the expansion LLM, which also improves the reach of the following retrieval microservice, and ultimately leads to improved results from the copilot (e.g. from a core microservice) as evaluated by human testers.

6. Data Producer Microservices

In many copilot deployments, available data may exist in other forms besides text documents. For example, an organization may have internal databases, message repositories, or a learning management system, each of which can contain information relevant to a copilot's knowledge domain despite not being in the form of common text documents. For example, an internal database may have tables of records, the fields of which can be of a variety of datatypes, and relational links between tables not easily represented in text form. Message repositories can have a mix of text data, non-text data, or metadata (e.g. sender; or relationships between messages in a chain) that can require handling different from a flat or hierarchical document store. Disclosed example copilots can implement data producer microservices which mediate between language- or text-based copilot microservices and the APIs supporting specialized data stores. A data producer microservice can be based on a trained ML tools such as an LLM or LMM. Training of such an ML tool can be directed to translation of inputs and outputs and categorization of data, to facilitate accurate data retrieval, rather than generation of responses to received inputs.

Such data producers can be tasked with generating and executing API queries based on received text input. Some conventional approaches to this task use natural language processing including LLM or other machine learning tools which are inherently text-centric. Such approaches can be computationally burdensome, both for training and inference. Furthermore, using black-box tools, they can sometimes generate API queries which look plausible but are in fact invalid. Examples of disclosed copilots take an API-centric approach, starting with a universe of all possible API queries (which can be modest in size), and generating matching scores (which can be computationally inexpensive) between the text input and some or all of the possible API queries. Such an approach can be guaranteed to deliver valid API queries, and can also be computationally inexpensive.

7. Qualification Microservice

Conventional LLMs' propensity to hallucinate can be attributed to various factors. Contributing factors can include: (i) training that prioritizes giving some answer (any answer!) over not giving an answer; (ii) lack of a defined domain of competence; (iii) presence of incidental data even in a corpus of documents or training data directed to a specific knowledge domain. Additionally, some existing techniques for mitigating hallucination rely on supplemental training, which can run counter to an LLM's primary training: a reduction in bad answers can be accompanied by an unwanted reduction in good answers. Such techniques are ad hoc, and have not been demonstrated to be reliably effective.

Some examples of the disclosed technologies take advantage of the fact that many copilot applications have bounded knowledge domains. Thus, data can be compared with a representation of this bounded domain to ascertain whether or not the data is within competency of a given microservice or copilot. In some examples, a corpus of documents can be transformed into a knowledge graph, which can be pruned to remove incidental data, or otherwise modified, while retaining knowledge relevant to an instant domain. The pruned knowledge graph can be compared with client inputs or microservice outputs within a copilot to ascertain whether such inputs or outputs are within the copilot's scope of competence. The copilot can be trained to decline client inputs (e.g. "I cannot help with that") in preference to providing responses outside its competence. With such a combination of strategies, hallucination can be effectively and reliably curtailed.

While knowledge graphs can be convenient in some applications, other techniques for representing knowledge domains can also be used, such as topic allocation using latent Dirichlet allocation.

These strategies can be implemented with a qualification microservice, which can be invoked at any of a variety of selected positions in a disclosed microservice architecture. Some example copilots can invoke a qualification microservice on data being directed to a core microservice (e.g. from a retrieval microservice) to keep the core microservice from being led outside its competence, or on data outputted from the core microservice to avoid delivery of results outside the copilot's competence. In other examples, a qualification microservice can be invoked on data directed toward a retrieval microservice. Qualifying outputs of an expansion microservice, an intermodal microservice, or a data producer can each help the retrieval microservice stay within the copilot's domain of competence as it performs augmentation of a client input.

Terminology

To facilitate review of the various embodiments, the following explanations of terms are provided. Several additional terms are explained at appropriate locations elsewhere herein. Occasionally, and where clear from the context, a term may also be used in a different meaning.

An "answer" is an output directed toward a client responsive to a client input and intended to satisfy or reject that client input. Some illustrative answers include "The answer is four." or "I cannot help you with that." In contrast, a "clarification" is an output directed toward a client, and responsive to the client input, which is intended not to satisfy the client input, but to narrow the possible scope of the client input. A clarification can be declarative (e.g. "I understand that you are asking about aircraft engines.") or interrogatory (e.g. "Are you interested in aircraft engines?"; "Are you interested in aircraft engines or something else?"; "Please select from one of these choices: (a) aircraft engines, (b) automobile engines, (c) locomotives, (d) something else"). A clarification sought by a given microservice with regard to an input received from a source microservice can be propagated backward along a sequence of invoked microservices through which the input was provided to the given microservice. In some examples, the clarification can be delivered to a client while, in other examples, the clarification can be provided an intermediary microservice along the sequence of invoked microservices. Any microservice can be configured to request clarifications as needed.

An "application programming interface" ("API") is a definition of requests (inputs) that are recognized by an application server and responses (outputs) that can be generated by the application server. An API can be specific to an application; however some APIs are widely used across a variety of similar applications. For example, the Structured Query Language ("SQL") is an API used by many database applications. Other database APIs, some of which are variants of SQL, include Amazon RDS (Relational Database Service), GraphQL, Gremlin, IBM DB2, Malloy, N1QL, PostGreSQL, PRQL (Pipelined Relational Query Language), or WebAssembly (sometimes dubbed "Wasm"). APIs can be implemented using any of a wide range of application layer protocols, non-limiting examples of which include FTP (File Transfer Protocol), HTTP (Hypertext Transfer Protocol), IMAP (Internet Message Access Protocol), NFS ("Network File System"), POP (Post Office Protocol), or SMTP (Simple Mail Transfer Protocol).

An "API query" is an input to an application which conforms with the application's API. An API query which is completely specified, e.g. having no variables, is dubbed an "API fully-qualified query." An API query having one or more variables (e.g. "GET SIZEOF (table)" or "FIND SUM (range)", where "table" and "range" are variables) is dubbed an "API query template."

An "attention mechanism" generates an output with weighted contributions from input tokens according to one or more keys. A key vector $K_i$ that closely matches a sequence of input tokens can result in a high weight $w_i$, while a poor match can result in a low weight. The weight $w_i$ for each key vector $K_i$ can be applied to a respective value vector $V_i$, and summed to obtain an output vector $O=\Sigma w_i \cdot V_i$.

"Casting" refers to an act of transforming data from one representation to another, while maintaining semantic content of the data. To illustrate, a binary numerical representation can be cast into a text string representation.

A "client" is a hardware or software computing entity that uses a resource provided by another hardware or software computing entity such as a copilot. A "client interface" is a software component within a copilot which receives input from or provides output to a client. Disclosed copilots can support one or more client interfaces. Often, client output is provided to a same client from which client input was received, but this is not a requirement. Some copilots can be used to mediate interactions between two distinct clients: language translation between two clients is just one example. Examples of the disclosed technologies can support additional client interfaces for management functions, including e.g. monitoring, human evaluation, human feedback, fine-tuning, supplemental training, updates, or other control.

A "cognitive function" is a language processing capability recognized in cognitive science. Non-limiting examples of cognitive functions include learning (e.g. understanding language content with the ability to apply knowledge outside its initial context), thinking (e.g. identifying thoughts within text or non-text material, or generating material encompassing thoughts), reasoning (e.g. logic or thinking organized step-by-step), theory of mind (e.g. ascribing mental states to communication partners or sources of material, so as to provide context and better understanding), pragmatic understanding (understanding language in its particular context), remembering, problem solving, decision making, and attention. The term "intelligence" can be used to refer generically to these or other cognitive functions. A common goal for LLMs and copilots is to demonstrate or mimic one or more cognitive functions. LLMs or other machine learning tools can be trained to optimize performance on tasks ("training objectives" or, for pretraining, "pretraining objectives") in order to elicit behavior that demonstrates or mimics a desired cognitive function. An example of a training task is a "masked language replacement function", sometimes known in the art as an MLM function, in which a portion of an input has been replaced with a blank ("masked") and the task is to replace the blank with its original text.

Within a copilot, a "core microservice" is a microservice whose function is to receive input and provide corresponding output which is of interest to a user at a client. Inasmuch as the intended audience of output from a core microservice is the user or client, a core microservice can be distinguished from other microservices whose intended audience is another microservice such as a retrieval microservice or a core microservice. The user or client focus of a core microservice does not preclude (i) iterative invocation of one or more core microservices or (ii) routing of a core microservice's output through other microservices such as qualification or evaluation microservices. Moreover, invocation of these other microservices can, in some instances, lead to all or part of the retrieval microservice's output being discarded or otherwise failing to reach a core microservice. In some examples, an ensemble of core microservices can cooperate.

A "corpus" is a collection of documents which contain knowledge of one or more domains. A "general corpus" is a corpus which illustrates use of a language but is not specific to any given target deployment. Non-limiting examples of generic corpora include: an encyclopedia, a library, or an archive of one or more publications. A "target-specific corpus" (or simply "target corpus") is a corpus which contains knowledge specific to a knowledge domain in which a copilot is, or is desired to be, proficient. Non-limiting examples of target-specific corpora include a corporate database; textbooks, publications, or other literature in the target domain; or proprietary documents (e.g. manuals, presentations, training materials).

A "CPU" (or, central processing unit) is a general-purpose computer processor, which can have one or more processor cores. The term CPU encompasses complex instruction set computer (CISC), reduced instruction set computer (RISC), specialized processors in the form of application-specific integrated circuits (ASIC), or embodiments in field-programmable gate arrays (FPGA). The term "GPU" (or, graphical processing unit) is used herein to encompass any accelerator or coprocessor, often providing parallel processing capability. A GPU is not limited to chips or coprocessors marketed as graphical processors. CPUs, GPUs, nodes, clusters, or other computing resources described herein can variously be implemented as stand-alone laptop, desktop, or workstation computers at a customer or client premises; at a data center; or in the cloud. The term "processor" encompasses CPUs and GPUs.

The unqualified term "data" refers to any digital representation of information.

A "database" is an organized collection of data maintained on computer-readable media and accessible by execution of instructions at one or more processors. Databases can be relational, in-memory or on disk, hierarchical or non-hierarchical, or any other type of database. Some databases support SQL as an API and are termed "SQL databases." Numerous other database APIs are known in the art and can be supported by disclosed technologies, including some known as "noSQL databases." Email and messaging applications can have specialized databases termed herein as an "email repository" or a "messaging repository" respectively. The database for a learning management application is termed a "learning management store."

In the context of dataflow for processing input from a client to generate output, the term "discard" refers to removing data from that dataflow, so that the discarded data does not contribute to the generated output. Discarding data does not require that the data be deleted. Discarded data can also be used for subsequent training, e.g. by reinforcement learning with or without human feedback.

A "document repository" is a collection of documents stored in computer-readable form. Insofar as a copilot is concerned with a knowledge domain, a document can contain information relevant to this knowledge domain. The information can be expressed in a language, which in some examples can be a language of human verbal communication, such as English or Esperanto, but this is not a requirement. In other examples, the language can be a visual language, such as art, graphics, or a sign language; or a computer programming language. A document can be an entire source document, such as an operating manual or a meeting transcript, or a chunk of such an application. In some examples, chunks of size 10-10,000 words, or 100-1,000 words, can be commonly used.

"Emergent behavior" refers to actions by a copilot, microservice, or LLM that demonstrate task performance indicative of cognitive functions that extend beyond tasks or cognitive functions for which the copilot, microservice, or LLM was trained. To illustrate, LLMs trained on MLM or prefix LLM can demonstrate reasoning as an emergent behavior. Factors promoting emerging behavior can include LLM size, a diversity of training objectives, or a network architecture of diverse microservices. To illustrate, a network of microservices of size S1, S2, S3 trained on respective tasks T1, T2, T3 can demonstrate emergent behavior at total size above a first threshold Sa, e.g. S1+S2+S3≥Sa. A single LLM successively trained on tasks T1, T2, T3 can demonstrate emergent behavior above a second threshold size Sb. In some examples, Sb>Sa. A single microservice trained on a single task T1 can also demonstrate emergent behavior above a third threshold Sc. In examples, Sc>Sb or Sc>Sa. Particularly, a network of microservices can exhibit emergent behavior not found in any single one of the microservices.

Within a copilot, an "expansion microservice" is a microservice whose function is to receive tokens of client input and provide additional related tokens. With these additional tokens, a retrieval microservice can gather additional documents. With the additional tokens or the additional documents, a core microservice can generate additional or improved responses. An expansion microservice can be implemented using a trained ML tool, such as an LLM, LMM, or DNN.

The term "expert," as a noun, refers to a human or a software tool able to provide responses deemed correct by another, independent, expert, for at least a predetermined percentage of test questions. The predetermined percentage can be in a range 50-99.9%, in some examples greater than or equal to 90%.

"Filtering" refers to an act of testing some data against a condition ("filter condition") and separating, or separately handling, the tested data according to whether the condition is met. Data meeting the condition can be designated as "conforming."

A "graph" is a set of two or more vertices and a set of one or more edges joining respective pairs of the vertices. Examples of the disclosed technologies can be implemented as a network of microservices which can be represented as a graph, with each microservice being a node of the graph, and directed edges indicating that a destination microservice can be invoked from a source microservice. A graph in which a path exists between every pair of vertices is a "connected graph." A directed graph is "weakly connected" if the underlying undirected graph (e.g. with all directed edges replaced with undirected edges between the same pair of vertices) is connected. To illustrate, a directed graph A→B←C is weakly connected because its underlying undirected graph A-B-C is connected. A weakly connected network of microservices means that the microservices can work together rather than in isolation.

An "index" is a collection of document identifiers organized by document features (e.g. representing semantic content), enabling retrieval of documents relevant to a given feature without searching the documents themselves. In some examples, the features can be vector representations of words, tokens, or other forms of semantic content in the document. A single document can have multiple features.

The terms "input" and "output" are respectively used to denote data provided to a copilot (e.g. from a client) or microservice, or data provided by a copilot (e.g. to a client) or microservice. Input can be in the form of one or more questions, instructions, task descriptions, language tokens, data in other modes (e.g. audio or images). Output can be in the form of one or more answers, acknowledgments, notifications, results, including language tokens or data in other modes. Output from one microservice can be provided as input to another microservice. Thus, output can take any of the forms of an input, or vice versa.

With regard to a procedure performed repeatedly, an "iteration" is one performance of that procedure. The iterated procedure can include invocation of a particular microservice. Commonly, an invocation of an iterated procedure starts with an "initial iteration" and ends with a "final iteration." The designation "initial" does not preclude performance of the procedure prior to the initial iteration in a distinct invocation of the procedure, and similarly there can be other invocations of the procedure after the final iteration of a given invocation. Repetitions of the procedure need not be identical. Commonly, values of parameters can vary from one iteration to the next and, consequently, branches and control flow can also vary. Particularly, a final iteration can exit out of an iterative loop without executing all instructions of the procedure. The iterated procedure can be associated with a "stopping condition:" a determination that the stopping condition is met results in no more iterations being performed.

The term "knowledge domain" refers to one or more subject areas of interest in a copilot deployment. The subject areas can be related to each other (e.g. engines and fuels), but this is not a requirement. In some examples, two disparate subject areas can be of interest to users of a copilot and can both be included in the copilot's knowledge domain.

Knowledge or data of the knowledge domain can be graphically represented, e.g. as a knowledge graph or in a multi-dimensional space in which vector representations of knowledge tokens are defined. A collection of points in the multi-dimensional space can define a volume in some or all of the dimensions of the space. The volume can be defined in various ways. In some examples, the volume can be required to be convex or free of voids, while, in other examples, the volume can be the smallest volume enclosed by a surface such that all the points are on the surface or interior to the surface. Further, in varying examples, voids within volumes can be allowed or not, the volume can be a composite of disjoint clusters, or the surface of a volume can incorporate concave portions. Such a volume of a knowledge domain can approximate a copilot's competency. At least due to limitations of finite corpora available for training or RAG, a copilot may not have perfect knowledge within this volume. Conversely, a copilot can often provide relevant responses for inputs that are close to but outside the volume. Accordingly, a copilot's competency can be regarded as gradually changing near the edges of the volume rather than having a sudden drop-off. In some examples, an "envelope" can be defined based on the volume, variously matching the surface of the volume, extending a predetermined amount outside this surface, or constrained to be inside the surface, in any combination. Such an envelope can be used to compare data inputs or outputs with a copilot's competency.

A "knowledge graph" is a graph data structure, e.g. having nodes and edges, representing some knowledge. In some examples, a knowledge graph can represent the knowledge of a domain (a "domain representation"), such as a corpus of documents or the knowledge domain of a copilot, but this is not a requirement: any collection of knowledge (e.g. a single document) can be represented as a knowledge graph. In examples, nodes of a knowledge graph can represent tokens or concepts, while edges of the graph can represent relationships between the nodes. Each graph edge can be directed and can be labeled according to the particular relationship the edge represents. This too is not a requirement, and other mappings between knowledge and nodes and edges of the graph can also be used. Generally, vector representations can be mapped onto a knowledge graph, e.g. onto a single node, a single edge, or a combination of an edge and the two nodes joined by that edge. Conversely, a knowledge graph can often be dissected into vector representations of its constituent edges and nodes. Knowledge graphs can sometimes be represented visually, e.g. as a "visualization," for example by mapping each node to a coordinate position in a two-, three-, or higher dimensional space. In examples, each node can be mapped to a coordinate position in a high dimensional space used for vector representations, and the resulting high dimensional map can be projected onto two dimensions for visual perception on a display screen.

A "large language model" ("LLM") is an implementation of a machine-learning technique incorporating an attention mechanism. The term language is a reflection of usage in the art; it does not imply any specific size, and is not a term of degree. Thus, while many LLMs include billions or even over a trillion trained parameters, but this is not a requirement. Some LLMs disclosed here in can be implemented in a size of about 500 million parameters, or even smaller. Thus, it can be useful to describe "small LLMs" under 20 billion parameters (which can be run on one GPU; often having 100 million to 20 billion parameters), "large LLMs" with over 160 billion parameters (which can be run on a multi-node cluster), and mid-sized LLMs from 20-160 billion parameters (which can be run on a single node). While LLMs are often implemented as transformer neural networks, this is not a requirement, and other machine-learning techniques can also be used.

A "large multimodal model" ("LMM") is a variation of an LLM configured to accept non-text input, e.g. audio or images, instead of or in addition to text. Descriptions of LLMs herein encompass LMMs.

A "learning management system" is a software application supporting education or evaluation of personnel. The learning management system can support content delivery, pupil records, testing, or other functions, and can be supported by one or more databases, each termed a "learning management store."

A "library" is a collection of objects. Non-limiting examples of the objects include documents, API queries, database records, or messages. Often, the objects in a library are of a same type.

"Live data" refers to data, accessible to a copilot (for example through a data producer microservice), which is updated independently of the copilot operation. For example, a data producer can have access to an email repository or messaging repository which automatically updates as emails or messages are sent or received. Similarly, staff of an organization can update the organization's databases as part of normal work, and these live databases can be available to a copilot. In contrast to live data, some conventional tools can take periodic snapshots of a live database, and import these snapshots into a copilot environment—such snapshots are not live data. Access to live data allows a copilot to seamlessly provide up-to-date responses to client inputs.

"Machine learning" (or "ML") denotes a technique for improving performance of a software tool through experience (dubbed "training") without additional improvement to (captive) procedural logic of the software tool. A neural network is an example of a software tool that can be trained by machine learning. A trained machine learning tool can include trained parameters, logic dubbed "captive procedural logic" to perform calculations on input data using the trained parameters to obtain output data, and supervisory program code (dubbed "auxiliary procedural logic") to manage input and output interfaces, activate the calculations, update trained parameters, collect or provide diagnostic information, or perform other tasks.

A "microservice" is a software implementation of a specific function operating in conjunction with other microservices performing respective functions.

"Mode" refers to a type of data encountered as input or output. Common modes in disclosed copilots include text (including language tokens), speech, other audio, images, multimedia. Other modes can include software source code, documents in various formats, database tables, symbol sequences (e.g. for a communication protocol), or various metadata. Internally, a copilot can also support additional modes for communication between microservices, e.g. for task descriptors or signaling. "Multimodal" refers to a software module supporting two or modes of data. In varying examples, a multimodal module can receive input in one mode and provide output in a distinct mode; or can receive inputs in two distinct modes; or can generate outputs in two distinct modes.

A "neural network" is an artificial network of "units" (or "cells") that has linkages modeled on behavior of biological neurons and that can be implemented by a software program on a computer. A neural network is an example of a machine learning tool. Some neural networks described herein can be "transformer neural networks" (or simply "transformers") which have couplings between cells independent of the spacing between the cells. Transformer neural networks variously use stages labeled "encoder" or "decoder." Both encoders and decoder stages incorporate an attention mechanism for coupling tokens with each other. Attention in a decoder can be restricted such that generation of a given token can only use (attend to) preceding tokens. In an encoder, generation of a given token can attend to both preceding and following tokens. Empirically, encoders are found to perform well in classification tasks, e.g. by learning word embeddings. Decoders are found to perform well in text generation, e.g. in answering questions. Some LLMs of interest herein combine encoder and decoder stages. An "encoder-decoder transformer neural network" includes one or more (often three to twenty) encoder stages followed by one or more (often three to twenty) decoder stages. Some neural networks described herein can be deep neural networks ("DNN"s) having multiple layers of cells between an input layer and an output layer. Alternatives to LLMs include structured state space models (SSM), and related recurrent neural networks (RNN, a form of DNN) and convolutional neural networks (CNN). State space models implement intermediary latent spaces to maintain state, and can offer similar benefits as attention mechanism in LLMs. For example, such models can be used to implement an expansion microservice or a core microservice. RNNs, decision trees, random forests, or long short-term memory (LSTM) are further examples of trained ML tools which can be used to implement e.g. portions of a core microservice or an evaluation microservice.

"Procedural logic" refers to logic operations which can be specified by instructions in a programming language (which can be machine opcodes, assembly instructions, or a high-level programming language, including a hardware description language such as VHDL) and is distinct from data on which those instructions operate. Procedural logic can also be implemented in hardware (e.g. specified by VHDL) by gates coupled to perform operations similar to those of software instructions. Machine learning tools can incorporate captive procedural logic to process inputs into outputs, and auxiliary procedural logic for auxiliary tasks. Captive or auxiliary procedural logic are particular examples of procedural logic. Procedural logic that is not part of an LLM or other machine learning tool (e.g. other than captive or auxiliary procedural logic) is sometimes referred to as "freestanding procedural logic" herein.

The term "receive" refers to an act of getting information at a microservice or other software component from another microservice, software module, or client. Similarly, the term "transmit" refers to an act of conveying information from a microservice or other software component to another microservice, software module, or client. In varying examples, receiving or transmitting can be performed by communication over a bus or network, by message passing (including parameter passing between microservices, e.g. on a call stack), by use of a shared memory location, or by another technique.

"Recursive" refers to an iterated procedure for which results of one iteration are used by another iteration of that procedure. Input to the subsequent invocation can include other data in addition to the prior results.

Within a copilot, a "retrieval microservice" is a microservice whose function is to receive input and provide, as output, documents or other data relevant to that input. The intended audience of output from a retrieval microservice is a core microservice. This core microservice focus does not preclude (i) iterative invocation of the retrieval microservice or (ii) routing of a retrieval microservice's output through other microservices such as qualification or evaluation microservices en route to a core microservice. Moreover, invocation of these other microservices can, in some instances, lead to all or part of the retrieval microservice's output being discarded or otherwise failing to reach a core microservice.

"Similarity" refers to a quantitative measure of likeness between two objects. Illustratively, cosine similarity can be used between vector representations of two tokens or documents, or between a text input and an API query. However, this is not a requirement and other measures can be used. While "similarity" is often used with reference to two like objects, a related term "matching score" can be used to refer to a measure of likeness of semantic content of two objects, which can be of same or different forms. For example, a matching score can indicate whether an API query has semantic content close to a text input provided to a data producer. By way of illustration, the text input and the API query can both be transformed into a vector representation (e.g. a word embedding), and a cosine similarity between these two vector representations can be used as a matching score. In some examples, a data producer can receive non-text input (e.g. audio or image), and a matching score can be generated between such non-text input and a given API query. Another related term "distance measure" refers to a quantitative measure of the difference between two objects having representations in a common space. Distance measure and matching score can be complementary. Thus, two objects having a distance measure of zero are identical; two objects having a small distance measure can be similar or can have a high matching score; and two objects having a large distance measure can be dissimilar or can have a low matching score.

A "target" is a use case for a deployment (the "target deployment") of an innovative copilot. A target can be associated with one or more knowledge domains ("target domain"). "Customizing" can refer to configuring (e.g. by training) a copilot to be proficient in the target domain.

"Text" refers to representations of words (e.g. "microscope"), or printable characters (e.g. "02.03.2024"), which convey semantic meaning.

A "token" is a unit of language, which can be a word, number, phrase, or other representation of semantic content in the language. The language can be a language of human verbal communication, but that is not a requirement. To illustrate, in a visual language of art or graphics, a red rectangle or a face can be a token. A token of a human communication language (e.g. English) can be represented as text, audio, image, or in another mode. To illustrate, a red patch in an image can represent "red." Commonly, closeness between two vector representations can be an indication of closeness of their underlying semantic content.

A "vector representation" is a representation of a language token in a multi-dimensional obtain vector representations of language tokens.

Training

Training of a machine learning tool such as an LLM can be performed in stages. Generally, a unit of training data inputted to the tool during training can have a desired output, known as a "desired response." Training data can also be annotated. The annotation is known as a "label." In some examples, a label can be the desired response while, in other examples, the label can be a hint that assists the machine learning tool in classifying or otherwise processing the unit of training data without specifically being the desired response.

"Pretraining" stages can be performed without explicitly labeling data or providing any desired response. Rather, the desired response can be automatically extracted from inputted training data. To illustrate, a pretraining stage can train a tool to perform a masked language modeling (MLM) task, e.g. recovering a data erasure. Thus, given an input "the car is blue", a pretraining phase can automatically erase a word from the input and use the erased word as the desired output. Thus, the tool can be trained, inter alia, to respond with "car" for MLM input "the * is blue". Other tasks can be similarly used for pretraining. In a next word prediction task ("prefix LM"), the tool can be trained to respond with "blue" for input "the car is". Training data used for pretraining can be in the form of complete documents or a corpus of multiple documents.

"Fine-tuning" refers to one or more optional additional training stages that can be performed to customize a machine learning tool (e.g. a neural network, LLM, microservice, or copilot) for a particular target deployment or to update the tool subsequent to initial deployment. Training data used for fine-tuning can be organized as records, each having a "training input" which is to be provided as input to the tool and a "desired response" (e.g. a label) against which output of the tool can be measured. However, this is not a requirement, and fine-tuning can also be implemented using similar (unlabeled) data and tasks as a pretraining stage. Fine-tuning can be generic, e.g. training a tool to perform a particular task in a domain-independent fashion, or can be targeted to a specific knowledge domain.

Any training stage can improve or optimize performance on a given task. In addition to MLM and prefix LM, non-limiting examples of common training tasks include question-answering (multiple choice or closed-book), sentence completion, sentiment analysis, word sense disambiguation, coreference resolution, or natural language inference (e.g. determining whether an inputted hypothesis is true, false, or indeterminate).

A trained tool can provide output that matches or is similar to the desired response on at least a predetermined fraction of test inputs. To illustrate, a training input can be "what color is the car?" and the desired response can be "blue."

"Incremental training" refers to a training stage following an earlier training stage. Given a set of changes (either modifications or additions) to the training dataset used for the earlier training stage, incremental training uses the set of changes to perform additional training, e.g. of an LLM or other machine learning tool. In some instances, the set of changes can be small compared to the training dataset. To illustrate, the term incremental training can be used when the set of changes is less than a predetermined limit of e.g. 5%, 10%, 20%, or 50% of the training dataset used for the earlier training stage, measured e.g. in documents, megabytes, tokens, or another unit. Furthermore, example copilots can perform incremental training when the set of changes reaches a predetermined threshold, which can be in a range from 1% to the predetermined limit. Incremental training can be applied to pretraining, fine-tuning, or both.

Training records can be created in various ways. In some examples, both training input and desired response can be created by a human expert. In other examples, a software tool can extract training inputs (e.g. questions) or desired responses (e.g. answers) from a document or corpus of documents, and a human expert can provide complementary desired responses or training inputs. In further examples, a software tool can generate both training inputs and desired responses, in which case the training data is said to be "synthesized." The software tool can be an LLM based tool, but this is not a requirement, and other question and/or answer generating tools can be used. In examples, synthesized training data can be screened by a human expert, often with considerably less effort than required to generate the desired responses or the training inputs without assistance.

Figure 1B:
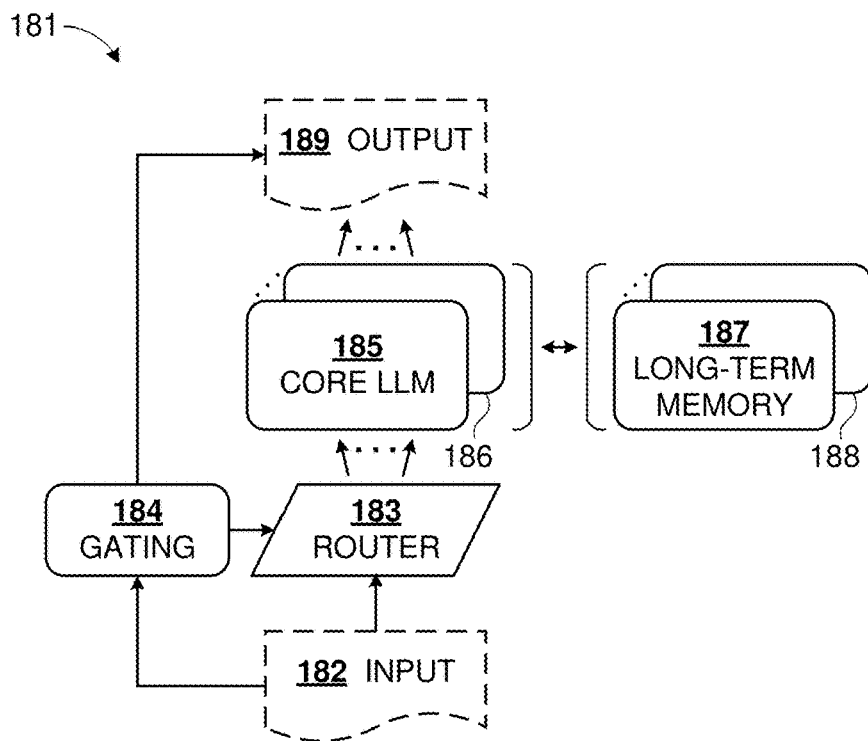

Training can be performed at multiple levels, e.g. on a single LLM or machine learning tool; individually for each LLM in a mixture-of-experts or ensemble of LLMs; collectively on the mixture-of-experts or ensemble; on a cluster of microservices such as a retrieval microservice and one or more associated data producers; or on a complete copilot similar to that illustrated in FIGS. 1A-1B. Commonly, training can be performed bottom-up, starting with smaller tools and proceeding to successively larger tools, but this is not a requirement. Particularly fine-tuning updates can be performed on one or a few microservices without necessitating additional training of larger units or an entire copilot.

In examples, some domain-specific pretraining or fine-tuning stages can be customized to particular levels of client authorization, leading to variants of a given trained microservice.

A copilot can incorporate a capability to trace dataflow and internal data as the copilot acts on a given client input. Such a tracing capability can assist in identifying performance levels of various microservices and lead to focused fine-tuning of an underperforming microservice. The disclosed microservice architecture lends itself to debugging or continual improvement in this manner because the internal data passed between microservices can be intelligible to a human analyst. In a competing large LLM approach, while activations can in principle be traced, no systematic approach is available for using such activations to identify focus areas for remedial training. Any microservice can be instrumented with an API allowing restricted access by developers to monitor performance, adjust configuration of the microservice, or apply additional training.

Example Architecture

Figure 1C:
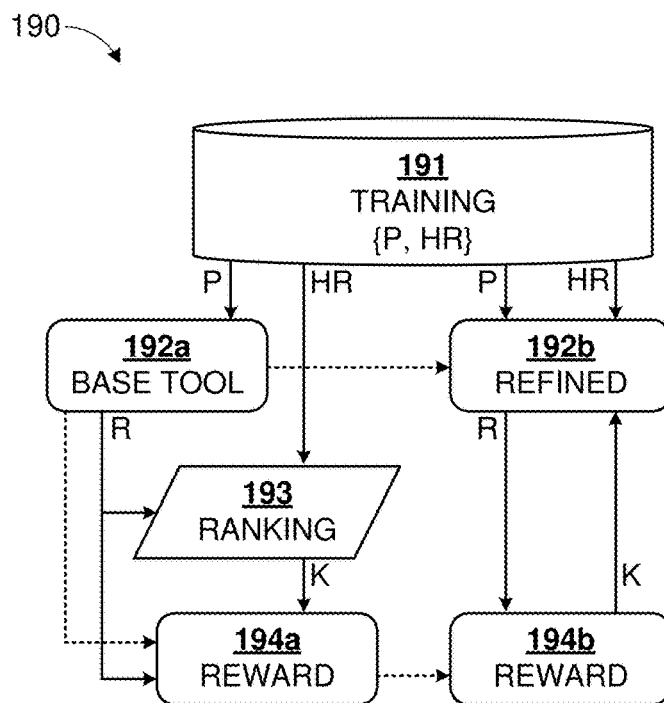

FIG. 1A is a schematic diagram 100 of an example architecture of a copilot according to the disclosed technologies. Shown in FIG. 1A is a network of modules implementing respective microservices, with arrows showing some possible communication paths among the microservices. This architecture is exemplary. Any given embodiment can omit certain modules or paths, incorporate other modules of paths, or implement other variations. The illustrated microservice network can be configured to implement a copilot serving one or more client applications, with capabilities for certain tasks comparable to or exceeding those of much larger, slower, and power-hungry competitive architectures. FIGS. 1B-1C are insets providing a detailed view 181 of a core microservice 181a-181d and a detailed view 190 of reinforcement learning subsystem 190a respectively. A legend in FIG. 1A shows the shapes used for microservices, databases, other data structures, procedural logic ("Proc. Logic"), and trained ML tools (some of which can be LLMs). As described further herein, additional or different entities can be implemented. In varying examples, certain microservices within which an ML tool is shown may also include procedural code which is not shown; procedural logic can be substituted for a depicted microservice; or more than one microservice or ML tool can be implemented where one is shown. For conciseness of illustration, short-hand labels are used in FIGS. 1A-1C.

Each microservice operates by receiving input, performing a specialized function on that input to obtain an output, and transmitting that output. The microservices can variously operate based on an LLM, on another trained machine learning tool, or on freestanding procedural program logic. Input can be received from a source such as another microservice or a client. Output can be transmitted to a destination such as another microservice or a client. Client application 110 can be run on computing hardware of client 102.

In some instances, a microservice can transmit output to the source from which it received input. In other instances, the microservice can transmit output to a destination different from the source. In further instances, the microservice can transmit multiple outputs to respective destinations, one of which can be the source. To illustrate, invocation of microservice A can initially invoke another microservice B, meaning that A transmits a first output to B. Later, when microservice B and perhaps other microservices have completed and transmitted their outputs eventually reaching A, microservice A can transmit another output responding to its source.

A microservice can invoke none, one, or more than one, microservice. In varying examples, a microservice can perform its specialized function upon receipt of inputs from one, two, or more distinct sources.

In some examples, microservice invocations can be stacked, as in a software call stack, so that as each microservice completes, control returns to its caller (source), but this is not a requirement. In other examples, event-driven or non-blocking paradigms can be used. Microservice A can invoke microservice B and can terminate, or continue, without waiting for microservice B to complete. In further examples, a mix of these or other types of flow control can be used.

Among other microservices, FIG. 1A illustrates expansion microservice 120, retrieval microservice 130, core microservices 181a-181d, and evaluation microservices 109 and 127-129.

1. Expansion Microservice and ML Tool

Expansion microservice 120 can be configured to receive first input incorporating one or more language tokens, e.g. derived from a client input, and determine one or more substitute or additional tokens associated with the received language tokens. To illustrate, an input token "lunch" can variously spawn additional tokens such as "time," "calendar," "break," "policy," "restaurant," or "recipe," any of which could be relevant to the client's intent, albeit absent in the client's actual input. Expansion microservice 120 can incorporate or be coupled to trained ML tool ("expansion tool") 121, which can be an LLM.

Separating expansion tool 121 from other ML tools or microservices in the copilot architecture enables efficient training of a small ML tool for the expansion function, which can be easily customized or fine-tuned for a particular deployment. To illustrate, "calendar" could be an important token in one deployment, but irrelevant in another deployment. Customized training of tool 121 enables a copilot deployment according to the disclosed technologies to produce high quality output with less computational effort than competing architectures.

Moreover, removing the burden of tool 121's functionality from other microservices in the copilot architecture enables those microservices to be implemented more compactly and efficiently as well.

Numerous variations and extensions can be implemented within scope of the disclosed technologies. In varying examples, expansion microservice can perform expansion variants such as standardizing word forms (e.g. "ran," "running"→"run"), replacing synonyms ("fine," "excellent") with standard terms ("good"), splitting ("lunchtime-"→"lunch" and "time"). Alternatively, each of these variants can be performed by separate microservices, in any combination.

In examples, expansion microservice 120 can transform a user's query into smaller, more specific questions. Expansion microservice 120 can convert user inputs into well-formatted and targeted tasks to be delivered to core microservice 181a.

Expansion tool 121 can be constructed from an encoder-decoder transformer based neural network. Flan-UL2 is an example of a suitable base transformer neural network.

2. Intermodal Microservice and LMM

Some examples of the disclosed technologies can implement intermodal microservice 122 to support modes of client input other than text.

Intermodal microservice 122 can be configured to receive second input, which can be derived from client input and can contain one or more tokens, which can be audio inputs, images, or video. Intermodal microservice 122 can determine one or more language tokens from the second input, for example using an intermodal LMM 123. A second output comprising these language tokens can be transmitted.

Numerous variations and extensions can be implemented within scope of the disclosed technologies. In some examples, client input can contain non-text data and intermodal microservice 122 can be invoked from client interface microservice 116. Second output from microservice 122 can be returned to client interface microservice 116 to be forwarded to expansion microservice 120. In other examples, non-text data objects can be encountered during retrieval augmented generation (RAG) by retrieval microservice 130, and intermodal microservice 122 can be invoked from retrieval microservice 130. In such instances, language tokens (second output) can be returned to retrieval microservice 130, or can be conveyed to expansion microservice 120 for expansion just like any text-mode input. Other connectivity between intermodal microservice 122 and data producers or core microservices can also be provided. Multiple intermodal microservices 122 or multiple intermodal LLMs 123 can be provided, e.g. for respective classes of non-text data.

Similarly, other intermodal services can be implemented to generate client output in modes other than text for some applications. To illustrate, speech output can be beneficial in e.g. automotive, mobile, or public-announcement applications where a user's visual attention may be occupied or where a visual display is not available. Non-text visual outputs can be beneficial for e.g. status or alarm notifications, charts, diagrams, or other visualizations.

Thus, intermodal microservices 122 can process visual, audio, or text data, enabling a copilot to interpret audio or visual input as text, or generate audio or visual output from text.

In some examples, intermodal microservices 122 can handle all non-text input. In other examples, specialized client-side microservices 112, 114 can be implemented. As shown in FIG. 1A, speech-to-text service 114 ("S→*T") can process client speech to provide text from client interface 116 to the copilot. Conversely, text-to-speech service 112 ("T→S") can process text outputted to client interface 116 into speech.

Supporting multiple input or output modes in a competing large LLM can be a significant burden, Removing the burden of LLM 123's functionality from other microservices enables those microservices to be implemented much more compactly and efficiently.

Moreover, and similar to expansion microservice 120 or expansion LLM 121, separating intermodal microservice 122 from other microservices or LLMs enables efficient implementation and training of an intermodal conversion function, which can be easily customized or fine-tuned for a particular deployment. To illustrate, two intermodal LMMs 123 can be trained for respective speakers' voice or vocabulary, while another intermodal microservice can be trained to generate a particular type of visual output without wasting effort on other types of output that may not be required in a particular application. Customized training of intermodal LLM such as 123 enables a copilot deployment according to the disclosed technologies to produce high quality input or output conversion with less computational effort than competing architectures.

3. Retrieval Microservice and RAG

Retrieval microservice 130 can be configured to receive third input, which can include or be based on output from expansion microservice 120 or intermodal microservice 122. Retrieval microservice 130 can perform a function of retrieving data relevant to the third input. Retrieval microservice 130 can perform this function by invoking other microservices dubbed "data producers" (collectively 132), examples of which are described further herein. The retrieved data can be used to augment the received third input, thereby facilitating still other microservices such as core microservices, described further herein, to efficiently generate high-quality outputs for respective inputs (e.g. the third input), which ultimately derive from an original client input. The generation of augmented input by data retrieval is termed "retrieval augmented generation" herein.

Accordingly, retrieval microservice 130 can retrieve one or more data objects related to the third input from one or more of data producers 132, and can use these data objects to augment the third input so as to obtain fourth output, which can be transmitted toward one or more of the core microservices.

Numerous variations and extensions can be implemented within scope of the disclosed technologies. In examples, retrieval microservice 130 can be further configured to repeat the RAG, based in part on the retrieved data objects or further successively retrieved data objects, until a termination condition is met. An evaluation microservice, similar to 127 or 128 and as described further herein, can be invoked to assist in making the determination whether to further iterate the RAG.

In some instances, the evaluation microservice can determine that one or more of the retrieved data objects are sufficient to accurately respond to the third input, and no invocation of core microservices 180 is required. To illustrate, a client input can be directed to finding what time a plane flight departs. The answer to this question could be contained in a retrieved document or database object. In such case, a response to the third input can be returned toward the client directly from the evaluation microservice or retrieval microservice 130.

In examples having a plurality of data producers 132, retrieval microservice 130 can determine which data producer(s) (e.g. 134, 140, 151, 155, 157) to invoke for retrieval of data objects. Successive RAG iterations can invoke different data producers 132. For example, data objects retrieved from messaging microservice 151 can be used to perform RAG using database microservice 140, or vice versa. Data objects retrieved from messaging microservice 151 or database microservice 140 can be used to perform RAG using vector index 138 of document repository 136, or vice versa.

In varying examples, retrieval microservice 130 can be implemented with an LLM, another trained ML tool, or freestanding procedural logic, in any combination.

In some examples, retrieval microservice 130 can vectorize received input (e.g. third input or retrieved data objects) and can search various databases to retrieve relevant data objects. The data retrieved from these databases can be passed to a core microservice to provide context and domain information to assist in efficiently determining accurate output for the third input. As described herein, retrieval microservice 130 can invoke additional microservices to assist with its tasks.

4. Data Producer Microservices

Examples of the disclosed technologies can utilize a wide range of data repositories for RAG. Microservices 134, 140, 151, 155, 157 supporting retrieval of relevant data objects from these repositories are dubbed "data producers" (collectively 132) herein. The next few sections describe exemplary data producers 132, which also include generic data producer 157.

The repositories available to the data producers 132 can have zero overlap with, partial overlap with, or can be identical to: data used to train e.g. core microservices 181a-181d described herein. In examples, RAG can enable a core microservice 181 to reach beyond its training in generating outputs relevant to a client input. Moreover, these repositories and their associated microservices can be maintained and updated independently of core microservices 181a-181d, enabling capabilities of a copilot to advance without any fine-tuning or supplemental training of core microservices 181a-181d.

Inasmuch as core microservices 181a-181d can implement LLM variants tailored to respective levels of client authorization, data repositories accessed by data producers 132 or retrieval microservice 130 can also be segregated or nested into variants according to the levels of client authorization.

5. Embedding Microservice and Document Microservice

Some examples of the disclosed technology can use vector embedding to find relevant documents in a vector-indexed document repository. That is, retrieval microservice 130 can invoke embedding microservice 137 to determine relevant vector word embeddings. A document microservice 134 can be used to map these word embeddings to relevant documents using a vector index 138, and the identified documents can be retrieved from the document repository 136.

Embedding microservice 137 can be invoked on fifth input, from retrieval microservice 130, which can be based on the third input (e.g. on a first RAG iteration), or on subsequently retrieved data objects (e.g. on a subsequent RAG iteration). Upon receipt of the fifth input, embedding microservice 137 can determine and transmit, as fifth output, one or more vector embeddings representative of at least portions of the fifth input.

Document microservice 134 can be invoked on sixth input, which can include or be based on the fifth output. Upon receipt of the sixth input, document microservice 134 can identify and transmit one or more documents having content similar to at least portions of the sixth input.

Numerous variations and extensions can be implemented within scope of the disclosed technologies. In some examples, document microservice 134 can be invoked from embedding microservice 137 while, in other examples, vector embeddings can be returned from embedding microservice 137 to retrieval microservice 130. In further examples, the vector embeddings can be provided to core microservices that have been trained on vector embeddings, or can be provided to other data producers 132 which also maintain respective vector indexes.

In varying examples, embedding microservice 137 can be implemented with an LLM, another trained ML tool, or program logic, in any combination.

Documents can be encoded in terms of dense vectors to create searchable vector databases 138. In examples, document microservice 134 can be constructed using a sentence transformer LLM configured to convert sentences of the document into 768-dimensional dense vectors. Such an LLM can group similar documents into the same clusters and can support semantic search.

6. Database Microservices

Some examples of the disclosed technology can use a database microservice to find relevant data objects stored in one or more databases. Exemplary databases can be relational or other table-oriented databases. The databases can be SQL databases or no-SQL databases. A wide range of databases can be integrated into the disclosed copilot architecture. The returned data objects can be used for RAG by retrieval microservice 130.

Database microservice 140 can be invoked on seventh input, from retrieval microservice 130, which can include or be based on the third input (e.g. on a first RAG iteration), or on subsequently retrieved data objects (e.g. on a subsequent RAG iteration). Upon receipt of the seventh input, database microservice 140 can retrieve database objects relevant to the seventh input from one or more databases 142. Database microservice 140 can determine and transmit a seventh output including or based on the retrieved database objects.

Numerous variations and extensions can be implemented within scope of the disclosed technologies. A database indexing microservice can be configured to generate or maintain at least one index from the one or more databases. Retrieval of the database objects can be efficiently performed using the at least one index. In some example, each database 142 available to database microservice 140 can have its own distinct index while, in other examples, a common index can be maintained across multiple databases 142. In varying examples, a copilot architecture can implement a plurality of database microservices, each supporting one or more respective databases or database types.

In some examples, data objects returned can be returned in a form similar to that stored in the databases. To illustrate, a data object can be returned as the value of an individual field in a database table, which can be an atomic datatype such as a string or number, a data structure, a document stored in that field, or a link to any of these. As another illustration, a data object can be returned as a record (e.g. a row of a database table), a column, or other subset of a database table or view. The returned data objects can further include identifiers of the database, table, records, or columns where they are stored, or other indicators enabling providing traceability of the data objects.

In other examples, database microservice 140 can process retrieved data objects to return seventh output in the form of a document. Such processing can include text formatting, conversion of non-text database objects to text, generation of sentence- or paragraph-style text, or charts providing graphical visualization of the retrieved database objects.

In some examples, database microservice 140 can invoke a text-to-SQL microservice 144. Text-to-SQL microservice 144 ("T→D") can translate part or all of the seventh input (e.g. questions generated by expansion model 120) into one or more SQL queries. These queries can be used to retrieve the database objects from an SQL database in real-time. In some examples, microservice 144 can obtain an SQL query by scoring a library of SQL queries against the text input, similar to the method of FIG. 7 herein. In other examples, text-to-SQL microservice 144 can utilize LLM 145, which can be constructed based on instruction-tuning an LLM such as Mistral-7b on a mixture of proprietary and open-sourced datasets.

In some examples, database microservice 140 can invoke a table-to-X microservice 146 ("D→X"), where X can be text ("T") or another mode. Microservice 146 can generate textual statements based on data or tokens extracted from retrieved tabular database data objects. Microservice 146 can utilize LLM 147, which can be constructed based on a GPT-type model trained for generation of coherent natural language responses from a database table, fine-tuned with domain specific datasets. In variations, LLM 145 or 147 can be implemented as another type of trained ML tool.

Microservices 144, 146 can also communicate with each other as shown, for feedback or evaluation. To illustrate, database data producer microservice 140 can implement an internal evaluation module, to determine whether the X output of microservice 146 is an appropriate response to the T input received by microservice 144.

7. Messaging Microservices

Some examples of the disclosed technology can use a messaging microservice to find relevant message objects (e.g. messages or metadata) stored in one or more message repositories. Exemplary message repositories can store email, voicemail, text messages (e.g. compliant with Short Message Service, known as "SMS"), instant messages, video messages, multi-mode messages, or attachments thereto, along with corresponding metadata. A wide range of message types or messaging applications can be supported. Returned message objects can be used for RAG by retrieval microservice 130.

The content of a message repositories can share some attributes of database tables and some attributes of documents and, accordingly, messaging microservices can be implemented separately from a document microservice or a database microservice. Various message repositories can have similarities with each other. Below, messaging microservice 151 for emails is described. FIG. 1A also shows messaging microservice 155 which supports Slack® messages. Slack® microservice 155 and generic data producer microservice 157 can provide access to repositories 156, 158 respectively. Features and operation of microservice 155 can be similar to those of microservice 140 or 151, and are not described further.

Messaging microservice 151 supports email and is described further. Messaging microservice 151 can be invoked on eighth input, from retrieval microservice 130, which can include or be based on the third input (e.g. on a first RAG iteration), or on subsequently retrieved data objects (e.g. on a subsequent RAG iteration). Upon receipt of the eighth input, messaging microservice 151 can retrieve message objects relevant to the eighth input from one or more message repositories 152. Messaging microservice 151 can determine and transmit an eighth output including or based on the retrieved message objects.

Numerous variations and extensions can be implemented within scope of the disclosed technologies. A message indexing microservice can be configured to generate or maintain at least one index from the one or more message repositories 152. Retrieval of the message objects can be efficiently performed using the at least one index. In some example, each message repository 152 available to messaging microservice 151 can have its own distinct index while, in other examples, a common index can be maintained across multiple message repositories 152.

In some examples, messaging microservice 151 can invoke a query adaptation microservice 153. Query adaptation microservice 153 can translate part or all of the eighth input (e.g. questions generated by expansion model 120) into one or more queries targeting message repository 152. These queries can be used to retrieve the message objects from message repositories 152 in real-time. Query adaptation microservice 153 can utilize LLM 154, which can be constructed based on similar principles as LLM 145.

In varying examples, a copilot architecture can implement a plurality of messaging microservices, each supporting one or more respective message types or messaging applications.

8. Qualification Microservice

Some examples of the disclosed technologies can implement e.g. qualification microservice 170 to qualify inputs in relation to the competencies of the copilot. The disclosed microservice architecture allows qualification to be determined deep inside the copilot at one or more selected points in the processing flow. This can save processing effort in cases of copilot incompetence. Additionally, qualification microservice 170 can operate input-side, e.g. before inputs have reached core microservices subsystem 180, which can provide precise comparison of a client input with copilot competency.

In contrast, conventional tools, particularly those intended as general-purpose tools, can be limited to determining competency from the outside, either directly from the client input, when the scope of the client input is not well-known, or from the client output, when evaluation can be confounded by output that looks good. For these reasons, conventional tools often do not even attempt to determine competency, greatly increasing the risk of hallucination or other artifacts.

Qualification microservice 170 can be configured to receive ninth input, which can include or be derived from fourth output produced by retrieval microservice 130. Qualification microservice 170 can compare all or part of the ninth input with graphical model 171 of a knowledge corpus incorporated in the copilot, to determine whether the copilot is competent to act on the ninth input.

In some examples, graphical model 171 can be a map in a multi-dimensional vector space similar to that used by embedding microservice 137 or vector index 138. The map can define one or more surfaces or envelopes separating interior regions of the vector space which are within scope of the knowledge corpus from exterior regions which are outside the scope of the knowledge corpus. Thus, the copilot can be determined to be competent for portions of the ninth input that map to an interior region, and can be determined to be incompetent for portions of the ninth input that map to an exterior region.

In some examples, the knowledge corpus represented by graphical model 171 can include one or more datasets on which core microservices or other microservices of the copilot have been trained. In other examples, the knowledge corpus can include databases available to any data producer from which RAG can be performed. Graphical model 171 can be pruned as described in context of FIG. 8 herein.

In some examples, a determination of competence can require that all portions of the ninth input map to interior regions while, in other examples, competence can be determined on a portion-by-portion basis. In such case, a determination of incompetence can require that all portions of the ninth input map to exterior regions. Otherwise, the portions of the ninth input mapping to exterior regions can be discarded, the copilot can be deemed competent for the remaining portions of the ninth input, which map to interior regions, and processing can proceed.

In either case, upon determining that the copilot is competent, qualification microservice 190 can determine and transmit ninth output, including or based on the ninth input, toward at least one of the core microservices. Alternatively, upon determining that the copilot is not competent, qualification microservice 171 can transmit a notification indicating lack of competence, e.g. back to retrieval microservice 130, or directly back to client interface microservice 116.

Numerous variations and extensions can be implemented within scope of the disclosed technologies. The placement of qualification microservice 170 is exemplary, and alternative or additional qualification microservices can be placed elsewhere. For example, a qualification microservice can be placed within each data producer, with a scope of competence limited to the stored data of that data producer.

9. Core Prompting Module

In some examples, inputs to core subsystem 180 can be managed by core prompting module 172. Output from qualification microservice 170 can be split or organized into one or more prompts provided to core microservice 181a. In some examples, the path from qualification microservice 170 to module 172 can be mediated by evaluation microservice 128, so that some outputs from qualification microservice 170 can be forwarded to module 172, while others can lead to another invocation of retrieval microservice 130.

Module 172 can also be invoked based on output from filter 173, e.g. to release additional prompts queued at module 172, or to blacklist certain prompts leading to unacceptable output from core subsystem 180.

10. Core Microservice

With various stages of input-side processing described above, inputs can reach a core microservice such as microservice 181a. Core microservice 181a and other core microservices 181b-181d can incorporate LLMs (or other trained ML tools) trained to perform general or specific respond-to-input tasks within one or more domains of interest. Thus, in some examples a core microservice in the disclosed architecture can be used to implement a general-purpose copilot similar to presently popular chatbots, albeit with a much smaller total size and much lower computational demands. In other examples, a core microservice can be trained for particular specialized tasks or for specialized knowledge domains. Non-limiting examples of specialized tasks include question-answering, generative tasks (e.g. software code, text, or art), natural language interfaces to database, causal reasoning, literature search (e.g. scientific, legal, journalistic, or in the humanities), or education (e.g. tutoring, grading). Non-limiting examples of specialized knowledge domains include public or private databases (e.g. scientific, legal, journalism, humanities, linguistic, corporate, enterprise resource planning (ERP), or training materials).

Off-loading various specialized functions to other microservices, as described herein, allows core microservices to be implemented much smaller than competing products in which knowledge as well as specialized functions (e.g. multi-modal support, expansion, RAG, or filtering) are all integrated into one monolithic large LLM. Accordingly, disclosed core microservices require less computing hardware and less training time than prevalent competing techniques, and can be trained or customized with only modest computational burden. Still further, the small size of a core microservice allows a copilot to integrate multiple core microservices in various ways, which is impractical with the competing large LLM products. That is, multiple core microservices within a disclosed copilot architecture can share other specialized microservices such as expansion, embedding, retrieval, data producers, or qualification.

Each core microservice 181a-181d can include one or more trained machine learning tools and optionally one or more long-term memories. Core microservice 181a-181d can be configured to receive a tenth input, which can include or be based on fourth output of retrieval microservice 130 or on ninth output of qualification microservice 170. Core microservice 181a-181d can apply at least one of the included ML tools to the tenth input to obtain a tenth output, and can transmit the tenth output. The trained ML tools can include one or more LLMs, LMMs, or DNNs.

Numerous variations and extensions can be implemented within scope of the disclosed technologies. As described further in context of FIG. 1B, each core microservice 181a-181d can incorporate two or more LLMs 185-186 (or other ML tools) which can be peers, trained according to respective levels of client authorization. To illustrate, LLM 185 can be trained on corporate knowledge accessible to all employees, while LLM 186 can also be trained on restricted data only accessible to managers or executives of an organization. Because core LLMs 185-186 can be compact, many levels of authorization can be concurrently supported by respective LLMs 185 . . . 186, e.g. for customers, according to several levels of corporate hierarchy, according to business unit, or according to department and job function (e.g. procurement, sales, accounting, or human resources).

Core microservice 181 can be configured to select among LLMs 185 . . . 186 according to a level of client authorization associated with the tenth input. The selected LLM 185 . . . 186 can be applied to the tenth input to generate the tenth output. Insofar as only one LLM 185 . . . 186 is applied to a given tenth input, a group of LLMs 185 . . . 186 can operate in a mixture-of-experts (MoE) mode. Additionally, each of LLMs 185 . . . 186 can itself be a combination of several LLMs, e.g. as a mixture-of-experts or as an ensemble. Thus, a collection of core microservices 180 can be organized with multiple hierarchical levels.

In further examples, core microservice 181 can incorporate one or more long-term memories 187 . . . 188 which can maintain history of inputs and outputs for a respective client entity. The client entity can be a session, a client identifier associated with a respective user, or a group of users. That is, different users, user groups, or sessions can have their own long-term memory to avoid interference between the various users, user groups, or sessions.

Some competing techniques attempt to maintain history by using the history to update the training of a large LLM, which may not distinguish client entities, may not be accurate, or may be computationally burdensome. In contrast, maintaining history in a dedicated long-term memory is computationally efficient, maintains separation between client entities, and obviates having to update core LLM 185 . . . 186 merely for the sake of logging history.

In additional examples, a core microservice can be trained to perform evaluation, e.g. integrating functionality of evaluation microservice 129 into core microservice 181a. Like other microservices, core microservices 181a-181d can also issue requests for clarification.

11. Core Microservice Architecture

FIG. 1B shows an example architecture 181 of a core microservice. Any one or more of core microservices 181a-181d can be implemented according to architecture 181. In variations, certain illustrated components of architecture 181 may be omitted, or additional components may be added. As described herein, core microservice 181 can receive input 182 and produce output 189, both shown in dashed outline because they may not be part of microservice 181.

Input 182 can be provided to routing module 183. In some examples, router 183 can be implemented as procedural logic while, in other examples, router 183 can be an LLM or other trained ML tool, or a combination of an ML tool and procedural logic. Router 183 can distribute parts or the whole of input 182 among one or more core LLMs (or other trained ML tools) 185 . . . 186. In some examples core LLMs 185 . . . 186 can be developed for different levels of client authorization and can operate as a mixture of experts. In other examples, core LLMs 185 . . . 186 can provide optimization for different tasks, for different types of data, or for different knowledge domains. Thus, core LLMs can also operate as an ensemble. Output from one or more invoked core LLMs 185 . . . 186 can be gathered into output 189. Optionally an aggregator module (not shown) can be implemented between core LLMs 185 . . . 186 and output 189.

Core LLMs 185 . . . 186 can be supported by memories 187 . . . 188 to retain context. In varying examples, each of memories 187 . . . 188 can be assigned to a respective core LLM 185 . . . 186, to a respective session, to a respective client entity, or to a particular group, combination, or group of combinations of one or more of these discriminants.

Core microservice architecture 181 can also support alternative datapaths. As described herein, a core microservice 181a-181d can sometimes be bypassed. To illustrate, bypassing a core microservice developed for image input can save computation power in cases where input 182 is text or audio. Thus, in some examples, input 182 can be forwarded to gating module 184 to make a decision whether to process input 182 locally, or whether to forward input 182 intact as output 189. In the former case, gating module 184 can pass input data to router 183 for handling as described above. In the latter case, gating module 184 can forward input data directly as output 189. In variations, gating module 184 can split input 182, handling part locally, and forwarding part intact. To illustrate, an image portion of input 182 can be forwarded to router 183 for local handling, while text or audio portions can be passed onward in output 189. Gate 184 can variously be implemented as a trained ML tool, as procedural logic, or as a combination thereof.

12. Ensemble of Core Microservices

Returning to FIG. 1A, some innovative copilots can implement multiple core microservices 181a-181d. Core microservices 181a-181d can be configured as an ensemble of microservices, meaning all microservices 181a-181d can be invoked for a given tenth input. As shown in FIG. 1A, core microservices 181a-181d can be configured in a loop, but this is not a requirement, and other topologies can be used. In loop 181a-181d, each core microservice 181b-181d can receive an eleventh input from a preceding neighboring core microservice 181a-181c, apply at least one of its trained LLMs to the eleventh input to determine eleventh output, and transmit the eleventh output to a following neighboring microservice 181c-181d, 181a.

Numerous variations and extensions can be implemented within scope of the disclosed technologies. In some examples, core microservices 181a-181d can be peers trained to perform different cognitive functions, albeit on a same knowledge domain. Additionally or alternatively, core microservices 181a-181d can be distinguished by domain of expertise; forms of input (e.g. text, image, audio) that they are trained or optimized to handle; or perspective. Regarding perspective, two core microservices can be trained using respective training data drawn from a same domain, for performing a same task, but with desired responses reflecting different perspectives—e.g. varying perspectives of engineering, manufacturing, marketing, education, or technical support personnel. Going around the loop 181a-181d, each core microservice 181a-181d can successively add to a growing output for the tenth input originally received at core microservice 181a. Depending on the relationship between the task embodied in the tenth input, the different microservices 181a-181d can have different amount of useful contribution to the growing output. Moreover a partial output generated by an upstream core microservice 181b can be useful to a downstream core microservice 181d. Still further, it can be desirable in some instances for core microservice 181b to use output from core microservice 181d. In such case, the growing output can continue circulating for another iteration around loop 181a-181d so that partial output from microservice 181d reaches microservice 181b. Additional iterations can also be supported.

While the loop architecture can be convenient for sequential invocation of core microservices 181a-181d, other topologies can be used. To illustrate, core microservices 181a-181d can be fully connected, so that any active core microservice 181a-181d can independently determine which core microservice 181a-181d is to be invoked next.

In some examples, partial results generated by respective core microservices can be consolidated, e.g. by core microservice 181a or by a separate evaluation microservice 129.

13. Cognitive Functions

LLMs are commonly trained to optimize performance for a single cognitive function. In many fields, attempting to maximize multiple metrics can be challenging, often leading to results which fail to maximize any of those metrics. LLMs are no exception.

Because the disclosed architecture enables powerful copilots to be built with compact LLMs, it can be feasible to incorporate multiple core microservices, each trained to optimize performance on different respective cognitive functions. Such an approach parallels some models of the human brain, in which different lobes apply different cognitive skills to cooperatively accomplish a given task.

Accordingly, core microservices 181a-181d can be trained to optimize performance on respective cognitive functions, including e.g. two or more of: next word prediction, causal reasoning, sentiment analysis, language modeling, summarization, chain-of-thought reasoning, arithmetic reasoning, table-to-text generation, zero-shot generalization, corrupt span prediction.

14. Evaluation Microservices

Microservice invocations in FIG. 1A can proceed generally downward from client 102 to core microservices 181a-181d, with each invoked microservice acting on its input and transmitting output to one or more subsequently invoked microservices. Outputs e.g. from core microservices 181a-181d can flow back upward in FIG. 1A toward client 102. Arrows in FIG. 1A show exemplary paths for outputs to flow in various directions.

At various stages, outputs can be evaluated and decisions can be taken regarding dataflow for an instant client input. That is, the output of any microservice can be coupled as input to an evaluation microservice, and outputs of the evaluation microservice can be provided as inputs to one or more other microservices. A single input received from a source microservice at the evaluation microservice can result in output from the evaluation microservice to a single destination microservice, or to multiple destination microservices. The destination(s) can be contingent on evaluation of the input, and can include the source microservice itself. Evaluations can determine whether an output satisfies a target quality level. If the target quality level is satisfied, dataflow can proceed along a normal path as described herein. If the target quality level is not satisfied, dataflow can be modified, e.g. to perform additional iterations of RAG or additional invocations of core microservices or other source microservices.

A copilot can incorporate one or more evaluation microservices 109, 127-129. Each can receive twelfth input comprising all or part of the output of another microservice. Evaluation microservice 109, 127-129 can be configured to analyze the twelfth input. Based on the analysis, a further one or more of the microservices can be invoked.

Numerous variations and extensions can be implemented within scope of the disclosed technologies. Evaluation microservices 109, 127-129 can be implemented using an LLM, another trained machine learning module, or freestanding procedural logic.

Illustratively, evaluation microservices 109, 127-129 are shown in FIG. 1A. Alternatively or additionally, a core microservice can be configured to perform evaluation.

Evaluation microservice 127 can be configured to receive twelfth input derived from the fourth input received by retrieval microservice 130 from document microservice 134. Analysis by microservice 127 can be used by retrieval microservice 130 to determine whether to perform another RAG iteration.

Evaluation microservice 129 can be configured to receive twelfth input derived from the tenth output transmitted by core microservice 181a. Analysis by microservice 129 can be used by core microservice 181a to determine whether to perform additional invocations among core microservices 181a-181d.

In some examples, evaluation microservice 129 can also consolidate partial results output by respective core microservices 181a-181d. To illustrate, the partial results can be scored against inputs such as the tenth input received by core microservice 181a and highest ranking partial results can be forwarded toward a client while lower ranking partial results can be discarded.

Evaluation microservice 128 can be configured to receive twelfth input derived from ninth output of qualification microservice 170 and direct its output toward one or more of retrieval microservice 130 or core microservices 181a-181d.

Some evaluation services can receive inputs from multiple source microservices. Because client output can originate at various points in a microservice network, some deployments can implement evaluation microservice 109 as a gatekeeper for output returned to client 102 via client interface 116. Evaluation microservice 109 can receive input from one or more copilot modules, e.g. from any copilot module generating output directed toward client application 110. Thereby, such deployments can enforce quality control on outputs provided to the client. In some cases, evaluation microservices 109, 129 can be a single microservice, but this is not a requirement.

Additionally or alternatively, analysis by microservice 129 can be used by retrieval microservice 130 to determine whether to perform another RAG iteration.

15. Filtering

Some applications of the disclosed technologies operate in constrained knowledge domains or support a constrained set of tasks. As such, risks of bias, toxicity, or other undesirable artifacts can be much lower than in competing general purpose large LLMs. Moreover, smaller LLMs as used herein can be inherently more stable, e.g. less prone to artifacts, than competing larger LLMs.

Nevertheless, it can be desirable to apply filtering against bias, toxicity or other artifacts. FIG. 1A shows two filter microservices 124, 173 incorporated in the illustrated architecture. As for qualification microservice 170, the illustrated architecture enables filter microservices 124, 173 to be placed at targeted locations immediately downstream of other microservices judged to have likelihood of introducing undesirable artifacts, enabling such artifacts to be nipped in the bud before they can propagate and possibly contaminate otherwise artifact-free outputs.

As an illustration of the contamination risk, consider a given microservice that generates 10 output tokens, 2 of which are contaminated with bias or toxicity. Absent filtering, the various tokens can interact at a subsequent microservice, resulting in an increasing proportion of contaminated outputs. With pinpoint positioning of filter microservices 124, 173, the contaminated tokens can be eliminated promptly, leaving only 8 uncontaminated tokens to reach the subsequent microservice.

As LLMs increase in size, they can be prone to generate an ever-widening range of biased or toxic outputs, and it can be challenging to anticipate, identify, and control all of these. Because of this, bias and toxicity filtering can be more effective in a microservice architecture built from small LLMs (which exhibits relatively few forms of bias and toxicity) than in some comparative products based on large LLMs.

In FIG. 1A, filter microservice 124 is shown coupled to intermodal LLM 123. Because image or audio inputs to microservice 122 can be uncontrolled, there can be a propensity for output of LLM 123 to be contaminated with undesirable artifacts, and filter microservice 124 can eliminate these undesirable artifacts before they propagate further.

Filter microservice 173 is shown coupled to receive output from core microservice 181*a*. Because operation of LLMs 185 . . . 186 can be less transparent than other smaller and more specialized LLMs used in other microservices, there can be a risk of introducing undesirable artifacts. Filter microservice 173 can eliminate these artifacts before they propagate.

Each filter microservice 124, 173 can be implemented using an LLM, another trained machine learning module, freestanding procedural program logic, or a combination thereof.

Filters can also be used to prune output. To illustrate, expansion microservice 120 can generate 150 language tokens from a client input. Each of these language tokens can correspond to a respective task for the copilot. A filter microservice can trim these tokens to a threshold number, say 25 tokens, to control the amount of downstream computation. Still further, each of the language tokens can have an associated weight indicating a likelihood that the corresponding task will lead to a desired client output. A filter microservice can perform trimming to retain those language tokens having highest weight. Alternatively, a filter microservice can trim the language tokens so as to meet a desired aggregate likelihood of obtaining a desired client output. To illustrate, the desired aggregate likelihood can be in a range 70%-100%, for example 99%. Similar filtering can be applied at retrieval microservice 130, any data producer, or core microservices 181*a*-181*d*. Such filters can be integrated into respective associated microservices or can be implemented as separate stand-alone microservices, using an LLM, another trained machine learning module, freestanding procedural logic, or a combination thereof.

16. Dataflow decisions and Iterations

Various microservices in FIGS. 1A-1C can be configured with the capability to make decisions impacting dataflow. Some decision-making can lead to iterations, e.g. of retrieval microservice 130, of core microservices 181*a*-181*d*, or iterations spanning multiple microservices, such as retrieval microservice 130 and core microservices 181*a*-181*d*. Some examples have been described herein, and additional dataflow decision-making capabilities can also be implemented.

17. Transformation and Curation

Transformation and curation subsystem 160 can receive data updates from data repositories 136, 142, 152, 156, or 158. These data updates can be transformed into a form compatible with core subsystem 180 or suitable for use as training records for fine-tuning a copilot or any of its components. The data updates can be curated, e.g. to remove extraneous or duplicate information. To illustrate, extraneous portions of data records, such as email headers, or duplicative content in an email thread, can be removed. Transformation and curation can be performed by procedural logic 162, trained ML tool 164 or a combination thereof. The transformed and curated data records can be maintained in one or more databases 166, and can be provided directly to core subsystem 180.

Whereas SQL database 172 or message database 152, 156, 158 may not be in a form directly usable by core subsystem 180, in some examples document store 136 can be used directly and a corresponding data path to core subsystem 180 is shown in FIG. 1A.

Database 166 can also be used for reinforcement learning. Subsystem 190*a* can receive data records from subsystem 160, and can apply reinforcement learning to fine-tune components of core subsystem 180, or other copilot components.

18. Reinforcement Learning with Human Feedback (RLHF)

In some examples, reinforcement learning subsystem 190*a* can incorporate human feedback, e.g. with the assistance of one or more experts 104. FIG. 1C shows an example implementation 190 of an RLHF subsystem such as 190*a*.

Examples of the disclosed technologies can support update or fine-tuning of various microservices or their LLMs through an RLHF subsystem 190. That is, while FIG. 1A shows subsystem 190*a* applied to core subsystem 180, the RLHF technique is not so limited. The architecture of subsystem 190, or a similar design, can also be applied to fine-tune components of expansion microservice 120, retrieval microservice 130, or data producers 132. RLHF can be triggered internally from an evaluation microservice 109 or 127-129 or from another microservice (not shown) configured to monitor outputs of an evaluation microservice 109 or 127-129.

RLHF can replace a base version 192*a* of an ML tool with a refined version 192*b*, with the aid of a reward ML tool which evolves from 194*a* to 194*b*. To illustrate, ML tool 192*a*-192*b* can be RLHF can be core LLM 185 of core microservice 181*a*. In FIG. 1C, initialization paths are shown as dotted line arrow.

RLHF subsystem 190 can be triggered multiple times. When triggered, RLHF subsystem 190 can obtain a human-annotated dataset 191 based on human feedback (e.g. from expert 104) to output deemed erroneous or of insufficient quality. Records of dataset 191 can include prompts ("P") and human ratings ("IR") of corresponding output.

Each time RLHF subsystem 190 is triggered, RLHF can be performed in two phases.

In a first phase, base ML tool 192*a* can be used to initialize reward module 194*a* (shown by dotted line), and then reward model 194*a* can be trained to learn ranks for any given response R, while base tool 192*a* is held fixed. Training record prompts P can be fed to static ML tool 192*a* to develop responses R, which can be ranked by ranking module 193. The responses R and ranks K can be applied to train reward module 194*a* to eventually obtained trained reward module version 194*b*.

In a second phase, reward module 194*b* can be held fixed, and used to train the target ML tool from base version 192*a* to refined version 192*b*. In the second phase, the target tool 194*b* can be initialized to the base version 192*a*. Prompts P can be fed to tool 192*b* to obtain responses R, which in turn can be provided to trained reward module 194*b* to predict ranks K, which in turn can be used to train tool 194*b* to generate higher ranking responses R. In some examples, human ratings can also be applied to train tool 194*b* as shown.

After RLHF is completed, refined ML tool 192*b* can replace base tool 192*a* in the copilot.

RLHF is not limited to LLMs but can also be applied to microservices implemented using other forms of machine learning.

RLHF can be applied in various ways. In some examples, a response determined to be incorrect by an evaluation microservice or a human evaluator can be sent to one or more human experts to obtain a desired response, and the associated client input and the desired response can be added to a training dataset for a next stage of incremental fine-tuning. In other examples, a copilot can be instructed to generate a plurality of possible responses to the client input, and a reinforcement learning tool (e.g. an LLM) can be trained to select a desired response (according to a human evaluator) from among multiple choices. The trained reinforcement learning tool can then be used to evaluate responses to further inputs. In further examples, responses can be provided to a client user with a prompt that requests the client user themselves to provide feedback.

19. Caches

Any microservice can be implemented with an accompanying cache of prior inputs and outputs. Thus, if a new input matches a previously encountered input, an output response can be retrieved from the cache. Processing or invocation of child microservices can be substantially reduced.

Example Copilot

Figure 2:
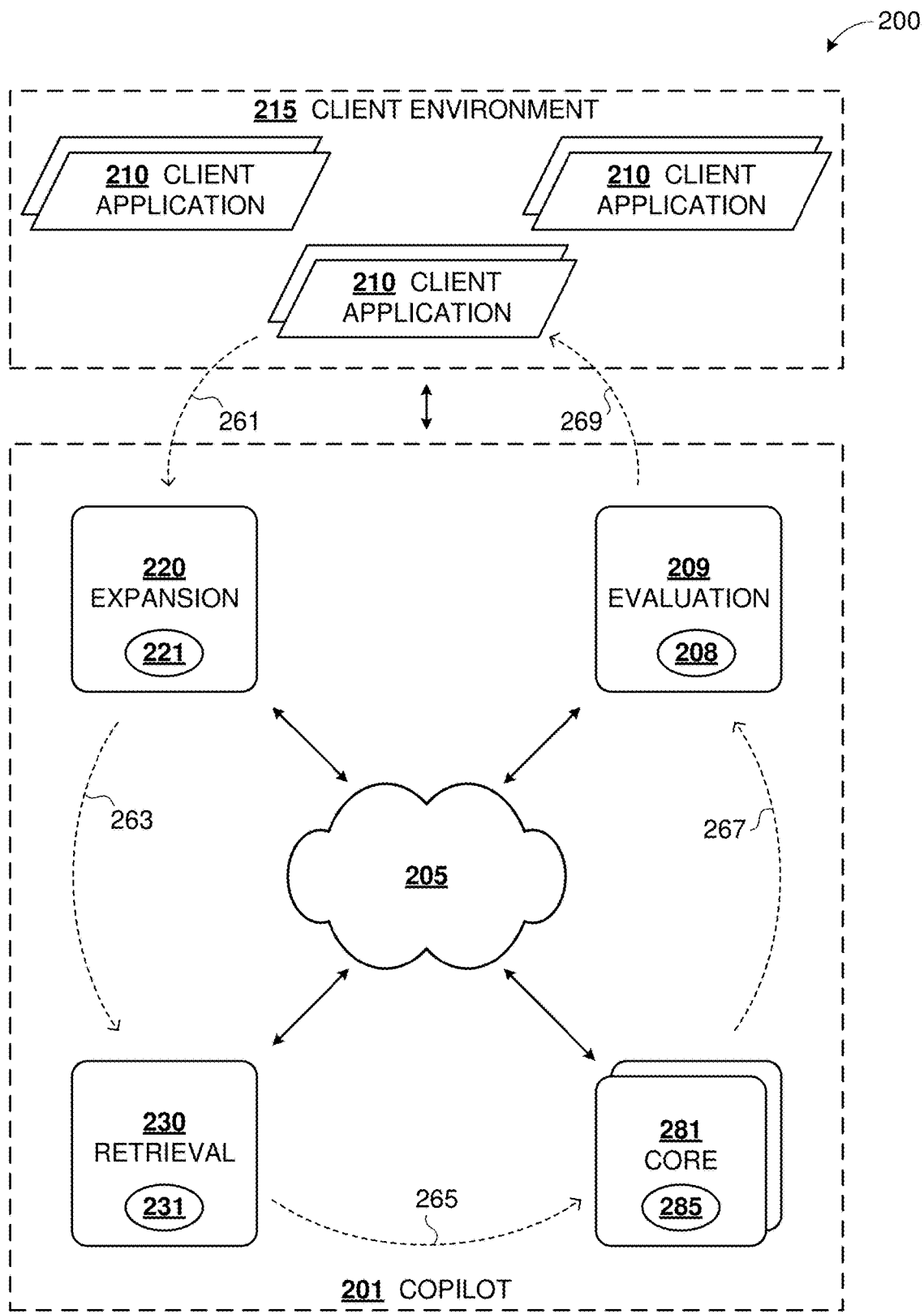
FIG. 2 is a diagram of an example copilot implemented according to the disclosed technologies.

FIG. 2 is a diagram 200 of an example copilot 201 serving one or more first client applications 210 from client environment 215. Copilot 201 can be implemented as software modules executed on one or more hardware processors. The various software modules can implement respective microservices, which can be coupled among themselves to form a weakly connected network. The interconnection between microservices is represented in FIG. 2 by cloud shape 205.

Each microservice can receive input from a first group of microservices comprising one or more other of the microservices, or from one or more second client applications 210. Each microservice can transmit output to a second group comprising one or more other of the microservices, or to one or more third client applications. The first and second group of microservices can be disjoint, can have partial overlap, or can be identical. In some examples, a first client application 210 served by copilot 201 can both provide input to copilot 201 and receive output from copilot 201, but this is not a requirement. In other examples, copilot 201 can receive input from one (second) client application 210 and transmit corresponding output to a different (third) client application 210. In further examples, a client input can result in an update within copilot 201, with no output being provided to any application 210. Still further, copilot operations can sometimes be triggered by an internal event (e.g. a change at a data producer's data repository) leading to an output to one or more (third) applications 210.

Copilot 201 can include expansion microservice 220, retrieval microservice 230, one or more core microservices 281, and evaluation microservice 209, which can be similar to those described in context of FIGS. 1A-1B or elsewhere herein. These or other microservices can incorporate respective trained ML tools (e.g. 221, 231, 285, or 208), including but not limited to LLMs.

Dashed line arrows 261-269 illustrate an exemplary dataflow through copilot 201. As described herein, a network of microservices can support a wide range of dataflows, which can depend on the particular configuration of a given deployment or on the particular input provided to copilot 201. The illustrated dataflow is simplified: each segment 261-269 can invoke one or more other microservices as described herein.

Arrow 261 indicates input from client application 210 to expansion microservice 220. Following expansion, expanded input can be transmitted from expansion microservice 220 to retrieval microservice 230, as shown by arrow 263. Following retrieval augmented generation (RAG), augmented input can be transmitted from retrieval microservice 230 to core microservice(s) 281, as shown by arrow 265. Output from core microservice(s) 281 can be inspected by evaluation microservice 209, as shown by arrow 267. Upon satisfactory evaluation, output can be returned to client application 210 via arrow 269.

Numerous variations and extensions can be implemented within scope of the disclosed technologies. At least one among expansion microservice 220, retrieval microservice 230, one or more core microservices 281 can incorporate an LLM (e.g. 221, 231, 285). Expansion microservice 220 can be configured to receive (261) one or more language tokens and transmit (263) output comprising additional tokens associated with, but distinct from, the received tokens. Retrieval microservice 230 can be configured to receive (263) input, perform RAG by retrieving additional input from one or more data producers (not shown in FIG. 2), and transmit (265) output toward core microservice 281. Retrieval microservice 230 can repeat RAG (e.g. recursively) until a termination condition is satisfied.

The data producer accessed by retrieval microservice 230 can be a database microservice configured to receive an input, retrieve database object(s) relevant to that input, and transmit an output based on the retrieved database object(s). The RAG action can be performed by invoking the database microservice. A database post-processing microservice can transform retrieved database objects from a non-text representation into text, or into a visualization. Alternatively, the data producer accessed by retrieval microservice 230 can be a messaging microservice configured to receive an input, retrieve messages or metadata relevant to that input, and transmit an output based on the retrieved messages or metadata.

Core microservice 281 can incorporate one or more trained ML tools, and can be configured to receive (265) an input, apply at least one of the incorporated ML tools to that input to obtain an output, and transmit (267) that output toward client application 210, e.g. via evaluation microservice 209. The incorporated ML tools can include two tools which are peers trained according to respective levels of client authorization. Core microservice 281 can be configured to selected among these tools according to a level of authorization associated with received input. Core microservice 281 can incorporate one or more long-term memories, each maintaining history for a respective client entity. Core microservice 281 can be configured to determine whether to request a clarification regarding at least a portion of received input, and issue such a request toward a source microservice from which the input was received.

Evaluation microservice 209 can be configured to receive (267) input comprising output from another microservice (e.g. core microservice 281), analyze the received input, and invoke one or more microservices based on the analysis. To illustrate, unsuccessful evaluation by microservice 209 can result in another invocation of expansion microservice 220, retrieval microservice 230, or core microservice 281. Copilot 201 can include another evaluation microservice (similar to 127 or 128 of FIG. 1A, not shown in FIG. 2) whose input is based on output from a data producer, analysis of which can lead to a determination whether retrieval microservice 230 is to perform another RAG iteration. As described above, successful evaluation can transmit (269) output to client application 210.

Copilot 201 can incorporate an intermodal microservice (122) configured to receive input tokens in a first mode and transmit output tokens in a second mode distinct from the first mode.

The data producer accessed by retrieval microservice 230 can include an embedding microservice (137) configured to receive input from retrieval microservice 230 and transmit output comprising vector embedding(s) representative of the received input. The data producer can include a document microservice (134) storing documents in a repository (136) according to an index (138) of vector representations. The document microservice can be configured to receive an input, and return an output comprising one or more documents similar to the received input. The RAG action can be performed by invoking the embedding microservice and the document microservice.

Data objects returned to retrieval microservice 230 can include email, voicemail, text messages, instant messages, video messages, multi-mode messages, or attachments thereto.

Copilot 201 can include a qualification microservice (170) configured to receive an input, compare the received input with a graphical model of a knowledge corpus incorporated in copilot 201, and determine whether the copilot is competent to act on the received input. If competent, then the qualification microservice can transmit an output, based on the received input, toward core microservice 281. If not competent, then the qualification microservice can transmit a notification indicating the lack of competence.

The one or more core microservices 281 can include an ensemble of core microservices. Each core microservice of the ensemble can be trained for a respective cognitive function, at least two of which are distinct. The ensemble of core microservices 281 can include a cycle, some member(s) of which (e.g. 181*c*) can receive input from an upstream neighbor core microservice (181*b*), apply at least one trained ML tool to that input to obtain a corresponding output, and transmit that output to a downstream neighbor core microservice (181*d*).

Examples of copilot 201 can perform causal reasoning with a total parameter count under 150 billion. Copilot 201 can exhibit emergent behavior. Further examples of copilot 201 can be implemented on a single CPU chip coupled to a single GPU chip.

Example Method

Figure 3:
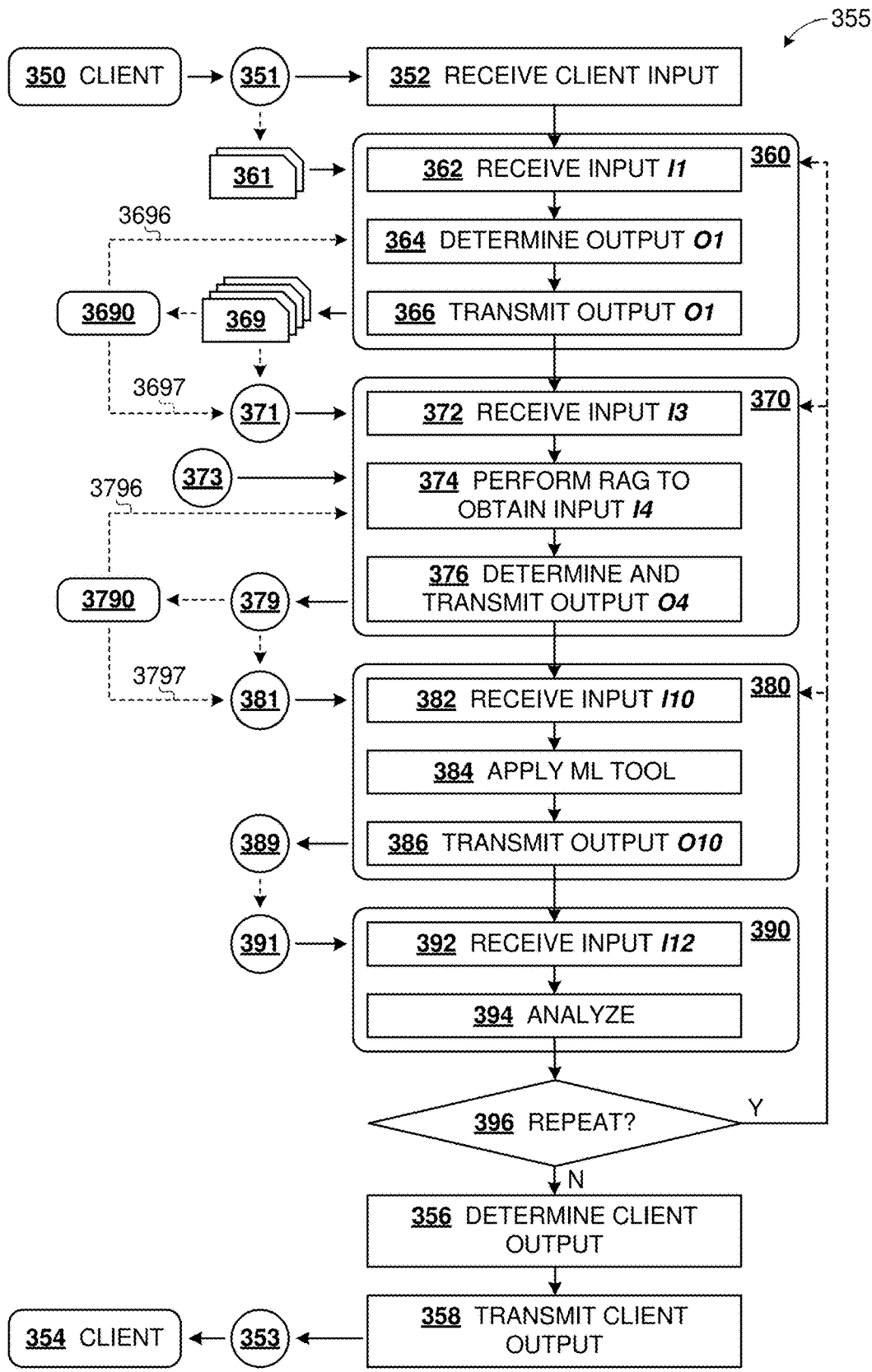
FIG. 3 is a flowchart of an example method according to the disclosed technologies.

FIG. 3 is a flowchart 355 of an example method according to the disclosed technologies. In this method, a copilot processes a client's input to generate an output to the client. To assist with the description, FIG. 3 also indicates data items (shown as circles or beveled rectangles) and microservices (rectangles with rounded corners) associated with various process blocks (rectangles with square corners, or diamond shape for decision blocks). Two client entities are also shown.

At process block 352, input ("client input" 351) can be received from a client 350.

Expansion microservice 360 can be invoked and the method can proceed to process block 362, where first input I1 361 can be received. Input I1 361 can comprise or be derived from client input 351, as indicated by dashed arrow, and can include one or more language tokens shown in the shape of punch cards. At process block 364, output O1 369 can be determined, including tokens associated with, but different from, tokens 361. In examples, input tokens 361 can also be included among output tokens 369. At process block 366, output O1 369 can be transmitted toward retrieval microservice 370.

Retrieval microservice 370 can be invoked and the method can proceed to block 372, where third input I3 371 can be received. Input I3 371 can include or be derived from output O1 369. At process block 374, retrieval augmented generation (RAG) can be performed, to retrieve fourth input I4 373 including one or more data objects related to the third input, from one or more data producers. At process block 376, output O4 379 can be determined and transmitted toward core microservice 380. Output O4 379 can be include or be based on inputs I3 371 and I4 373.

Core microservice 380 can be invoked and the method can proceed to block 382, where tenth input I10 381 can be received. Input I10 381 can include or be derived from output O4 379. At block 384, at least one trained ML tool of core microservice 380 can be applied to the tenth input to determine tenth output O10 389. At block 386, output O10 389 can be transmitted toward evaluation microservice 390.

Evaluation microservice 390 can be invoked and the method can proceed to block 392, where twelfth input I12 391 can be received. Input I12 391 can include or be derived from output O10 389. At block 394, input I12 391 can be analyzed, e.g. to determine its accuracy, relevance, or completeness with respect to client input 351.

At decision block 396, a determination can be made, based on analysis results from block 394, whether to further invoke expansion microservice 360, retrieval microservice 370, or core microservices 380. If the determination is in the affirmative, the method can follow the Y branch from block 396 back to microservices 360, 370, or 380 in varying examples. Otherwise, the method can follow the N branch from block 396 to block 356, where output for the client ("client output") 353 can be determined, e.g. based on output O10 389. At block 358, output 353 can be transmitted to client 354. Clients 350, 354 can be the same or distinct.

Numerous variations and extensions can be implemented within scope of the disclosed technologies. In various examples, microservices 360, 370, 380, 390 can have features described elsewhere herein for similar microservices, e.g. in context of FIGS. 1A-1C. Additionally, the method can extend to the invocation of one or more data producers, intermodal microservices, qualification microservices, or filter microservices as described in context of FIGS. 1A-1C, FIG. 2, or elsewhere herein. The trained ML tool applied at block 384 can be an LLM, LMM, or DNN.

In further examples, output O1 of expansion microservice 360 can be analyzed by evaluation microservice 3690 prior to delivery as input I3 of retrieval microservice 370. That is, output 369 can optionally be forwarded to evaluation microservice 3690. If a predetermined condition is met, output 369 (or another input 371 derived from output 369) can be forwarded to retrieval microservice 370 via path 3697. The predetermined condition can relate output 369 to input 361 or the copilot's domain of competence. Otherwise, if the predetermined condition is not satisfied, a message can be returned via path 3696 to expansion microservice 360 for generation of additional output O1.

Similarly, output O4 of retrieval microservice 370 can be analyzed by evaluation microservice 3790 prior to delivery as input I10 of core microservice 380. That is, output 379 can be forwarded to evaluation microservice 3790. If another predetermined condition is met, output 379 (or another input 381 derived from output 379) can be forwarded to core microservice 380 via path 3797. This predetermined condition can relate output 379 to input 371, output 369, or the copilot's domain of competence. Otherwise, if the predetermined condition is not satisfied, a message can be returned via path 3796 to retrieval microservice 360 for generation of additional input I4 or output O4.

Example of Multi-Recursive RAG

Figure 4:
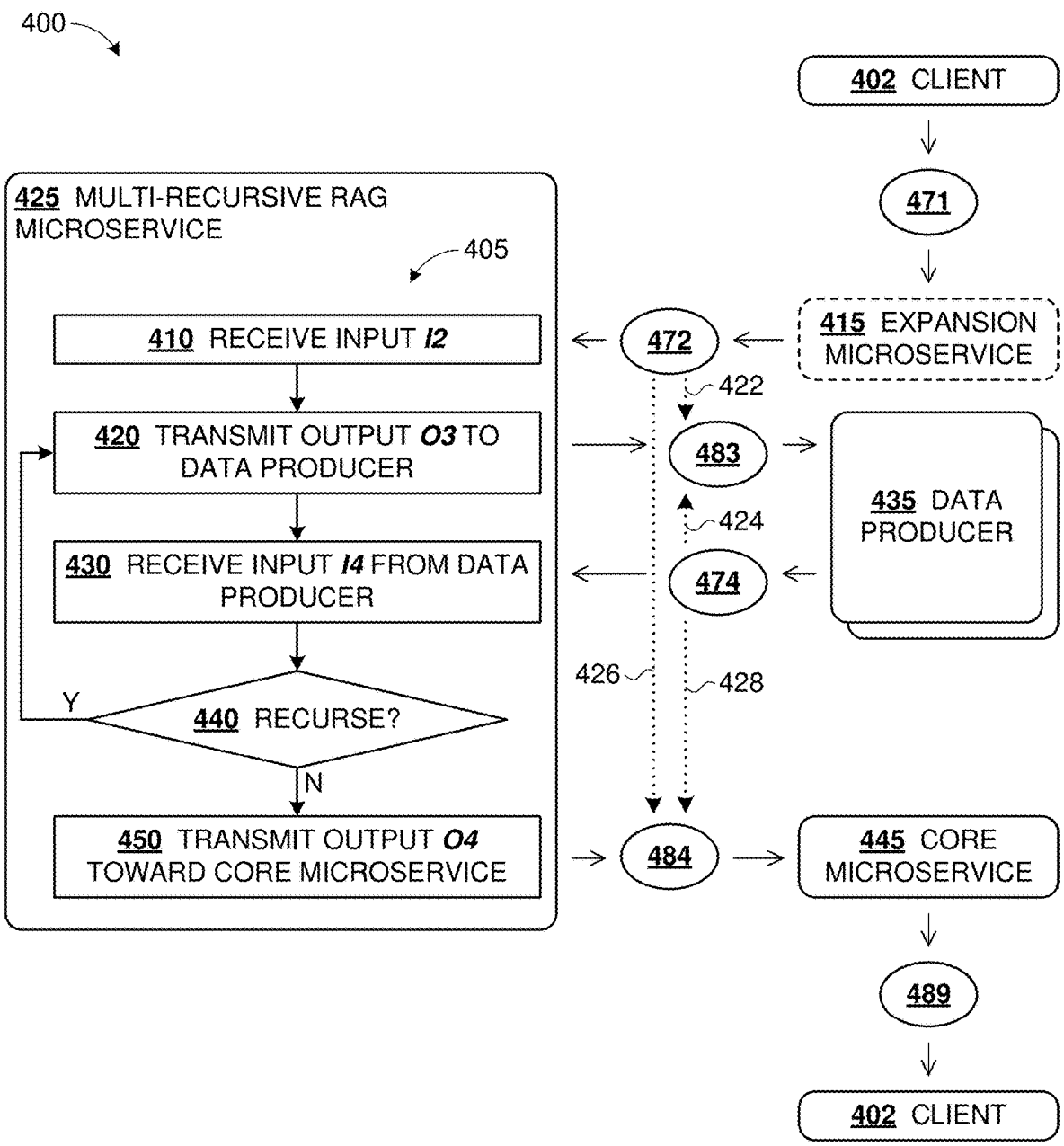
FIG. 4 is a hybrid diagram depicting a flowchart for multi-recursive RAG in a copilot environment according to examples of the disclosed technologies.

FIG. 4 is a hybrid diagram 400 for multi-recursive RAG. In FIG. 4, actors are shown in rectangles with rounded corners. These actors include various microservices and one or more clients. Multi-recursive RAG microservice 425 can perform a multi-service RAG method according to flowchart 405. Certain actors not required for performance of this method are shown in dashed outline, to provide context of an illustrative copilot environment. Inputs and outputs exchanged between the actors are shown in ovals.

The method commences at process block 410, where input I2 472 can be received. Input I2 472 can be based on input 471 received from client 402. In examples, input I2 472 can be identical to or can be a subset of input 471 while, in further examples, input 471 can be expanded by expansion microservice 415 (described further herein) to obtain input I2 472.

Blocks 420, 430, 440 can be recursively iterated.

At each iteration, microservice 425 can formulate output O3 483, which can be transmitted to data producer 435 at block 420. In response to this transmission, input I4 474 can be received from data producer 435 at block 430. Exemplary data producers 435 are described further elsewhere herein. On a first iteration, output O3 483 can be based on input I2 472. On subsequent iterations, output O3 483 can be based on input I4 474 of an immediately preceding iteration.

At decision block 440, a determination can be made whether to continue with further iterations or terminate the iterative loop of blocks 420, 430, 440. If further iterations are to be performed, the method follows the Y branch from block 440 back to block 420. If the loop is to be terminated, the method follows the N branch from block 440 to block 450. With multi-service RAG completed, output O4 484 can be prepared, based on one or more of inputs I4 474 (from respective iterations) and optionally input I2 472. Then, at block 450, output O4 484 can be transmitted toward core microservice 445. Output 484 can enable core microservice 445 to generate response 489 to input 471 provided by client 402.

Numerous variations and extensions can be implemented within scope of the disclosed technologies. Outputs O3 483 can be transmitted to same or different data producers on respective iterations of block 420. The multi-recursive RAG can be integrated with an expansion microservice, data producers, a qualification microservice, or one or more core microservices, with any associated features, extensions, or variations as described herein.

In some examples, input I2 472 can be received from expansion microservice 415. Expansion microservice 415 can receive input I1 471 from client 402 and can extract one or more first tokens from input I1 471. Expansion microservice 415 can determine one or more second tokens associated with, but different from, the first tokens. An output combining first and second tokens can be generated. This output can be transmitted from expansion microservice 415 to multiservice RAG microservice 425, where it is received as input I2 472.

In varying examples, output O4 484 can be a simple concatenation of various inputs I4 474 and input I2 472, or preparation of output O2 484 can include deduplication, sorting, filtering, or other processing operations on inputs 472, 474. Illustratively, microservice 425 can invoke an evaluation microservice (not shown) to evaluate and select those inputs 474 determined to have greatest relevance to input I2 472.

In examples, a stopping criterion can be evaluated at block 440 to determine whether or not to perform another RAG iteration. A variety of stopping criteria can be implemented, singly or in combination. As one example, loop iterations can be terminated when a predetermined number of iterations of blocks 420, 430 have been completed. Loop iterations can be terminated when an amount of new data received at block 430 (e.g. data not present in input I4 474 at a previous iteration, nor in input I2 471) is below a predetermined threshold. Loop iterations can be terminated when a similarity between inputs I4 474 on two successive iterations is greater than another predetermined threshold. In further examples, microservice 425 can maintain a graphical representation of input I2 472, inputs I4 474, and a collective volume defined by these inputs. In examples, as more inputs I4 474 are received on successive loop iterations, this volume can increase or remain unchanged, but cannot decrease. Loop iterations can be terminated when the increase in volume on a most recent iteration is less than or equal to yet another predetermined threshold.

Data producer 435 can include a document repository storing a plurality of documents, and an index storing vector representations of the stored documents.

Figure 5:
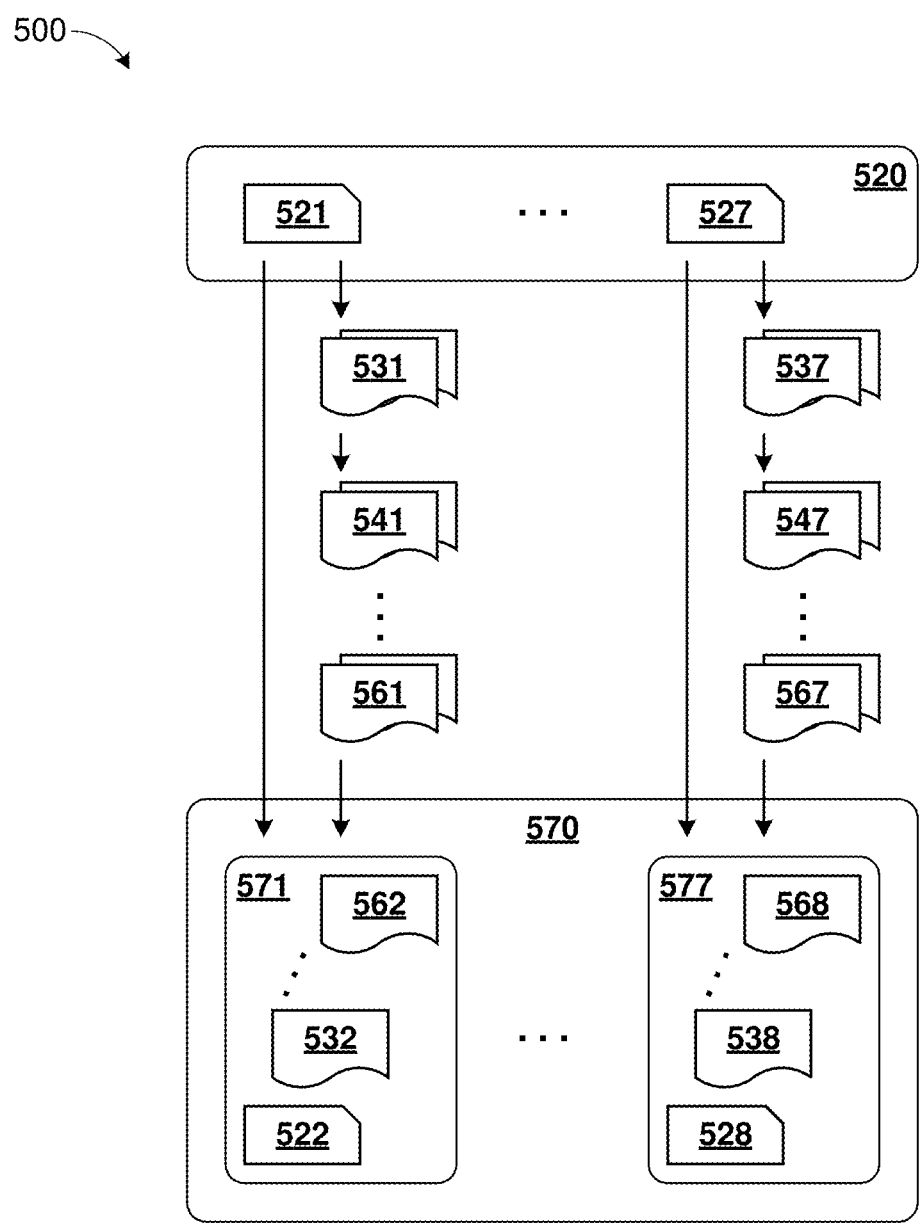
FIG. 5 is an example dataflow diagram for multi-recursive RAG according to the disclosed technologies.

FIG. 5 is an example dataflow diagram 500 for multi-recursive RAG, in which input I2 520 (similar to input 472 of FIG. 4) is processed by a multi-recursive RAG microservice (similar to microservice 425 of FIG. 4) to obtain output O4 570 (similar to 484 of FIG. 4). As shown, input I2 520 includes multiple tokens 521-527, and multi-recursive RAG can be performed individually on each of tokens 521-527.

Description begins with token 521. On a first RAG iteration, token 521 can be transmitted to a data producer (similar to 435), and one or more documents 531 can be received from the data producer. At a next iteration, document(s) 531 can be transmitted to the data producer, and one or more documents 541 can be received from the data producer. On a final iteration, one or documents 561 are received from the data producer and loop iterations cease, e.g. because a stopping condition has been satisfied. Output 571 is formed from input token 521 and successive inputs 531, 541, . . . 561 received from the data producer. These inputs can be retained intact or can be processed, e.g. as described herein, prior to incorporation within output 571. Illustratively, token 522 of output 571 can be based on input token 521, and documents or tokens 532 . . . 562 can be based on documents 531 . . . 561.

Processing of token 527 can be similar to that described for token 521. Thus, inputs 537, 547, . . . 567 can be received from a data producer on successive recursive iterations. Token 527 and the inputs 537 . . . 567 can be processed or simply replicated to obtain output token 528 and documents or tokens 538 . . . 568 of output 577.

When RAG processing of all input tokens 521 . . . 527 is complete, outputs 571 . . . 577 can be combined into output 570, which can be transmitted toward a core microservice (445).

In examples, output 570 can include the final iteration inputs 561 . . . 567 for each of the input tokens 521 . . . 527. Any of the inputs to or outputs from the data producer (e.g. 531, 541, 561) can be an array of elements, and these elements can include a document, a vector representation of a document, or a token derived from input 520. In some examples, output 570 can be filtered prior to transmission. The constituents of output 570 can be scored for relevance to input 520, and high-scoring constituents can be retained for transmission toward a core microservice, while other constituents of output 570 can be discarded.

Example Training of Expansion Microservice ML Tool

Figure 6:
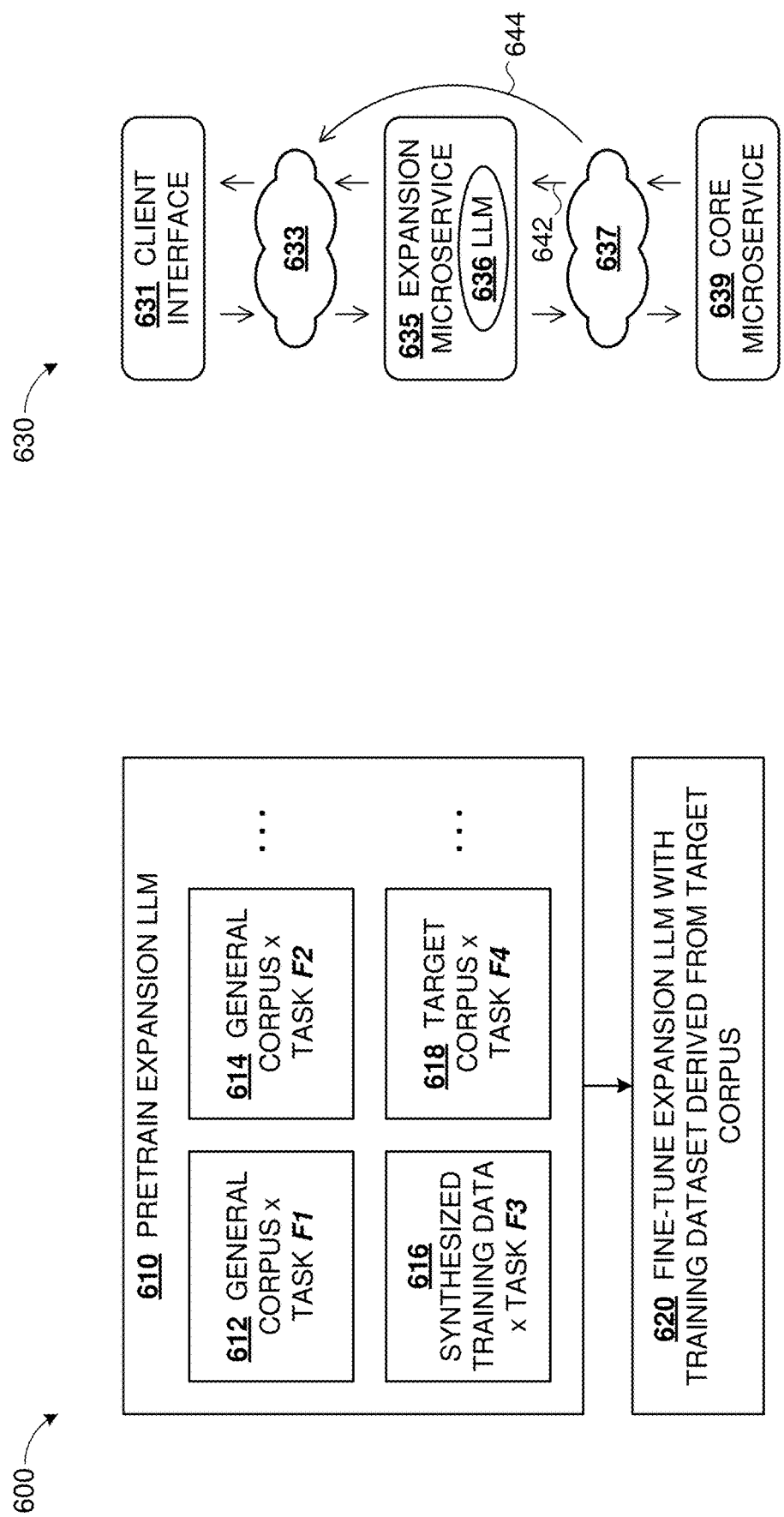
FIG. 6 is a flowchart illustrating an example method of training an LLM used by an expansion microservice, according to the disclosed technologies.

FIG. 6 is a flowchart 600 illustrating an example method of training an ML tool used by an expansion microservice. In this method, pretraining and fine-tuning are combined to customize a copilot for a target deployment. This method illustrates the use of multiple pretraining objectives (e.g. tasks on which performance can be optimized) or diverse sources of training data.

Inset 630 shows the relationship between expansion microservice 635 and other copilot components such as client interface 631 and core microservice 639. Expansion microservice 635 can utilize a trained ML tool (shown as LLM 636, dubbed "expansion microservice LLM" or simply "expansion LLM"). Expansion microservice 635 can communicate directly or indirectly with client interface 631, in both directions, as shown by respective arrows in inset 630. The possibility of indirect communication, e.g. through other intermediary microservices, is indicated by cloud 633. Similarly, expansion microservice 635 can communicate directly or indirectly with core microservice 639, in both directions. Cloud 637 indicates the possibility of indirect communication between expansion microservice 635 and core microservice(s) 639. In some examples, the return path from core microservice 639 toward client interface 631 can go via expansion microservice 635 (e.g. in an implementation with a nested call stack) as shown by arrow 642 while, in other examples, the return path can bypass expansion microservice (e.g. in an event-driven programming implementation) as shown by arrow 644.

Flowchart 600 commences with pretraining at process block 610, where two, three, or more of pretraining stages 612, 614, 616, 618 can be performed. At stage 612, expansion LLM 636 can be trained to improve or optimize performance for task F1 over a general corpus. At stage 614, expansion microservice 636 can be trained to improve or optimize performance for task F2, distinct from F1, also on a general corpus. At stage 616, expansion ML tool 636 can be trained to improve or optimize performance for task F3, using training data synthesized from a pruned knowledge graph. At stage 618, expansion ML tool 636 can be trained to improve or optimize performance for task F4, using a corpus specific to the target deployment.

Thus, in some examples, pretraining can include two stages of pretraining 612, 614, both with a general corpus, but different pretraining objectives. Stages 612, 614 can use the same general corpus, two distinct non-overlapping corpora, or two corpora with partial overlap. At least one of the cognitive functions F1, F2 can be an MLM task. In some examples, F1 and F2 can be distinct MLM tasks. To illustrate, one MLM task can randomly distribute erasures uniformly over the general corpus while the other MLM task can limit erasures to keywords in the knowledge domain. Pretraining stages can also employ tasks other than MLM, e.g. next word prediction.

In other examples, pretraining can combine one or more stages using general corpora with one or more stages using corpora specific to the target deployment. In further examples, pretraining can include both a variety of corpora and a variety of pretraining objectives. Additional pretraining stages with general or target-specific corpora can also be implemented, as indicated by the ellipses within process block 610.

Following completion of pretraining 610, the method proceeds to block 620, where expansion ML tool 636 can be fine-tuned with a training dataset derived from a target-specific corpus. The training dataset can include a set S1 of training records, for which both training inputs and desired responses are created by a human who is an expert on all or part of the target-specific corpus. The training dataset can include a set S2 of training records, for which the training inputs are created by a human who is not an expert on the target-specific corpus, and the corresponding desired responses are created by a human expert. The training dataset can include a set S3 of synthesized training records.

Training records can include a set S4 of one or more training records for which the desired response is an answer to the training input; a set S5 of one or more training records for which the desired response includes a clarification directed toward client interface 631; or a set S6 of one or more training records for which the desired response includes an output directed toward core microservice 639.

In some examples, expansion ML tool 636 can be an encoder-decoder transformer neural network, another LLM, an LMM, or a DNN.

Figure 7:
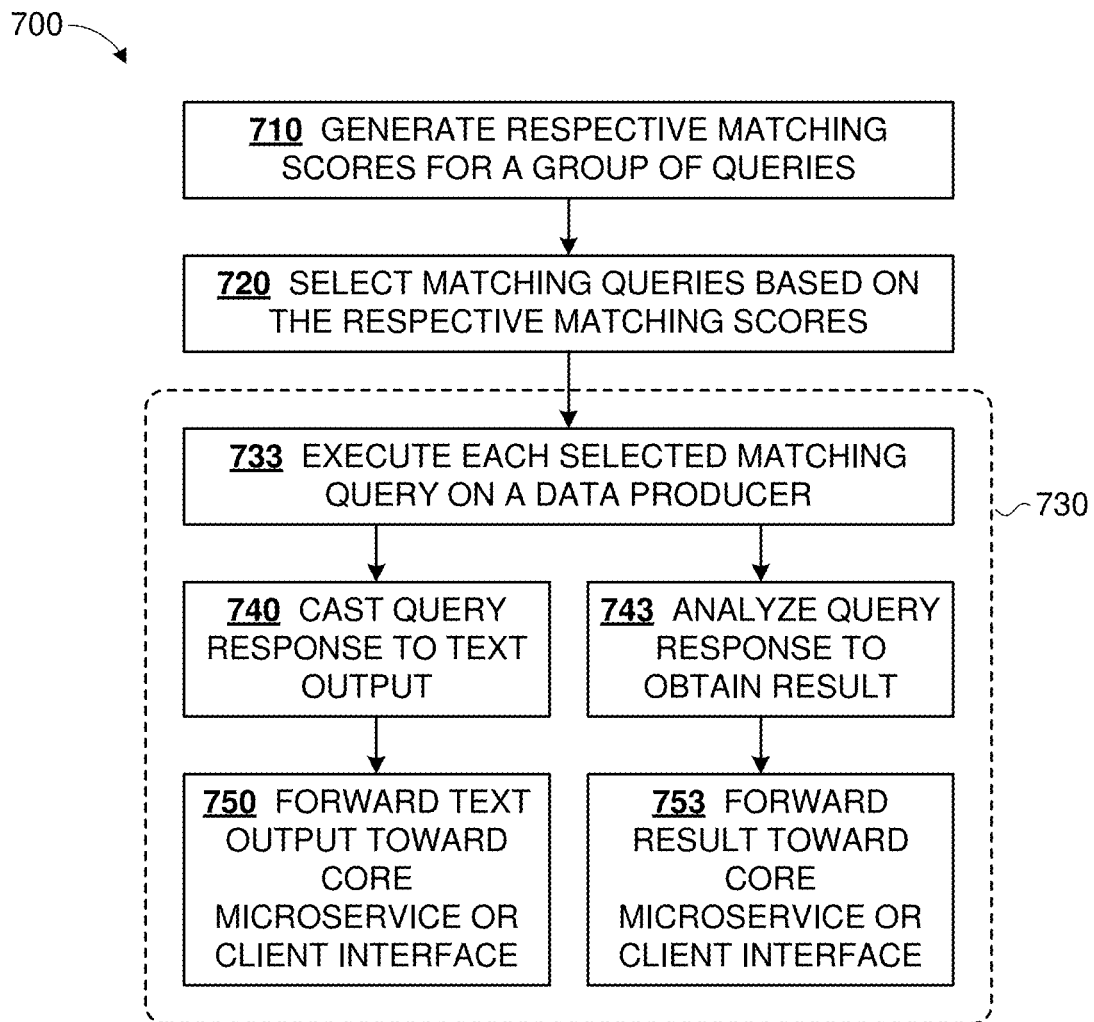
FIG. 7 is a flowchart illustrating example techniques for interfacing with an API at a data producer, according to the disclosed technologies.

Performing fine-tuning in multiple stages can also be beneficial, e.g. with a corpus (from which training data is drawn) being progressively narrowed to a target knowledge domain, a target application, or a specific task at hand Example Interfacing with API at Data Producer FIG. 7 is a flowchart 700 illustrating example techniques for interfacing with an API at a data producer. Inputs and outputs among microservices in a copilot can be based on tokens, documents, or other data items, e.g. often based on text elements. However, audio, image, or other forms of data can also be used. FIG. 7 illustrates techniques for transforming such an input received by a data producer into a valid API query, and techniques for transforming responses according to the API into outputs which are compatible with other copilot microservices. In varying examples, illustrated input-side and output-side techniques can be used individually or together. Some data producers of interest herein incorporate or are coupled to databases supporting SQL as an API; however the disclosed techniques can be widely applied to other data stores and other APIs.

At process block 710, respective matching scores can be generated for each of a group of API queries, relative to an input received by an instant data producer. That is, the API queries can be determined prior to receipt of the input, and can be guaranteed to be valid queries by construction. The group of API queries can be a library of all possible queries, which can include or be restricted to (i) API fully-qualified queries, which are free of variables, or (ii) API query templates, which can have one or more variables. That is, the group of API queries can be independent of the input. In further examples, such a comprehensive library can be available to process block 710 but, to improve computational efficiency, the generation of matching scores can be terminated when a predetermined number of API queries have been found to have respective scores greater than or equal to a predetermined threshold. Each matching score can be a similarity score.

At process block 720, one or more matching queries can be selected from the group of API queries based on the respective matching scores of the matching queries. To illustrate, the three API queries having highest matching scores can be selected as the matching queries. As another illustration, all API queries having matching scores greater than or equal to a predetermined threshold can be selected. Thus, process blocks 710, 720 can transform a received input into one or more matching API queries. The set of API queries is often of modest size, often numbering in a range 2-200, or 10-50. Consequently, the simple computation of matching scores can have lower computational burden than conventional approaches based on machine learning or heuristics. Moreover, this innovative technique can be guaranteed to produce valid API queries. Some conventional approaches can generate queries which look reasonable but are in fact invalid.

Numerous variations and extensions can be implemented within scope of the disclosed technologies. Dashed outline 730 indicates some optional extensions to the method, which can be applied in conjunction with process blocks 710, 720, or independently. At block 733, each selected matching API query can be executed at the data producer, to obtain a respective response according to the instant API.

In examples, the data producer can incorporate live data, allowing the copilot to utilize up-to-date data for addressing client inputs. Live data can include emails, other messaging repositories, an internal database of an organization, or a data source external to an organization. External data sources can include a weather forecast, a stock ticker, or a news feed. As live data is updated, incremental fine-tuning of a core microservice can also be performed. To illustrate, a small batch fine-tuning can be performed when an amount of updated data exceeds a predetermined threshold, which can be specified as a number of data records, a storage amount denominated in megabytes or similar unit, or a number of documents. In other examples, incremental fine-tuning can be performed periodically, e.g. once an hour, once a day, or once a week.

In some situations, no suitable query may be found at block 720. In some examples, a data producer can respond to the received input with a notification indicating that the received input is outside the data producer's scope. However, in other examples, this situation can be addressed by updating the library of available API queries and repeating block 710. FIG. 7 also illustrates techniques for handling responses obtained from query execution at block 733. In some examples, the response can be cast into text output at process block 740. To illustrate, a floating point numerical value 4.17 can be cast into a text string "4.17" or into a longer text string "the length dimension is 4.17 cm" e.g. based on the numerical value being found in a length field, and a database schema defining that lengths are specified in cm. At block 750, the text output can be forwarded toward the core microservice, as additional data to be used in responding to client input. Alternatively, the text output can be evaluated by an evaluation microservice and, if the text output itself contains a satisfactory response to the client input, then the text output can be forwarded toward a client interface. Alternatively, in examples where copilot microservices exchange non-text input, the responses obtained from query execution can be cast into audio, image, or another form of output data.

In other examples, the response can be analyzed at process block 743 to obtain a result. To illustrate, a series of temperature data can be analyzed to determine e.g. mean, standard deviation, minimum, or maximum, which can be formatted as a text result, e.g. "the average temperature in February is 45°. Daily highs range from 55° to 65° and daily lows range from 25° to 35°." As another illustration, the temperature data can be analyzed to produce a visual chart. Results can also be in the form of a database record (e.g. selecting one among a group of records returned from a database), an audio clip, or an image (e.g. a photo or avatar of an author of a document or message). Then, at block 753, the result can be forwarded toward the core microservice or the client interface.

Disclosed techniques can be applied to a wide range of data producers, including without limitation data producers incorporating an SQL database, a no-SQL database, an email repository, a message repository, or a learning management store. The disclosed techniques can be applied to a wide range of APIs, including database APIs such as Amazon RDS (Relational Database Service), GraphQL, Gremlin, IBM DB2, Malloy, N1QL (SQL++ ANSI Database Query Language), PostGreSQL, PRQL (Pipelined Relational Query Language), SQL (Structured Query Language), WebAssembly, and others. Compatible APIs can also use any of a wide range of application layer protocols, such as FTP (File Transfer Protocol), HTTP (Hypertext Transfer Protocol), IMAP (Internet message access protocol), NFS (Network File System), POP (Post Office Protocol), or SMTP (Simple Mail Transfer Protocol). In further examples, compatible APIs can use any of a wide range of messaging protocols, such as AMQP (Advanced Message Queuing Protocol), CoAP (Constrained Application Protocol), DDS (Data Distribution Service), IRC (Internet Relay Chat), MQTT (Message Queuing Telemetry Transport), RCS (Rich Communication Services), or XMPP (Extensible Messaging and Presentation Protocol).

Some example copilots implement multiple data producers, and the disclosed techniques can be applied to some or all of these data producers.

Example Data Qualification

Figure 8:
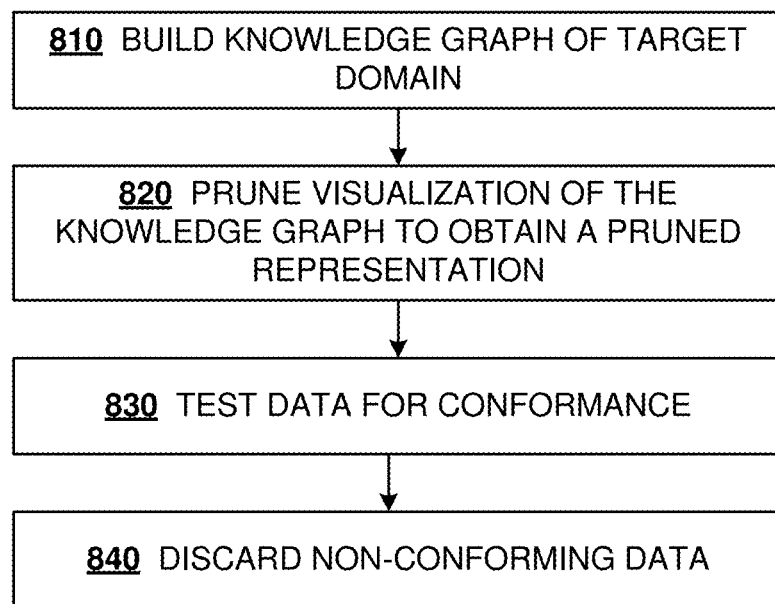
FIG. 8 is a flowchart illustrating example operations of a qualification microservice according to the disclosed technologies.

FIG. 8 is a flowchart 800 illustrating example operations of a qualification microservice. Illustrated operations can be used to check whether inputs to or outputs from various microservices conform with a copilot's sphere of competence. Irrelevant data provided to a microservice can increase risk of hallucination by a copilot, and accordingly it can be beneficial to restrict microservice inputs to those lying within the copilot's competence. Irrelevant data provided by a microservice can be a hallucination, or can mislead a downstream microservice or client as to the competence of the microservice providing such data. Accordingly, it can be beneficial to qualify data inputted to or outputted from various microservices by testing for conformance with the copilot's sphere of competence, and discarding non-conforming data. For example, it can be advantageous to test inputs to or outputs from a core microservice. However, the techniques of FIG. 8 are not so limited, and qualification microservices can be invoked at numerous other points within a copilot microservice architecture.

Process blocks 810, 820 pertain to configuration of a qualification microservice. At process block 810, a knowledge graph of a target domain can be constructed. The target domain can be the copilot's knowledge domain. In examples, the knowledge graph can be based on training data used to train one or more of microservices of the copilot, or documents or data repositories in the target domain.

At block 820, a visualization of the knowledge graph can be pruned to obtain a pruned domain representation. Because a knowledge corpus can often contain a substantial amount of irrelevant data (e.g. email correspondence regarding scheduling meetings to discuss a topic, or technical documentation outside the intended copilot knowledge domain), pruning the knowledge graph can facilitate discrimination between relevant and irrelevant data outputted by e.g. a retrieval microservice toward a core microservice. Presentation of the knowledge graph as a visualization can facilitate pruning by a human, as relevant and irrelevant knowledge can appear as separable clusters within the graph visualization. The pruned domain representation can be in the same form as the knowledge graph or its visualization, or a different form. Because vector representations can be easy to work with, in some examples the pruned visualization can be cast into vector representations derived from the knowledge graph.

The pruned domain representation can be used for discriminating between relevant data, which conforms with the pruned domain representation, and irrelevant data, which does not. Process blocks 830, 840 illustrate such usage.

At process block 830, data can be tested for conformance. In some examples, the tested data can be obtained directly or indirectly from a retrieval microservice, and data determined to be conforming can be forwarded to a core microservice. In other examples, the tested data can be obtained directly or indirectly from a core microservice, and data determined to be conforming can be forwarded to an evaluation microservice or toward a client interface. In further examples, a qualification microservice can be positioned on other data paths within a copilot, e.g. at paths leading to a retrieval microservice from a data producer or an intermodal microservice. Various criteria can be used to test for conformance. In some examples, an envelope can be defined based on nodes of the pruned visualization of the knowledge graph. A test criterion can be whether a tested data object lies within this envelope. Another test criterion can be whether a distance measure between the tested data and a node of the knowledge graph is less than or equal to a predetermined threshold.

Following testing, data determined to be non-conforming can be discarded at process block 840.

Numerous variations and extensions can be implemented within scope of the disclosed technologies, some of which are described in context of FIG. 8, or elsewhere herein. In some examples, pruning can be performed interactively. All or part of a visualization of a knowledge graph can be displayed to a user on a graphical user interface. The user can inspect the visualization and can graphically select or mark portions of the knowledge graph to be retained or deleted. Removal of portions marked for deletion or portions not marked for retention can effect the pruning. In further examples, non-conforming data can be forwarded to a reinforcement learning subsystem (e.g. similar to RLHF subsystem Inn) for incorporation into training records used by the reinforcement learning subsystem.

Example Performance and Advantages

The inventors have tested embodiments of the disclosed technologies, collectively having a family name "Thia." Some comparisons have been performed between Thia versions having one or more innovative features disclosed herein and a publicly available tool commonly known as "GPT-4o." Additional comparisons have been performed between Thia versions differing in one or more innovative features disclosed herein.

The tested versions of Thia were fine tuned in knowledge domains related to gardening, agriculture, and pest management. In varying examples, core microservices of tested Thia versions were based on publicly available Gemma-2-9b (a 9-billion parameter LLM), Llama-3.1-8b-instruct (an 8-billion parameter LLM), or Mistral-7b (a 7 billion parameter LLM). These Thia versions are referred to as Thia (Gemma), Thia (Llama), and Thia (Mistral) respectively. Each tested Thia version was a network of microservices as described herein, e.g. in context of FIGS. 1-2, and includes at least an expansion microservice (120, 220), a retrieval microservice (130, 230), a core microservice (181a, 281), and an evaluation microservice (129, 209).

These Thia versions were implemented using a single CPU coupled to a single GPU (models RTX 4090, A100, or H100, NVIDIA Corp., Santa Clara, CA), and had a total parameter count for all microservices under 15 billion. A commercially available computer such as Lenovo Legion Pro 7i Gen 8 16" Gaming Laptop (Lenovo, Morrisville NC) can be used, featuring an Intel Core i9-13900HX CPU and an NVIDIA GeForce RTX 4090 GPU. In comparison, GPT-4o is believed to have over 200 billion parameters, and can be implemented using 10 or more GPUs.

Ratings were performed using a distinct publicly available ML tool known as "GPT-4o mini," used e.g. to rate answers for accuracy on a scale of 1 to 5, or to determine a percentage of hallucinations.

Using a common set of 290 questions, GPT-4o was rated as having an answer accuracy of 4.59, while Thia versions were rated consistently higher at 4.72 (Thia (Llama)), 4.72 (Thia (Gemma)), and 4.67 (Thia (Mistral)). Thus, disclosed microservice network copilots are seen to outperform a state of the art monolithic LLM, despite the former having less than one tenth the size and using one tenth the compute hardware of the latter.

The following examples are instructive. Reference documents can be provided to a Thia core microservice via RAG at retrieval microservice (130).

First Example Input: "How do I control crapemyrtle bark scale?" One of the available reference documents cautions "The downside of using a systemic insecticide is that it is absorbed into the leaves and flowers, and hence could impact other insects and bees." But the GPT-4o output contains no such caution, stating instead "Systemic Insecticides: Apply a systemic insecticide, such as imidacloprid or dinotefuran, as a soil drench or trunk injection in late winter or early spring. These products are taken up by the plant and can control scales as they feed." In contrast, Thia states with citation "Systemic insecticides can be effective, but they may pose risks to pollinators. It's crucial to avoid using neonicotinoids due to their harmful impact on bees [5]." The disclosed microservice architecture leads to nuanced, accurate results, while the comparative monolithic LLM ignores an important warning, potentially leading to adverse outcomes.

Second Example Input: "skyflower plant what is it like?". The reference documents disclose "Skyflower: *Hydrolea corymbosa:*" and "It can reach up to 3 feet in height and multi-stemmed specimens can have a spread of 1 foot" but GPT-4o incorrectly states "The Skyflower (*Thunbergia grandiflora*)" and also gets other details wrong "often reaching heights of 10-20 feet or more". In contrast, Thia correctly states "skyflower plant (*Hydrolea corymbosa*)" and "It typically grows up to 3 feet in height and can spread up to 1 foot". Again, the disclosed microservice architecture leads to accurate results, while the comparative monolithic LLM provides inaccurate output.

Thia (Gemma) requires much fewer computing resources for training than GPT-4o. Using energy consumption as a measure of computing resources, Thia (Gemma) can be trained in about 0.5 GWh. In comparison, training GPT-4o has been estimated to require about 50 GWh.

Thia (Mistral) and Thia (Llama) versions were able to process inputs of length 3500 tokens in about 20.5 and 21.0 seconds respectively, considerably faster than about 50.8 seconds for GPT-4o.

In further tests, hallucination tests were performed on Thia versions incorporating a qualification microservice (a version of microservice 170 of FIG. 1A). These qualification microservices were configured to utilize a pruned visualization of a knowledge graph of the copilot domain, built and applied as described herein in context of FIG. 8. Hallucination percentages were evaluated using GPT-4o-mini. Tested Thia versions were raged as having hallucination percentages of 7.2 (Thia (Gemma)), 9.3 (Thia (Llama)), and 10 (Thia (Mistral)). A corresponding hallucination percentage for GPT-4o (without a corresponding qualification microservice) was found to be roughly twice as high, 18.3%. Once again, disclosed microservice network copilots outperform a much larger and more compute-intensive state of the art monolithic LLM.

Hallucination was also used to measure the effectiveness of retrieval augmented generation (RAG) in Thia. Thia (Llama) without any retrieval microservice was found to have a hallucination percentage of 30.7. The hallucination percentage was reduced to 9.3 with multiple recursive RAG iterations.

Third Example Input: "SWFAL testing prices". The reference documents disclose "SWAFL testing fees [ . . . ] Water (Irrigation, Household (Excluding Bacterial Test which is performed at most County Health Departments) & Livestock) $15" and "nBasic Feed/Forage Test (Protein, Moisture, ADF, TDN & Net energy: gain, lactation & maintenance) $24". But GPT-4o incorrectly reported "Routine Water Test (pH, Electrical Conductivity, Total Dissolved Solids, Nitrate): $20 per sample" and "Forage Testing:\n1. Routine Forage Test (Protein, TDN, NDF, ADF): $14 per sample". In contrast, Thia correctly states "water testing (irrigation, household, and livestock) costs $15" and "a basic feed/forage test (protein, moisture, ADF, TDN, and net energy) costs $24." Once again, the disclosed microservice architecture with a qualification microservice leads to accurate results, while the comparative monolithic LLM hallucinates and provides manifestly incorrect output.

The efficacy of multiple training stages was evaluated using varying numbers of fine-tuning stages because fine-tuning often requires less compute resources than pretraining. Thus, a pretrained expansion microservice based on Llama-3.1-8b was tested with zero, one, and two fine-tuning stages. The fine-tuning objective was to expand a text input into a valid SQL query which can be inputted to an SQL data producer. GPT-4o was used as a measuring tool to assess whether the output SQL query was a valid query for the given input. The fraction of inputs resulting in valid queries increased from 78.6% with no fine-tuning, 82.0% with one fine-tuning stage, to 87.4% with two fine-tuning stages. Similar performance improvements can be expected with increasing numbers of pretraining stages.

Innovative techniques for converting text inputs into API queries were also evaluated, based on speed or throughput. An innovative text-to-SQL LLM (a version of microservice 145 of FIG. 1A) was implemented using Llama-3.1-8b. This LLM generated matching scores between received input and each of a group of API queries, and selected API queries for execution based on their having high respective matching scores. This innovative LLM processed 207.8 tokens per second on average, with a median time of 262 ms. GPT-4o-mini was used as a comparative LLM, using conventional API query generation, and processed only 57.1 tokens per second on average, with a median processing time of 421 ms. Because query execution occurs similarly in both systems, the performance difference between the innovative LLM and GPT-4o-mini can be ascribed to difference in algorithms for conversion of text input into an API query. Thus, the innovative technique using matching scores provides nearly 4× improvement in throughput and about 40% reduction in median processing time. Because GPT-4o-mini is generally regarded as more powerful than Llama-3.1-8b, using the latter in a comparative system, e.g. without the innovative API query generation technique, is expected to result in even wider gaps between the comparative and innovative systems.

Additional Examples

The following are additional examples of the disclosed technologies.

Example 1 is one or more computer readable media storing instructions executable by one or more hardware processors, wherein the instructions include: a plurality of modules which, when executed by the one or more hardware processors, implement respective microservices, the microservices forming a weakly connected network of microservices configured as a copilot to one or more first client applications; wherein each of the microservices is configured to: receive input from (i) a respective first group including one or more others of the microservices or (ii) one or more second client applications; and transmit output to (i) a second group including one or more of the microservices or (ii) one or more third client applications; wherein the network of microservices includes at least an expansion microservice, a retrieval microservice, one or more core microservices, and one or more evaluation microservices; and wherein a plurality of the microservices incorporate respective trained machine learning tools.

Example 2 includes the subject matter of Example 1, and further specifies that at least one microservice among the expansion microservice, the retrieval microservice, or the core microservices incorporates a respective large language model (LLM).

Example 3 includes the subject matter of any of Examples 1-2, and further specifies that the expansion microservice is configured to: receive first input including one or more language tokens; determine and transmit first output including one or more tokens associated with but distinct from the received language tokens.

Example 4 includes the subject matter of Example 3, and further specifies that the expansion microservice implements an expansion LLM.

Example 5 includes the subject matter of any of Examples 1-4, and further specifies that the network of microservices further includes an intermodal microservice configured to respond to second input including one or more tokens in a first mode by determining and transmitting second output including language tokens associated with the second input.

Example 6 includes the subject matter of Example 5, and further specifies that the intermodal microservice implements an intermodal LLM.

Example 7 includes the subject matter of any of Examples 1-6, and further specifies that the retrieval microservice is configured to: receive third input; perform retrieval augmented generation (RAG) based on the third input by retrieving fourth input, including one or more data objects related to the third input, from one or more data producers among the microservices; and determine and transmit fourth output, based on the third and fourth inputs, toward one or more of the core microservices.

Example 8 includes the subject matter of Example 7, and further specifies that the retrieval microservice is further configured to repeat the RAG action based on the fourth or successive inputs until a first termination condition is met.

Example 9 includes the subject matter of any of Examples 7-8, and further specifies that a given one of the one or more data producers includes: an embedding microservice configured to: receive a fifth input from the retrieval microservice; and determine and transmit a fifth output including one or more vector embeddings representative of at least portions of the fifth input; and a document microservice storing, in a document repository, documents indexed by vector representations and configured to: receive a sixth input including one or more vector representations; and identify and transmit one or more of the documents having content similar to at least portions of the sixth input; wherein the RAG action is performed by: invoking the embedding microservice, the fifth input being based on the third input; and invoking the document microservice, the sixth input being based on the fifth output.

Example 10 includes the subject matter of any of Examples 7-9, and further specifies that a given one of the one or more data producers includes a database microservice configured to: receive a seventh input; retrieve, from one or more databases, database objects relevant to the seventh input; and determine and transmit a seventh output based on the retrieved database objects; wherein the RAG action is performed by invoking the database microservice, the seventh input being based on the third input.

Example 11 includes the subject matter of Example 10, and further specifies that the microservices further include a database indexing microservice configured to: generate or maintain at least one index from the one or more databases, wherein the retrieval of the database objects utilizes the at least one index.

Example 12 includes the subject matter of any of Examples 10-11, and further specifies that the microservices further include a database post-processing microservice configured to: transform one or more of the retrieved database objects from a non-text representation into text; or transform one or more of the retrieved database objects into a visualization.

Example 13 includes the subject matter of any of Examples 7-12, and further specifies that a given one of the one or more data producers includes a messaging microservice configured to: receive an eighth input; retrieve, from one or more message repositories, messages or metadata relevant to the eighth input; and determine and transmit an eighth output based on the retrieved messages or metadata; wherein the RAG action is performed by invoking the database microservice, the eighth input being based on the third input.

Example 14 includes the subject matter of Example 13, and further specifies that the messages include email, voicemail, text messages, instant messages, video messages, multi-mode messages, or attachments thereto; and the metadata pertains to the messages.

Example 15 includes the subject matter of any of Examples 13-14, and further specifies that the microservices further include a message indexing microservice configured to: generate or maintain at least one index from the one or more message repositories, wherein the retrieval of the messages or metadata utilizes the at least one index.

Example 16 includes the subject matter of any of Examples 7-15, and further specifies that the microservices further include a qualification microservice configured to: receive a ninth input; compare the ninth input with a graphical model of a knowledge corpus incorporated in the copilot; determine whether the copilot is competent to act on the ninth input; upon determining that the copilot is competent: determine and transmit ninth output based on the ninth input, toward at least one of the core microservices; and upon determining that the copilot is not competent, transmit a notification indicating lack of competence.

Example 17 includes the subject matter of any of Examples 7-16, and further specifies that a given core microservice of the one or more core microservices includes: one or more of the trained ML tools and, coupled thereto, zero or more long-term memories; wherein the given core microservice is configured to: receive a tenth input; apply at least one of the one or more trained ML tools to the tenth input, to determine a tenth output; and transmit the tenth output.

Example 18 includes the subject matter of Example 17, and further specifies that the one or more trained ML tools are two or more trained ML tools which are peers trained according to respective levels of client authorization, and the given core microservice is further configured to: select a given ML tool among the two or more trained ML tools according to the level of client authorization associated with the tenth input; wherein the determining the tenth output is performed by applying the given model.

Example 19 includes the subject matter of any of Examples 17-18, and further specifies that the zero or more long-term memories are one or more long-term memories, each maintaining history for a respective client entity.

Example 20 includes the subject matter of any of Examples 17-19, and further specifies that the one or more core microservices include an ensemble of the core microservices including the given core microservice.

Example 21 includes the subject matter of Example 20, and further specifies that the core microservices of the ensemble are peers trained for respective cognitive functions.

Example 22 includes the subject matter of Example 21, and further specifies that the cognitive functions include two or more of: next word prediction, causal reasoning, sentiment analysis, chain-of-thought reasoning, arithmetic reasoning, summarization, table-to-text generation, zero-shot generalization, corrupt span prediction.

Example 23 includes the subject matter of any of Examples 20-22, and further specifies that the ensemble of core microservices forms at least one cycle, within which each core microservice other than the given core microservice is coupled to: receive eleventh input from a neighboring first core microservice of the ensemble; apply at least one of the LLMs to the eleventh input, to determine an eleventh output; and transmit the eleventh output to a neighboring second core microservice distinct from the first core microservice.

Example 24 includes the subject matter of any of Examples 17-23, additionally specifying that the given core microservice is further configured to: determine whether to request a clarification regarding at least a portion the tenth input; and, responsive to the determination being affirmative, issue a request for clarification toward a source microservice whose output led to receipt of the tenth input.

Example 25 includes the subject matter of any of Examples 17-24, and further specifies that each of the one or more evaluation microservices is configured to: receive twelfth input including the output of another microservice; and analyze the twelfth input; wherein a further one or more of the microservices are invoked based on the analyzing.

Example 26 includes the subject matter of Example 25, and further specifies that a given evaluation microservice of the one or more evaluation microservices is configured to perform the analyzing using: a corresponding trained ML tool of the trained ML tools; another trained machine learning module; or freestanding procedural logic.

Example 27 includes the subject matter of any of Examples 25-26, and further specifies that the evaluation microservices include: a first evaluation microservice for which the twelfth input is derived from the fourth input received by the retrieval microservice, and the analysis of which leads to a determination whether to perform another RAG iteration; a second evaluation microservice for which the twelfth input is derived from the tenth output generated by the given core microservice, and the analysis of which leads to a determination whether to perform additional invocations among the one or more core microservices; or a third evaluation microservice for which the twelfth input is derived from the tenth output generated by the given core microservice, and the analysis of which leads to a determination whether to perform another RAG iteration.

Example 28 includes the subject matter of any of Examples 1-27, and further specifies that the copilot is configured to perform causal reasoning and has a total parameter count under 150 billion.

Example 29 includes the subject matter of Example 28, and further specifies that the copilot exhibits emergent behavior.

Example 30 is a system, including the one or more computer readable media of any of Examples 1-29; and the one or more hardware processors, with memory coupled thereto.

Example 31 includes the subject matter of Example 30, and further specifies that: the minimum processors required to run the copilot is one general-purpose processor (CPU) chip and one graphics processing unit (GPU) chip; and the one or more hardware processors include the CPU chip coupled to the GPU chip.

Example 32 is a method performed by a copilot including a network of microservices, the method including: receiving client input from a first client; at an expansion microservice: receiving a first input including one or more language tokens, including or derived from the client input; determining first output including one or more tokens associated with but distinct from the first input; and transmitting the first output toward a retrieval microservice; at the retrieval microservice: receiving a third input including or derived from the first output; performing retrieval augmented generation (RAG) based on the third input to retrieve fourth input, including one or more data objects related to the third input, from one or more data producers among the microservices; determining and transmit fourth output, based on the third and fourth inputs, toward one or more core microservices including a given core microservice; at the given core microservice: receiving a tenth input including or derived from the fourth output; applying at least one trained machine learning (ML) tool to the tenth input, to determine a tenth output; and transmitting the tenth output toward an evaluation microservice; at an evaluation microservice: receiving twelfth input including or derived from the tenth output; and analyzing the twelfth input; determining whether to further invoke one or more of the expansion, retrieval, or core microservices based on the analyzing; determining client output from the tenth output or from results of the further invoking; and transmitting the client output to a second client.

Example 33 includes the subject matter of Example 32, and further specifies that the trained ML tool is a large language model (LLM).

Example 34 includes the subject matter of any of Examples 32-33, further incorporating acts corresponding to the features described for Example 9.

Example 35 includes the subject matter of any of Examples 32-34, further incorporating acts corresponding to the features described for Example 10.

Example 36 includes the subject matter of any of Examples 32-35, further incorporating acts corresponding to the features described for Example 13.

Example 37 includes the subject matter of Example 36, further incorporating acts corresponding to the features described for Example 14.

Example 38 includes the subject matter of any of Examples 32-37, further incorporating acts corresponding to the features described for Example 16.

Example 39 includes the subject matter of any of Examples 32-38, further incorporating acts corresponding to the features described for Example 23.

Example 40 includes the subject matter of any of Examples 32-39, further incorporating acts corresponding to the features described for Example 27.

Example B1 is a computer-implemented method for augmenting input for a core microservice of a copilot, including: receiving second input, which reflects first input from a client; recursively performing a plurality of iterations of retrieval augmented generation (RAG), each of the iterations including: transmitting third output to a data producer; and responsive to the transmitting, receiving fourth input from the data producer; wherein, on an initial iteration of the iterations, the third output is based on the second input; and wherein, on subsequent iterations of the iterations, the third output is based on the fourth input of an immediately preceding iteration of the iterations; and transmitting, toward the core microservice, fourth output including at least part of the fourth input received on a final iteration of the iterations; wherein the fourth output enables the core microservice to generate a response to the first input from the client.

Example B2 includes the subject matter of Example B1, and further includes: receiving the first input from the client; extracting one or more first tokens from the first input; determining one or more second tokens associated with but distinct from the first tokens; and generating a first output combining the first and second tokens; and transmitting the first output to a retrieval microservice, where the first output is received as the second input.

Example B3 includes the subject matter of any of Examples B1-B2, and further specifies that the second input includes a plurality of tokens, and the method further includes: executing the recursively performing acts individually for each of the plurality of tokens to obtain respective final fourth inputs on respective final iterations; wherein the fourth output includes, for each of the plurality of tokens, the fourth input of a final iteration of the iterations.

Example B4 includes the subject matter of Example B3, and further specifies that the fourth output includes the fourth input of each of the plurality of iterations.

Example B5 includes the subject matter of any of Examples B1-B4, and further includes: scoring, for relevance to the first or second input, constituents of the fourth inputs received on respective iterations of the plurality of iterations; retaining, in the fourth output, high-scoring constituents among the constituents of the fourth inputs; and discarding low-scoring constituents among the constituents of the fourth inputs.

Example B6 includes the subject matter of any of Examples B1-B5, and further specifies that the iterations are terminated upon meeting a stopping criterion, wherein: the stopping criterion includes completion of a predetermined number of the iterations.

Example B7 includes the subject matter of any of Examples B1-B6, and further specifies that the iterations are terminated upon meeting a stopping criterion, wherein: the stopping criterion includes an amount of new data in the fourth input being less than or equal to a first predetermined threshold.

Example B8 includes the subject matter of any of Examples B1-B7, and further specifies that the iterations are terminated upon meeting a stopping criterion, wherein: the stopping criterion includes two successive iterations of the iterations returning respective fourth inputs whose similarity is greater than or equal to a second predetermined threshold.

Example B9 includes the subject matter of any of Examples B1-B8, and further specifies that the iterations are terminated upon meeting a stopping criterion, wherein: the stopping criterion includes an increase in volume being less than or equal to a third predetermined threshold, the volume defined by the second input and successive iterations' fourth inputs in a graphical representation of a knowledge domain.

Example B10 includes the subject matter of any of Examples B1-B9, and further specifies that one or more of the third output, the fourth input, or the fourth output includes an array of elements, each of the elements including a document, a vector representation of a document, or a token derived from the second input.

Example B11 is one or more computer-readable media storing instructions which, when executed by one or hardware processors, cause the one or more hardware processors to perform operations for augmenting input for a core microservice of a copilot, the operations including: receiving second input, which reflects first input from a client application; recursively performing a plurality of iterations of retrieval augmented generation (RAG), each of the iterations including: transmitting third output to a data producer; and responsive to the transmitting, receiving fourth input from the data producer; wherein, on an initial iteration of the iterations, the third output is based on the second input; and wherein, on subsequent iterations of the iterations, the third output is based on the fourth input of an immediately preceding iteration of the iterations; and transmitting, toward the core microservice, fourth output including the fourth input received on a final iteration of the iterations; wherein the fourth output enables the core microservice to generate a response to the first input from the client application.

Example B12 includes the subject matter of Example B11, and further specifies that the operations further include: scoring, for relevance to the first or second input, constituents of the fourth inputs received on respective iterations of the plurality of iterations; retaining, in the fourth output, high-scoring constituents among the constituents of the fourth inputs; and discarding low-scoring constituents among the constituents of the fourth inputs.

Example B13 includes the subject matter of any of Examples B11-B12, and further specifies that the instructions are first instructions, the operations are first operations, and the one or more computer-readable media further store second instructions implementing the data producer which, when executed by the one or hardware processors, cause the one or more hardware processors to perform second operations including: receive, on a given iteration of the plurality of iterations, a seventh input based on the third output; retrieve, from one or more databases, database objects relevant to the seventh input; and determine and transmit a seventh output based on the retrieved database objects; wherein the fourth input corresponding to the third output is based on the seventh output.

Example B14 includes the subject matter of any of Examples B11-B13, and further specifies that the instructions are first instructions, the operations are first operations, the copilot further includes a qualification microservice, and the one or more computer-readable media further store third instructions implementing the qualification microservice which, when executed by the one or hardware processors, cause the one or more hardware processors to perform third operations including: receiving a ninth input based on the fourth output; comparing the ninth input with a graphical model of a knowledge corpus incorporated in the copilot; determining whether the copilot is competent to act on the ninth input; upon determining that the copilot is competent: determining and transmitting ninth output based on the ninth input, toward the core microservice; and upon determining that the copilot is not competent, transmitting a notification indicating lack of competence.

Example B15 is a system, including: one or more hardware processors, with memory coupled thereto; and one or more computer readable media storing instructions including a plurality of modules which, when executed by the one or more hardware processors, implement respective microservices, the microservices forming a weakly connected network of microservices configured as a copilot for one or more first client applications; wherein each of the microservices is configured to: receive input from (i) a respective first group including one or more others of the microservices or (ii) one or more second client applications; and transmit output to (i) a second group including one or more of the microservices or (ii) one or more third client applications; wherein a plurality of the microservices incorporate respective trained machine learning tools; wherein the network of microservices includes at least a retrieval microservice, one or more data producers, and a core microservice; wherein the retrieval microservice is configured to: receive second input, which reflects first input from a given one of the one or more first client applications; recursively perform a plurality of iterations of retrieval augmented generation (RAG), each of the iterations including: transmitting third output to a respective data producer of the one or more data producers; and responsive to the transmitting, receiving fourth input from the respective data producer; wherein, on an initial iteration of the iterations, the third output is based on the second input; and wherein, on subsequent iterations of the iterations, the third output is based on the fourth input of an immediately preceding iteration of the iterations; and transmit, toward the core microservice, fourth output including the fourth input received on a final iteration of the iterations; wherein the fourth output enables the core microservice to generate a response to the first input from the given first client application.

Example B16 includes the subject matter of Example B15, and further specifies that the respective data producer, at a given iteration of the iterations, includes: a document repository storing a plurality of documents; and an index storing vector representations of the stored documents.

Example B17 includes the subject matter of any of Examples B15-B16, and further specifies that the respective data producer, at a given iteration of the iterations, is a database microservice configured to: receive, on the given iteration, a seventh input based on the third output; retrieve, from one or more databases, database objects relevant to the seventh input; and determine and transmit a seventh output based on the retrieved database objects; wherein the fourth input corresponding to the third output is based on the seventh output.

Example B18 includes the subject matter of any of Examples B15-B17 wherein, for all of the iterations, the respective data producer is a common data producer.

Example B19 includes the subject matter of any of Examples B15-B18 wherein, for given first and second iterations of the iterations, the respective data producer for the first iteration is distinct from the respective data producer for the second iteration.

Example B20 includes the subject matter of any of Examples B15-B19, and further specifies that the network of microservices further includes a qualification microservice configured to: receive a ninth input based on the fourth output; compare the ninth input with a graphical model of a knowledge corpus incorporated in the copilot; determine whether the copilot is competent to act on the ninth input; upon determining that the copilot is competent: determine and transmit ninth output based on the ninth input, toward the core microservice; and upon determining that the copilot is not competent, transmit a notification indicating lack of competence.

Example C1 is a computer-implemented method of customizing a copilot for a target deployment, wherein the copilot includes a client interface, a core microservice, and an expansion microservice coupled therebetween, the expansion microservice includes a trained expansion machine learning (ML) tool, and the method includes: pretraining the expansion ML tool in a plurality of pretraining stages including two or more of: a first pretraining stage in which the expansion ML tool is pretrained on a first general corpus to optimize performance for a first task; a second pretraining stage in which the expansion ML tool is pretrained on a second general corpus to optimize performance for a second task distinct from the first task; a third pretraining stage in which the expansion ML tool is pretrained on synthesized training data derived from a pruned knowledge graph; or a fourth pretraining stage in which the expansion ML tool is pretrained on a target corpus specific to the target deployment; and subsequent to the pretraining, fine-tuning the expansion ML tool with a training dataset derived from the target corpus, the training dataset including a plurality of training records, each training record including a training input and a desired response.

Example C2 includes the subject matter of Example C1, and further specifies that the plurality of pretraining stages include the first, second, and fourth pretraining stages.

Example C3 includes the subject matter of any of Examples C1-C2, and further specifies that the first or second task is a masked language replacement task.

Example C4 includes the subject matter of any of Examples C1-C3, and further specifies that the plurality of pretraining stages includes the first and fourth pretraining stages, and the fourth pretraining stage optimizes performance on the first task.

Example C5 includes the subject matter of any of Examples C1-C4, and further specifies that the plurality of pretraining stages includes the fourth pretraining stage, the third pretraining stage optimizes performance on a fourth task, and the pretraining stages further include one or more fifth pretraining stages in which the expansion ML tool is pretrained on the target corpus to optimize performance for respective fifth tasks distinct from the fourth task.

Example C6 includes the subject matter of any of Examples C1-C5, and further includes: incorporating, into the training dataset, a first set of the training records for which the training inputs and the desired responses are created by a first human having expert knowledge of the target corpus; and at least one of: incorporating, into the training dataset, a second set of the training records for which the training inputs are created by a second human lacking expert knowledge of the target corpus, and the desired responses are created by the first human; or incorporating, into the training dataset, a third set of the training records synthesized based on the first set of the training records.

Example C7 includes the subject matter of any of Examples C1-C6, and further specifies that the training records include: one or more first training records for each of which the respective desired response is an answer to the respective training input; one or more second training records for each of which the respective desired response includes a clarification directed toward the client interface; and one or more third training records for each of which the respective desired response includes an output directed toward the core microservice.

Example C8 includes the subject matter of any of Examples C1-C7, and further specifies that the expansion ML tool is a large language model (LLM), large multimodal model (LMM), or deep neural network (DNN).

Example C9 includes the subject matter of any of Examples C1-C8, and further specifies that the expansion ML tool is configured as an encoder-decoder transformer neural network.

Example C10 is one or more computer-readable media storing instructions which, when executed by one or more hardware processors, cause the one or more hardware processors to perform operations for customizing an expansion machine learning (ML) tool of a copilot for a target deployment including: pretraining the expansion ML tool in a plurality of pretraining stages including two or more of: a first pretraining stage in which the expansion ML tool is pretrained on a first general corpus to optimize performance for a first task; a second pretraining stage in which the expansion ML tool is pretrained on a second general corpus to optimize performance for a second task distinct from the first task; a third pretraining stage in which the expansion ML tool is pretrained on synthesized training data derived from a pruned knowledge graph; or a fourth pretraining stage in which the expansion ML tool is pretrained on a target corpus specific to the target deployment; and subsequent to the pretraining, fine-tuning the expansion ML tool with a training dataset derived from the target corpus, the training dataset including a plurality of training records, each training record including a training input and a desired response.

Example C11 includes the subject matter of Example C10, and further specifies that the plurality of pretraining stages include the first, second, and fourth pretraining stages.

Example C12 includes the subject matter of any of Examples C10-C11, and further specifies that the expansion ML tool is a large language model (LLM), large multimodal model (LMM), or deep neural network (DNN).

Example C13 includes the subject matter of any of Examples C10-C12, and further specifies that the expansion ML tool is configured as an encoder-decoder transformer neural network.

Example C14 is a system, including: one or more hardware processors, with memory coupled thereto; and one or more computer readable media storing first and second instructions, the first instructions including a plurality of modules which, when executed by the one or more hardware processors, implement respective microservices, the microservices forming a weakly connected network of microservices configured as a copilot for one or more first client applications, and wherein: each of the microservices is configured to: receive input from (i) a respective first group including one or more others of the microservices or (ii) one or more second client applications; and transmit output to (i) a second group including one or more of the microservices or (ii) one or more third client applications; a plurality of the microservices incorporate respective trained machine learning tools; and the network of microservices includes at least an expansion microservice, including an expansion machine learning (ML) tool and coupled to a client interface, and a core microservice; output of the expansion microservice is directed toward the core microservice; and wherein the second instructions, upon execution by the one or more hardware processors, cause the one or more hardware processors to perform operations for customizing the copilot for a target deployment, the operations including: pretraining the expansion ML tool in a plurality of pretraining stages including two or more of: a first pretraining stage in which the expansion ML tool is pretrained on a first general corpus to optimize performance for a first task; a second pretraining stage in which the expansion ML tool is pretrained on a second general corpus to optimize performance for a second task distinct from the first task; a third pretraining stage in which the expansion ML tool is pretrained on synthesized training data derived from a pruned knowledge graph; or a fourth pretraining stage in which the expansion ML tool is pretrained on a target corpus specific to the target deployment; and subsequent to the pretraining, fine-tuning the expansion ML tool with a training dataset derived from the target corpus, the training dataset including a plurality of training records, each training record including a training input and a desired response.

Example C15 includes the subject matter of Example C14, and further specifies that the plurality of pretraining stages include the first, second, and fourth pretraining stages.

Example C16 includes the subject matter of any of Examples C14-C15, and further specifies that the first or second task is a masked language replacement task.

Example C17 includes the subject matter of any of Examples C14-C16, and further specifies that the plurality of pretraining stages includes the first and fourth pretraining stages, and the fourth pretraining stage optimizes performance on the first task.

Example C18 includes the subject matter of any of Examples C14-C17, and further specifies that the training records include: one or more first training records for each of which the respective desired response is an answer to the respective training input; one or more second training records for each of which the respective desired response includes a clarification directed toward the client interface; and one or more third training records for each of which the respective desired response includes an output directed toward the core microservice.

Example C19 includes the subject matter of any of Examples C14-C18, and further specifies that the expansion ML tool is a large language model (LLM), large multimodal model (LMM), or deep neural network (DNN).

Example C20 includes the subject matter of any of Examples C14-C19, and further specifies that the expansion ML tool is configured as an encoder-decoder transformer neural network.

Example C21 includes the subject matter of any of Examples C14-C20, and further specifies that: the fine-tuning operations are one of a plurality of fine-tuning stages performed subsequent to the pretraining; an earlier one of the fine-tuning stages is performed with a first training dataset; a later one of the fine-tuning stages is performed after the earlier one of the fine-tuning stages, with a second training dataset; the second training dataset is specific to the target deployment; and the first training dataset is more general than the second training dataset.

Example D1 is a computer-implemented method of transforming a received input into one or more matching API queries, including: for each query in a group of API queries, generating a matching score between the respective query and the received input; and selecting the one or more matching API queries from the group of API queries based on the respective matching scores of the one or more matching API queries.

Example D2 includes the subject matter of Example D1, and further specifies that the API queries are SQL queries.

Example D3 includes the subject matter of any of Examples D1-D2, and further specifies that the received input includes text.

Example D4 includes the subject matter of any of Examples D1-D3, and further specifies that the group of API queries is a library of all possible API fully-qualified queries or a library of all possible API query templates.

Example D5 includes the subject matter of any of Examples D1-D4, and further specifies that the group of API queries is independent of the received input.

Example D6 includes the subject matter of any of Examples D1-D5, and further specifies that the one or more matching API queries is one matching API query having a highest score among the generated matching scores.

Example D7 includes the subject matter of any of Examples D1-D6, and further specifies that the one or more matching API queries includes those queries in the group of API queries having respective matching scores greater than or equal to a predetermined threshold.

Example D8 includes the subject matter of any of Examples D1-D7, and further specifies that the group of API queries is a subset of a library of all possible API queries or a subset of a library of all possible API query templates, and wherein the generating is terminated when the generated matching scores satisfy a predetermined criterion.

Example D9 includes the subject matter of any of Examples D1-D8, and further includes: executing each of the one or more matching API queries at a data producer.

Example 10 includes the subject matter of Example D9, and further includes, for a given query of the executed API queries: casting a response to the given query into a text output; and transmitting the text output toward a core microservice or toward a client interface.

Example D11 includes the subject matter of any of Examples D9-D10, and further includes, for a given query of the executed API queries: analyzing a response to the given query to obtain a result; and transmitting the result toward a core microservice or toward a client interface.

Example D12 includes the subject matter of Example D11, and further specifies that the result includes: a text output, a database record, a chart, an audio clip, or an image.

Example D13 includes the subject matter of any of Examples D9-D12, and further specifies that the data producer includes: an SQL database, a no-SQL database, an email repository, a messaging repository, or a learning management store.

Example D14 includes the subject matter of any of Examples D1-D13, and further specifies that the API queries employ: an application layer protocol which is FTP, HTTP, IMAP, NFS, POP, or SMTP; or a messaging protocol which is AMQP, CoAP, DDS, IRC, MQTT, RCS, or XMPP.

Example D15 is one or more computer-readable media storing instructions which, when executed by one or hardware processors, cause the one or more hardware processors to perform operations including: for each query in a group of API queries, generating a matching score between the respective query and a received input; selecting one or more matching API queries from the group of API queries based on the respective matching scores of the one or more matching API queries; and outputting the one or more matching API queries in response to the received input for execution by a data producer.

Example D16 includes the subject matter of Example D15, and further specifies that the instructions are part of a copilot and the operations further include: receiving a response to a given query of the outputted API queries; and transmitting an output, based on the response, toward a core microservice of the copilot or toward a client interface.

Example D17 is a system, including: one or more hardware processors, with memory coupled thereto; and one or more computer readable media storing instructions including a plurality of modules which, when executed by the one or more hardware processors, implement respective microservices, the microservices forming a weakly connected network of microservices configured as a copilot for one or more first client applications; wherein each of the microservices is configured to: receive input from (i) a respective first group including one or more others of the microservices or (ii) one or more second client applications; and transmit output to (i) a second group including one or more of the microservices or (ii) one or more third client applications; wherein a plurality of the microservices incorporate respective trained machine learning tools; wherein the network of microservices includes at least a retrieval microservice and a data producer; wherein the data producer is configured to: receive a second input based on a first output from the retrieval microservice; for each query in a group of API queries, generate a matching score between the respective query and the received second input; select one or more matching API queries from the group of API queries based on the respective matching scores of the one or more matching API queries; and execute each of the one or more matching API queries.

Example D18 includes the subject matter of Example D17, and further specifies that the data producer is further configured to: produce a response to a given query of the executed API queries; and transmit a second output, based on the response, toward a core microservice of the copilot or toward a client interface.

Example D19 includes the subject matter of any of Examples D17-D18, and further specifies that the data producer includes live data.

Example D20 includes the subject matter of Example D19, and further specifies that the system is further configured to use the live data to perform incremental fine-tuning training on a core microservice of the copilot.

Example E1 is a method of filtering data within a copilot, including: building a knowledge graph of a target domain; pruning a visualization of the knowledge graph to obtain a pruned domain representation; testing the data for conformance with the pruned domain representation; and discarding non-conforming data.

Example E2 includes the subject matter of Example E1, and further specifies that the knowledge graph is built based on vector representations of documents of the target domain.

Example E3 includes the subject matter of any of Examples E1-E2, and further specifies that the pruned domain representation includes vector representations derived from the pruned visualization of the knowledge graph.

Example E4 includes the subject matter of any of Examples E1-E3, and further specifies that the conformance is determined based on: the tested data lying within an envelope defined based on nodes of the pruned visualization of the knowledge graph; or a distance measure between the tested data and a node of the knowledge graph being less than or equal to a predetermined threshold.

Example E5 includes the subject matter of any of Examples E1-E4, and further specifies that the data is obtained directly or indirectly from a retrieval microservice and conforming data is forwarded toward a core microservice.

Example E6 includes the subject matter of any of Examples E1-E5, and further specifies that the data is obtained directly or indirectly from a core microservice and conforming data is forwarded toward an evaluation microservice or a client interface.

Example E7 includes the subject matter of any of Examples E1-E6, and further specifies that the data is in one or more of: an audio mode, an image mode, a numerical mode, or a text mode.

Example E8 is one or more computer-readable media storing instructions which, when executed by one or more hardware processors, cause the one or more hardware processors to perform first operations including: building a knowledge graph of a target domain of a copilot; and pruning a visualization of the knowledge graph to obtain a pruned domain representation; wherein the pruned domain representation is configured to be used by a qualification microservice of the copilot to perform second operations including: testing data received by the qualification microservice for conformance with the pruned domain representation; and discarding non-conforming data.

Example E9 includes the subject matter of Example E8, and further specifies that the knowledge graph is built based on vector representations of documents of the target domain.

Example E10 includes the subject matter of any of Examples E8-E9, and further specifies that the pruned domain representation includes vector representations, and the pruning includes: deriving the vector representations from the pruned visualization of the knowledge graph.

Example E11 includes the subject matter of any of Examples E8-E10, and further specifies that the stored instructions, when executed by the one or more hardware processors, further cause the one or more hardware processors to perform the second operations.

Example E12 includes the subject matter of any of Examples E8-E11, and further specifies that the pruning is performed interactively.

Example E13 is a system, including one or more hardware processors, with memory coupled thereto; and one or more computer readable media storing instructions including a plurality of modules which, when executed by the one or more hardware processors, implement respective microservices, the microservices forming a weakly connected network of microservices configured as a copilot for one or more first client applications; wherein each of the microservices is configured to: receive input from (i) a respective first group including one or more others of the microservices or (ii) one or more second client applications; and transmit output to (i) a second group including one or more of the microservices or (ii) one or more third client applications; wherein a plurality of the microservices incorporate respective trained machine learning tools; wherein the network of microservices includes at least a retrieval microservice, a qualification microservice, and one or more core microservices; and wherein the qualification microservice is configured to: test data received by the qualification microservice for conformance with a pruned domain representation, the pruned domain representation being derived from a visualization of a knowledge graph of a target domain of the copilot; and discard non-conforming data.

Example E14 includes the subject matter of Example E13, and further specifies that the conformance is determined based on: the tested data lying within an envelope defined based on nodes of a pruned visualization of the knowledge graph.

Example E15 includes the subject matter of any of Examples E13-E14, and further specifies that the conformance is determined based on: a distance measure between the tested data and a node of the knowledge graph being less than or equal to a predetermined threshold.

Example E16 includes the subject matter of any of Examples E13-E15, and further specifies that the received data is based on output of the retrieval microservice, and the qualification microservice is further configured to: direct conforming data toward the one or more core microservices.

Example E17 includes the subject matter of any of Examples E13-E16, and further specifies that the network of microservices further includes an evaluation microservice, the received data is based on output of the one or more core microservices, and the qualification microservice is further configured to: direct conforming data toward the evaluation microservice.

Example E18 includes the subject matter of any of Examples E13-E17, and further specifies that the network of microservices further includes an intermodal microservice or a data producer from which the data is received by the qualification microservice, and the qualification microservice is further configured to: direct conforming data toward the retrieval microservice.

Example E19 includes the subject matter of any of Examples E13-E18, and further specifies that the data is in two or more of: an audio mode, an image mode, a numerical mode, or a text mode.

Example E20 includes the subject matter of any of Examples E13-E19, and further specifies that the copilot further includes a reinforcement learning subsystem, and the system is configured to: forward the non-conforming data toward the reinforcement learning subsystem for inclusion in a training record for the reinforcement learning subsystem.

A Generalized Computer Environment

Figure 9:
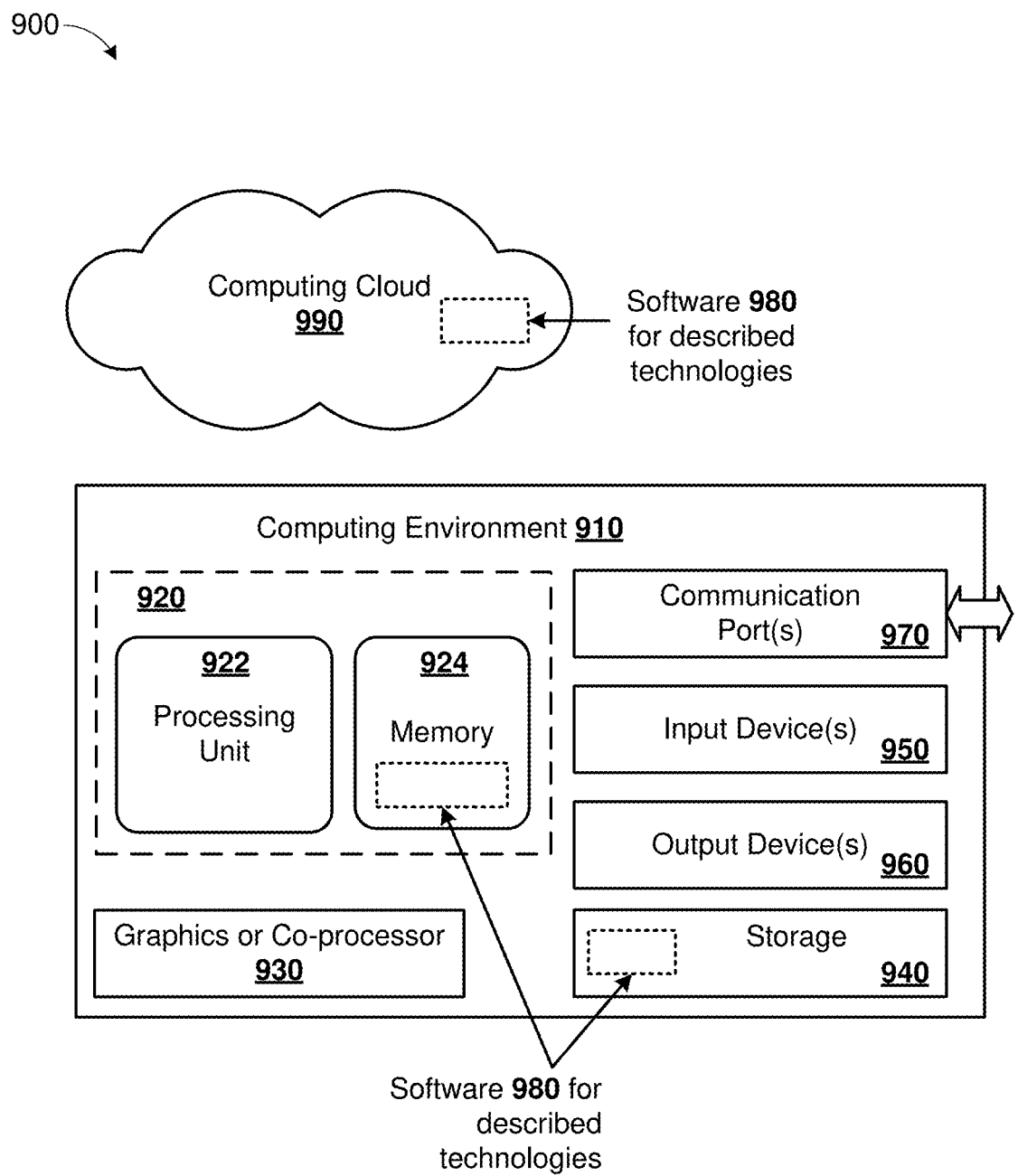
FIG. 9 is a diagram schematically depicting a computing environment suitable for implementation of disclosed technologies.

FIG. 9 illustrates a generalized example of a suitable computing system 900 in which described examples, techniques, and technologies for a copilot, a microservice network, or LLMs, including construction, deployment, operation, and maintenance of software, can be implemented according to disclosed technologies. The computing system 900 is not intended to suggest any limitation as to scope of use or functionality of the present disclosure, as the innovations can be implemented in diverse general-purpose or special-purpose computing systems.

With reference to FIG. 9, computing environment 910 includes one or more processing units 922 (e.g. a CPU) and memory 924. In FIG. 9, this basic configuration 920 is included within a dashed line. Processing unit 922 executes computer-executable instructions, such as for implementing any of the methods or objects described herein for operating microservices, associated LLMs, or a copilot, or various other architectures, software components, procedural logic, handlers, managers, modules, or microservices described herein. Processing unit 922 can be a general-purpose central processing unit (CPU), a processor in an application-specific integrated circuit (ASIC), or any other type of processor. In a multi-processing system, multiple processing units execute computer-executable instructions to increase processing power. Computing environment 910 can also include one or more graphics processing units or coprocessors 930 (e.g. a GPU). Tangible memory 924 can be volatile memory (e.g., registers, cache, or RAM), non-volatile memory (e.g., ROM, EEPROM, or flash memory), or some combination thereof, accessible by processing units 922, 930. The memory 924 stores software 980 implementing one or more innovations described herein, in the form of computer-executable instructions suitable for execution by the processing unit(s) 922, 930. The memory 924 can also store LLM parameters, inputs, outputs, data extracted from repositories, histories, evaluation results, cached data; other configuration data, data structures including data tables, working tables, change logs, output structures, data values, indices, or flags, as well as other operational data.

A computing system 910 can have additional features, such as one or more of storage 940, input devices 950, output devices 960, or communication ports 970. An interconnection mechanism (not shown) such as a bus, controller, or network interconnects the hardware components of the computing environment 910. Typically, operating system software (not shown) provides an operating environment for other software executing in the computing environment 910, and coordinates activities of the hardware and software components of the computing environment 910.

The tangible storage 940 can be removable or non-removable, and can include magnetic disks, magnetic tapes or cassettes, CD-ROMs, DVDs, or any other medium which can be used to store information in a non-transitory way and which can be accessed within the computing environment 910. The storage 940 stores instructions of the software 980 (including instructions and/or parameter data) implementing one or more innovations described herein, databases, other data repositories, or other data.

The input device(s) 950 can be a mechanical, touch-sensing, or proximity-sensing input device such as a keyboard, mouse, pen, touchscreen, trackball, a voice input device, a scanning device, or another device that provides input to the computing environment 910. The output device (s) 960 can be a display, printer, speaker, optical disk writer, or another device that provides output from the computing environment 910.

The communication port(s) 970 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 900 can also include a computing cloud 990 in which instructions implementing all or a portion of the disclosed technologies are executed. Any combination of memory 924, storage 940, and computing cloud 990 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 10:
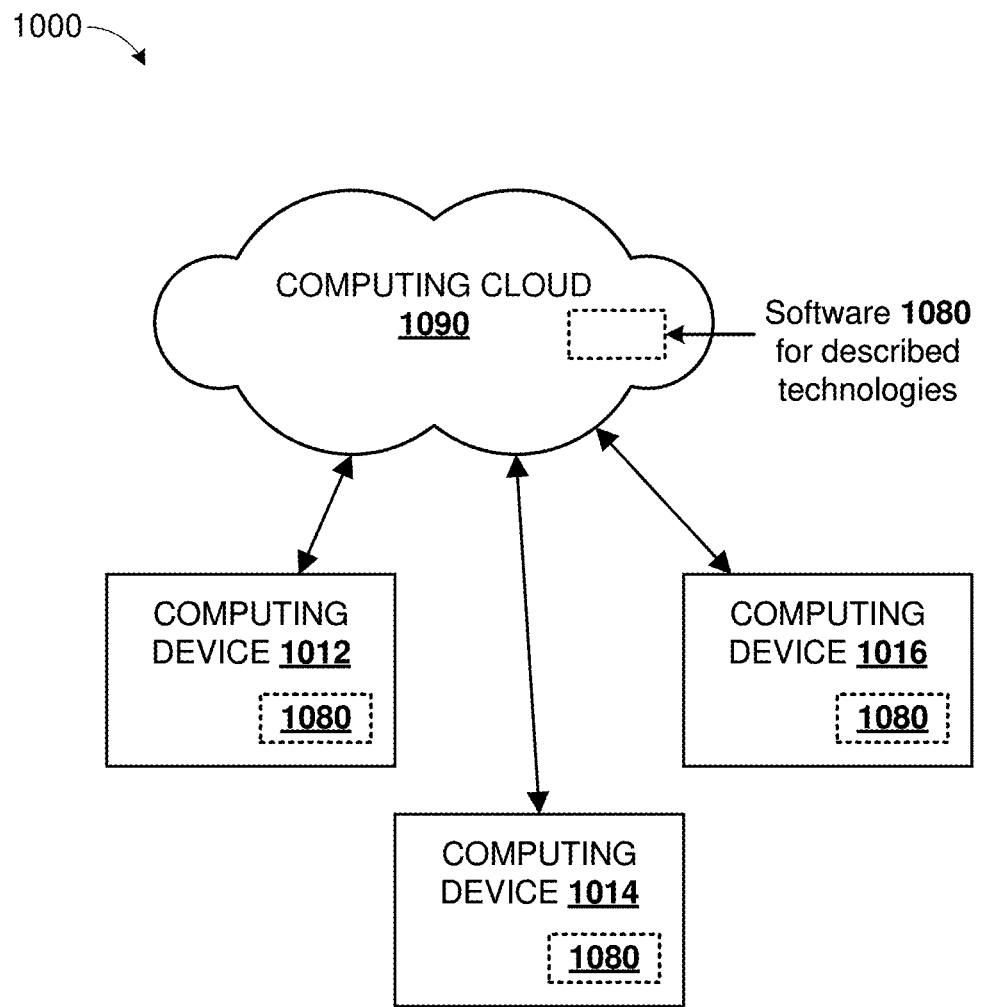
FIG. 10 is a diagram schematically depicting computing devices operating in conjunction with a computing cloud for implementation of disclosed technologies.

FIG. 10 depicts an example cloud computing environment 1000 in which the described technologies can be implemented. The cloud computing environment 1000 comprises a computing cloud 1090 containing resources and providing services or microservices. The computing cloud 1090 can comprise various types of cloud computing resources, such as computer servers, data storage repositories, networking resources, and so forth. The computing cloud 1090 can be centrally located (e.g., provided by a data center of a business or organization) or distributed (e.g., provided by various computing resources located at different locations, such as different data centers and/or located in different cities or countries).

The computing cloud 1090 can be operatively connected to various types of computing devices (e.g., client computing devices), such as computing devices 1012, 1014, and 1016, and can provide a range of computing services thereto. One or more of computing devices 1012, 1014, and 1016 can be computers (e.g., servers, virtual machines, embedded systems, desktop, or laptop computers), mobile devices (e.g., tablet computers, smartphones, or wearable appliances), or other types of computing devices. Communication links between computing cloud 1090 and computing devices 1012, 1014, and 1016 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1012, 1014, and 1016 can also be connected to each other.

Computing devices 1012, 1014, and 1016 can utilize the computing cloud 1090 to obtain computing services and perform computing operations (e.g., data processing, data storage, and the like). Particularly, software 1080 for performing the described innovative technologies can be resident or executed in the computing cloud 1090, in computing devices 1012, 1014, and 1016, or in a distributed combination of cloud and computing devices.

GENERAL CONSIDERATIONS

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "assign," "combine," "compare," "create," "determine," "embed," "evaluate," "execute," "expand," "filter," "generate," "identify," "index," "invoke," "learn," "maintain," "modify," "notify," "obtain," "optimize," "parse," "perform," "predict," "query," "rank," "read," "receive," "request," "respond," "return," "retrieve," "run," "select," "send," "serve," "sort," "store," "train," "transform," "translate," "transmit," "update," "use," "utilize," or "write," to indicate computer operations in a computer system. These terms denote actual operations that are performed or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, values, procedures, or apparatus may be referred to as "optimal," "lowest," "best," "maximum," "extremum," or the like. It will be appreciated that such descriptions are intended to indicate that a selection among a few or among many alternatives can be made, and such selections need not be lower, better, less, or otherwise preferable to other alternatives not considered.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 924, and storage 940. The terms computer-readable media or computer-readable storage media do not include signals and carrier waves. In addition, the terms computer-readable media or computer-readable storage media do not include communication ports (e.g., 970) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed technologies may be applied, it should be recognized that the illustrated embodiments are only preferred examples and should not be taken as limiting the scope of the claims. Rather, the scope of the invention is defined by the following claims. We therefore claim all that comes within the scope and spirit of these claims.

We claim:

1. One or more computer readable media storing instructions executable by one or more hardware processors, the instructions comprising:
   a plurality of modules which, when executed by the one or more hardware processors, implement respective microservices, the microservices forming a weakly connected network of microservices configured as a copilot to one or more first client applications;
   wherein each of the microservices is configured to:
     receive input from (i) a respective first group comprising one or more others of the microservices or (ii) one or more second client applications; and
     transmit output to (i) a second group comprising one or more of the microservices or (ii) one or more third client applications;
   wherein the network of microservices comprises at least an expansion microservice, a retrieval microservice, one or more core microservices, and one or more evaluation microservices;
   wherein, responsive to first input, comprising one or more first tokens, received from the one or more second client applications, the expansion microservice is configured to: determine one or more second tokens associated with but distinct from the first tokens, and transmit the one or more second tokens toward the one or more core microservices;
   wherein the retrieval microservice is configured to perform retrieval augmented generation (RAG) by retrieving one or more data objects related to at least some of the first input and forwarding the retrieved one or more data objects toward the one or more core microservices;
   wherein a given one of the one or more core microservices is configured to generate, based at least partly on some of the forwarded one or more data objects, a response to the first input, and to transmit the response toward the one or more third client applications;
   wherein the one or more evaluation microservices are configured to perform evaluations of outputs from respective source microservices and, based on the evaluations, conditionally forward the outputs toward respective destinations or conditionally invoke respective destination microservices; and
   wherein a plurality of the microservices incorporate respective trained machine learning (ML) tools.

2. The one or more computer readable media of claim 1, wherein at least one microservice among the expansion microservice, the retrieval microservice, or the one or more core microservices incorporates a respective large language model (LLM).

3. The one or more computer readable media of claim 1, wherein the retrieval microservice is configured to retrieve the one or more data objects from one or more data producers among the microservices.

4. The one or more computer readable media of claim 3, wherein the retrieval microservice is further configured to retrieve the one or more data objects over a plurality of recursive iterations.

5. The one or more computer readable media of claim 3, wherein a given one of the one or more data producers comprises a database microservice configured to:
receive a second input from the retrieval microservice;
retrieve, from one or more databases, database objects relevant to the second input;
determine at least one of the one or more data objects based on the retrieved database objects; and
transmit the at least one data object to the retrieval microservice.

6. The one or more computer readable media of claim 5, wherein the microservices further comprise a database post-processing microservice configured to determine the at least one data object by:
transforming one or more of the retrieved database objects from a non-text representation into text; or
transforming one or more of the retrieved database objects into a visualization.

7. The one or more computer readable media of claim 3, wherein a given one of the one or more data producers comprises a messaging microservice configured to:
receive a second input;
retrieve, from one or more message repositories, messages or metadata relevant to the second input;
determine at least one of the one or more data objects based on the retrieved messages or metadata; and
transmit the at least one data object to the retrieval microservice.

8. The one or more computer readable media of claim 1, wherein the given core microservice comprises two or more of the trained ML tools which are peers trained according to respective levels of client authorization, and the given core microservice is further configured to:
select a given ML tool among the two or more trained ML tools according to the level of client authorization associated with the first input; and
generate the response by applying the given ML tool.

9. The one or more computer readable media of claim 1, wherein the given core microservice further comprises one or more long-term memories, each maintaining history for a respective client entity.

10. The one or more computer readable media of claim 1, wherein the given core microservice is further configured to:
determine whether to request a clarification regarding an input received by the given core microservice directly or indirectly from another microservice; and
responsive to the determination being affirmative, issue a request for clarification toward the another microservice.

11. The one or more computer readable media of claim 1, wherein the one or more evaluation microservices comprise:
a first evaluation microservice (i) having a given one of the one or more data producers as a respective source microservice, and (ii) conditionally invoking the retrieval microservice to perform another RAG iteration;
a second evaluation microservice (i) having the given core microservice as a respective source microservice, and (ii) conditionally invoking another core microservice, wherein the one or more core microservices are at least two microservices; or
a third evaluation microservice (i) having the given core microservice as a respective source microservice, and (ii) conditionally invoking the retrieval microservice to perform another RAG iteration.

12. A system comprising:
one or more hardware processors, with memory coupled thereto; and
one or more computer readable media storing instructions comprising a plurality of modules which, when executed by the one or more hardware processors, implement respective microservices, the microservices forming a weakly connected network of microservices configured as a copilot for one or more first client applications;
wherein each of the microservices is configured to:
receive input from (i) a respective first group comprising one or more others of the microservices or (ii) one or more second client applications; and
transmit output to (i) a second group comprising one or more of the microservices or (ii) one or more third client applications;
wherein the network of microservices comprises at least an expansion microservice, a retrieval microservice, one or more core microservices, and one or more evaluation microservices;
wherein, responsive to first input, comprising one or more first tokens, received from the one or more second client applications, the expansion microservice is configured to: determine one or more second tokens associated with but distinct from the first tokens, and; transmit the one or more second tokens toward the one or more core microservices;
wherein the retrieval microservice is configured to perform retrieval augmented generation (RAG) by retrieving one or more data objects related to at least some of the first input and forwarding the retrieved one or more data objects toward the one or more core microservices;
wherein a given one of the one or more core microservices is configured to generate, based at least partly on some of the forwarded one or more data objects, a response to the first input, and to transmit the response toward the one or more third client applications;
wherein the one or more evaluation microservices are configured to perform evaluations of outputs from respective source microservices and, based on the evaluations, conditionally forward the outputs toward respective destinations or conditionally invoke respective destination microservices; and
wherein a plurality of the microservices incorporate respective trained machine learning tools.

13. The system of claim 12, wherein at least one microservice among the one or more core microservices, the expansion microservice, or the retrieval microservice incorporates a respective large language model (LLM).

14. The system of claim 12, wherein the network of microservices further comprises an intermodal microservice configured to respond to second input comprising one or more tokens in a first mode by determining and transmitting, toward the retrieval microservice, second output comprising language tokens associated with the second input.

15. The system of claim 12, wherein the retrieval microservice is configured to retrieve the one or more data objects from one or more data producers among the microservices.

16. The system of claim 15, wherein a given one of the one or more data producers comprises:
an embedding microservice configured to:
receive a second input from the retrieval microservice; and
determine and transmit a second output comprising one or more vector embeddings representative of at least portions of the second input; and
a document microservice storing, in a document repository, documents indexed by vector representations and configured to:
receive third input comprising one or more vector representations, based on the second output;
identify one or more of the documents having content similar to at least portions of the third input;
determine at least one of the one or more data objects based on the identified documents; and
transmit the at least one data object to the retrieval microservice.

17. The system of claim 15, wherein the data objects comprise email, voicemail, text messages, instant messages, video messages, multi-mode messages, or attachments thereto.

18. The system of claim 15, wherein the microservices further comprise a qualification microservice configured to:
receive third input based on output from the retrieval microservice;
compare the third input with a graphical model of a knowledge corpus incorporated in the copilot;
determine whether the copilot is competent to act on the third input;
upon determining that the copilot is competent:
determine and transmit third output based on the third input, toward the given core microservice; and
upon determining that the copilot is not competent, transmit a notification indicating lack of competence.

19. The system of claim 12, wherein the one or more core microservices comprise an ensemble of the core microservices including the given core microservice.

20. The system of claim 19, wherein the core microservices of the ensemble are peers trained for respective cognitive functions.

21. The system of claim 19, wherein the ensemble of core microservices forms at least one cycle, within which each core microservice other than the given core microservice is coupled to:
receive fourth input from a neighboring first core microservice of the ensemble;
apply at least one of the trained ML tools to the fourth input, to determine a fourth output; and
transmit the fourth output to a neighboring second core microservice distinct from the first core microservice.

22. The system of claim 12, wherein the copilot is configured to perform causal reasoning and has a total parameter count under 150 billion.

23. The system of claim 22, wherein the copilot exhibits emergent behavior.

24. The system of claim 12, wherein:
a minimum count of processors required to run the copilot is one general-purpose processor (CPU) chip and one graphics processing unit (GPU) chip; and
the one or more hardware processors comprise the CPU chip coupled to the GPU chip.

* * * * *